US012581218B2

(12) United States Patent
Asakura et al.

(10) Patent No.: US 12,581,218 B2
(45) Date of Patent: Mar. 17, 2026

(54) SOLID-STATE IMAGING ELEMENT

(71) Applicant: Sony Semiconductor Solutions Corporation, Kanagawa (JP)

(72) Inventors: Luonghung Asakura, Kanagawa (JP); Yoshiaki Inada, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/746,479

(22) Filed: Jun. 18, 2024

(65) Prior Publication Data

US 2024/0340551 A1 Oct. 10, 2024

Related U.S. Application Data

(63) Continuation of application No. 17/995,745, filed as application No. PCT/JP2021/006785 on Feb. 24, 2021, now Pat. No. 12,047,701.

(30) Foreign Application Priority Data

Apr. 21, 2020 (JP) ................................. 2020-075184
Nov. 20, 2020 (JP) ................................. 2020-193108

(51) Int. Cl.
H04N 25/77 (2023.01)
H04N 25/616 (2023.01)
(Continued)

(52) U.S. Cl.
CPC ........... H04N 25/77 (2023.01); H04N 25/616 (2023.01); H04N 25/65 (2023.01); H04N 25/78 (2023.01); H04N 25/79 (2023.01)

(58) Field of Classification Search
CPC ...... H04N 25/77; H04N 25/616; H04N 25/65; H04N 25/78; H04N 25/79; H04N 25/771
See application file for complete search history.

(56) References Cited

U.S. PATENT DOCUMENTS

| | | | | |
|---|---|---|---|---|
| 10,070,090 B2 * | 9/2018 | Mo | ......................... | H04N 25/65 |
| 2009/0091648 A1 * | 4/2009 | Lin | ......................... | H04N 25/46 |
| | | | | 348/301 |

(Continued)

FOREIGN PATENT DOCUMENTS

| | | |
|---|---|---|
| CN | 1879402 A | 12/2006 |
| CN | 101835001 A | 9/2010 |

(Continued)

OTHER PUBLICATIONS

International Search Report (PCT/ISA/210), International Application No. PCT/JP2021/006785, dated May 25, 2021.

(Continued)

*Primary Examiner* — Nhan T Tran
(74) *Attorney, Agent, or Firm* — Michael Best & Friedrich LLP

(57) ABSTRACT

Solid-state imaging elements are disclosed. In one example, an upstream circuit sequentially generates a predetermined reset level and a signal level corresponding to an exposure amount, and causes first and second capacitive elements to hold the reset level and the signal level. A selection circuit sequentially connects one of the capacitive elements to a predetermined downstream node, disconnects both capacitive elements from the downstream node, and connects the other capacitive element to the downstream node. A downstream reset transistor initializes a level of the downstream node when both capacitive elements are disconnected from the downstream node. A downstream circuit sequentially reads the reset level and the signal level from the first and second capacitive elements via the downstream node and outputs the reset level and the signal level.

20 Claims, 40 Drawing Sheets

(51) Int. Cl.
H04N 25/65 (2023.01)
H04N 25/78 (2023.01)
H04N 25/79 (2023.01)

(56) References Cited

U.S. PATENT DOCUMENTS

| | | | | |
|---|---|---|---|---|
| 2010/0230579 | A1 | 9/2010 | Watanabe | |
| 2010/0271517 | A1* | 10/2010 | De Wit | H04N 25/75 |
| | | | | 348/294 |
| 2016/0381308 | A1 | 12/2016 | Raynor | |
| 2017/0104946 | A1 | 4/2017 | Hong | |
| 2018/0063459 | A1* | 3/2018 | Stark | H04N 25/76 |
| 2018/0227523 | A1 | 8/2018 | Mo | |
| 2019/0222783 | A1* | 7/2019 | Nishihara | H04N 25/77 |
| 2020/0244900 | A1* | 7/2020 | Hynecek | H10F 39/199 |
| 2021/0144330 | A1* | 5/2021 | Otaka | H04N 25/443 |

FOREIGN PATENT DOCUMENTS

| | | | | | |
|---|---|---|---|---|---|
| CN | 102047563 | A | | 5/2011 | |
| CN | 110050459 | A | | 7/2019 | |
| CN | 110771155 | A | | 2/2020 | |
| EP | 3624441 | A1 | * | 3/2020 | H04N 5/3454 |
| JP | 2004096669 | A | | 3/2004 | |
| JP | 2004186790 | A | | 7/2004 | |
| JP | 2009296423 | A | | 12/2009 | |
| JP | 2012049568 | A | | 3/2012 | |
| JP | 2014096669 | A | * | 5/2014 | H04N 5/378 |
| KR | 20080092862 | A | | 10/2008 | |
| KR | 20140099858 | A | | 8/2014 | |
| WO | 2011155442 | A1 | | 12/2011 | |

OTHER PUBLICATIONS

Jae-kyu Lee, et al.,A 2.1e-Temporal Noise and -105dB Parasitic Light Sensitivity Backside-Illuminated 2.3 μm-Pixel Voltage-Domain Global Shutter CMOS Image Sensor Using High-Capacity DRAM Capacitor Technology, ISSCC 2020.

Chen Jian, et al, "Research of CMOS Image Sensor", Electronic Science and Technology, Sep. 15, 2007, pp. 17-21.

* cited by examiner a b a b

FIG. 38

| OPERATION | NOISE | RN ($\mu$ Vrms) | | REMARKS |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50fF |
| SEQUENTIAL READING | NOISE IN UPSTREAM SF | 380 | 0 | --- |
| | NOISE IN AND AFTER DOWNSTREAM SF | 160 | 160 | CONTAINING ADC NOISE |
| TOTAL | | 610 | 478 | --- |

SOLID-STATE IMAGING ELEMENT

CROSS REFERENCE TO RELATED APPLICATION

This application is a Continuation Application of U.S. patent application Ser. No. 17/995,745, filed Oct. 7, 2022, which is a 371 Nationalization of PCT/JP2021/006785, filed Feb. 24, 2021, and claims the benefit of Japanese Priority Patent Application JP 2020-075184 filed Apr. 21, 2020 and JP 2020-193108 filed on Nov. 20, 2020, the entire contents of which are incorporated herein by reference.

TECHNICAL FIELD

The present technology relates to a solid-state imaging element. Specifically, the present technology relates to a method for controlling a solid-state imaging element that perform analog to digital (AD) conversion for each column.

BACKGROUND ART

Conventionally, a column analog to digital converter (ADC) system in which an ADC is arranged for every column outside a pixel array section and pixel signals are sequentially read row by row has been used in a solid-state imaging element for the purpose of miniaturizing pixels. In this column ADC system, when exposure is performed by a rolling shutter system in which exposure is started row by row, there is a possibility that rolling shutter distortion occurs. Thus, proposed is a solid-state imaging element in which a pair of capacitors is provided for each pixel to hold a reset level and a signal level in the capacitors in order to achieve a global shutter system in which exposure is simultaneously started in all pixels (see, for example, Non-Patent Document 1). The pair of capacitors is connected in series to a source follower circuit via a node, and the reset level and the signal level are sequentially read by the source follower circuit.

CITATION LIST

Non-Patent Document

Non-Patent Document 1: Jae-kyu Lee, et al., A 2.1e- Temporal Noise and −105 dB Parasitic Light Sensitivity Backside-Illuminated 2.3 μm-Pixel Voltage-Domain Global Shutter CMOS Image Sensor Using High-Capacity DRAM Capacitor Technology, ISSCC 2020.

SUMMARY OF THE INVENTION

Problems to be Solved by the Invention

In the above-described conventional technology, the global shutter system in the column ADC system is achieved by holding the reset level and the signal level in the pair of capacitors for every pixel. However, when a transistor in the source follower circuit initializes the node connected to the capacitor, there is a problem that kTC noise (in other words, reset noise) at a level corresponding to the capacitor is generated so that image quality of image data is degraded by the noise.

The present technology has been made in view of such a situation, and an object thereof is to improve image quality in a solid-state imaging element that simultaneously performs exposure in all pixels.

Solutions to Problems

The present technology has been made to solve the above-described problem, and a first aspect thereof relates to a solid-state imaging element and a method for controlling the same, the solid-state imaging element including: first and second capacitive elements; an upstream circuit that sequentially generates a predetermined reset level and a signal level corresponding to an exposure amount and causes each of the first and second capacitive elements to hold the reset level and the signal level; a selection circuit that sequentially performs control to connect one of the first and second capacitive elements to a predetermined downstream node, control to disconnect both the first and second capacitive elements from the downstream node, and control to connect another of the first and second capacitive elements to the downstream node; a downstream reset transistor that initializes a level of the downstream node when both the first and second capacitive elements are disconnected from the downstream node; and a downstream circuit that sequentially reads the reset level and the signal level from the first and second capacitive elements via the downstream node and outputs the reset level and the signal level. This brings about an effect that kTC noise is reduced.

Furthermore, in the first aspect, an upstream selection transistor that opens and closes a path between the upstream circuit and a predetermined upstream node and an upstream reset transistor that initializes a level of the upstream node may be further provided, and the first and second capacitive elements may respectively have first ends connected in common to the upstream node and second ends connected to the selection circuit. This brings about an effect that noise from the upstream circuit is blocked.

Furthermore, in the first aspect, the upstream selection transistor may transition to a closed state over a period in which the upstream circuit causes each of the first and second capacitive elements to hold the reset level and the signal level, and the upstream reset transistor may initialize the level of the upstream node in a period in which the downstream circuit sequentially reads the reset level and the signal level from the first and second capacitive elements. This brings about an effect that a potential of the upstream node is fixed at the time of reading.

Furthermore, in the first aspect, the upstream circuit may include: a photoelectric conversion element; an upstream transfer transistor that transfers a charge from the photoelectric conversion element to a floating diffusion layer; a first reset transistor that initializes the floating diffusion layer; and an upstream amplification transistor that amplifies a voltage of the floating diffusion layer and outputs the amplified voltage to a predetermined upstream node, and the first and second capacitive elements may respectively have first ends connected in common to the upstream node and second ends connected to the selection circuit. This brings about an effect that a signal corresponding to a potential of the floating diffusion layer is supplied to the upstream node.

Furthermore, in the first aspect, a switching section that adjusts a source voltage to be supplied to a source of the upstream amplification transistor may be further provided, the upstream circuit may further include a current source transistor connected to a drain of the upstream amplification transistor, and the current source transistor may transition from an on state to an off state after an exposure period ends. This brings about an effect that a source follower in the upstream stage is in the off state at the time of reading.

Furthermore, in the first aspect, the switching section may a predetermined power supply voltage as the source voltage in the exposure period, and supplies a generation voltage, different from the power supply voltage, as the source voltage after the exposure period ends. This brings about an effect that a source voltage of the source follower in the upstream stage is adjusted.

Furthermore, in the first aspect, a difference between the power supply voltage and the generation voltage may substantially match a sum of a variation amount caused by reset feedthrough of the first reset transistor and a gate-source voltage of the upstream amplification transistor. This brings about an effect that the potential of the upstream node is equalized between the time of exposure and the time of reading.

Furthermore, in the first aspect, the upstream transfer transistor may transfer the charge to the floating diffusion layer and the first reset transistor may initialize the photoelectric conversion element together with the floating diffusion layer at a predetermined exposure start timing, and the upstream transfer transistor may transfer the charge to the floating diffusion layer at a predetermined exposure end timing. This brings about an effect that a pixel signal corresponding to the exposure amount is generated.

Furthermore, in the first aspect, the upstream circuit may further include a discharge transistor that discharges the charge from the photoelectric conversion element. This brings about an effect that the photoelectric conversion element is initialized.

Furthermore, in the first aspect, the first reset transistor may initialize the floating diffusion layer, and the discharge transistor discharges the charge from the photoelectric conversion element before a predetermined exposure start timing, and the upstream transfer transistor may transfer the charge to the floating diffusion layer at a predetermined exposure end timing. This brings about an effect that an extremely short exposure period is achieved.

Furthermore, in the first aspect, a control circuit that controls a reset power supply voltage of the upstream circuit is further provided, the first reset transistor may initialize a voltage of the floating diffusion layer to the reset power supply voltage, and the control circuit may set the reset power supply voltage to a voltage different from a voltage during an exposure period in a reading period in which the reset level and the signal level are read. This brings about an effect that photo response non-uniformity is improved.

Furthermore, in the first aspect, a difference between the reset power supply voltage in the reading period and the reset power supply voltage in the exposure period may substantially match a variation amount caused by reset feedthrough of the first reset transistor. This brings about an effect that photo response non-uniformity is improved.

Furthermore, in the first aspect, a first reset signal may be input to a gate of the first reset transistor, and an amplitude of the first reset signal may be a value obtained by adding a predetermined margin to a value corresponding to a dynamic range. This brings about an effect that a blackening phenomenon is suppressed.

Furthermore, in the first aspect, a digital signal processing section that adds a pair of consecutive frames may be further provided, and the upstream circuit may cause one of the first and second capacitive elements to hold the reset level in an exposure period of one of the pair of frames and then cause another of the first and second capacitive elements to hold the signal level, and cause the another of the first and second capacitive elements to hold the reset level in an exposure period of another of the pair of frames and then cause the one of the first and second capacitive elements to hold the signal level. This brings about an effect that photo response non-uniformity is improved.

Furthermore, in the first aspect, an analog-to-digital converter that sequentially converts the output reset level and the output signal level into digital signals may be further provided. This brings about an effect that digital image data is generated.

Furthermore, in the first aspect, the analog-to-digital converter may include: a comparator that compares a level of a vertical signal line that transmits the reset level and the signal level with a predetermined ramp signal and outputs a comparison result; and a counter that counts a count value over a period until the comparison result is inverted and outputs the digital signal indicating the count value. This brings about an effect that analog-digital conversion is achieved by a simple configuration.

Furthermore, in the first aspect, the comparator may include: a comparison unit that compares levels of a pair of input terminals and outputs a comparison result; and an input-side selector that selects any of the vertical signal line and a node with a predetermined reference voltage and connects the selected vertical signal line or node to one of the pair of input terminals, and the ramp signal may be input to the one of the pair of input terminals. This brings about an effect that a blackening phenomenon is suppressed.

Furthermore, the first aspect may be further provided with: a control section that determines whether or not illuminance is higher than a predetermined value on the basis of the comparison result and outputs a determination result; a correlated double sampling (CDS) processing section that performs correlated double sampling processing on the digital signal; and an output-side selector that outputs either the digital signal subjected to the correlated double sampling processing or a digital signal having a predetermined value on the basis of the determination result. This brings about an effect that a blackening phenomenon is suppressed.

Furthermore, in the first aspect, a vertical scanning circuit that performs control to control a plurality of rows in each of which a predetermined number of pixels are arrayed to simultaneously start exposure may be further provided, and the first and second capacitive elements, the upstream circuit, the selection circuit, the downstream reset transistor, and the downstream circuit may be arranged in each of the pixels. This brings about an effect that miniaturization of a pixel is facilitated.

Furthermore, in the first aspect, the vertical scanning circuit may further perform control to control the plurality of rows to sequentially start the exposure. This brings about an effect that miniaturization of a pixel is facilitated.

Furthermore, in the first aspect, the upstream circuit may be provided on a first chip, and the first and second capacitive elements, the selection circuit, the downstream reset transistor, and the downstream circuit may be provided on a second chip. This brings about an effect that miniaturization of a pixel is facilitated.

Furthermore, in the first aspect, an analog-to-digital converter that sequentially converts the output reset level and the output signal level into digital signals may be further provided, and the analog-to-digital converter may be provided on the second chip. This brings about an effect that miniaturization of a pixel is facilitated.

Furthermore, in the first aspect, an analog-to-digital converter that sequentially converts the output reset level and the output signal level into digital signals may be further provided, and the analog-to-digital converter may be provided on a third chip. This brings about an effect that miniaturization of a pixel is facilitated.

Furthermore, a second aspect of the present technology relates to a solid-state imaging element including: a photoelectric conversion section that converts incident light into a charge; a first amplification transistor that converts the charge into a voltage; a signal line that outputs a pixel signal; a first capacitive element having a first end connected to a first node which is an output destination of the first amplification transistor; a second capacitive element provided in parallel with the first capacitive element between the first amplification transistor and the signal line, the second capacitive element having a first end connected to the first node; a first selection transistor connected to the first capacitive element at a second end of the first capacitive element; a second selection transistor connected to the second capacitive element at a second end of the second capacitive element; a reset transistor of which a source or a drain is connected to a second node to which the first and second selection transistors are connected; and a second amplification transistor that has a gate connected to the second node and outputs the pixel signal. This brings about an effect that image data with reduced kTC noise is generated.

BRIEF DESCRIPTION OF DRAWINGS

FIG. 38 is a diagram for describing an effect in the seventh embodiment of the present technology.

MODE FOR CARRYING OUT THE INVENTION

Hereinafter, modes for carrying out the present technology (hereinafter, referred to as embodiments) will be described. The description will be given in the following order.

1. First Embodiment (Example in Which Pixel Signals Are Held in First and Second Capacitive Elements)
2. Second embodiment (Example in Which Discharge Transistor Is Added and First And Second Capacitive Elements Are Caused to Hold Pixel Signals)
3. Third Embodiment (Example in Which First and Second Capacitive Elements Are Caused to Hold Pixel Signals and Reset Power Supply Voltage Is Controlled)
4. Fourth Embodiment (Example in Which First and Second Capacitive Elements Are Caused to Hold Pixel Signals and Levels to Be Held Are Switched For Each Frame)
5. Fifth Embodiment (Example in Which Pixel Signals Are Held in First and Second Capacitive Elements and Blackening Phenomenon Is Suppressed)
6. Sixth Embodiment (Example in Which First and Second Capacitive Elements Are Caused to Hold Pixel Signals and Rolling Shutter Operation Is Performed)
7. Example of Application to Mobile Body

1. First Embodiment

[Configuration Example of Imaging Device]

Figure 1:
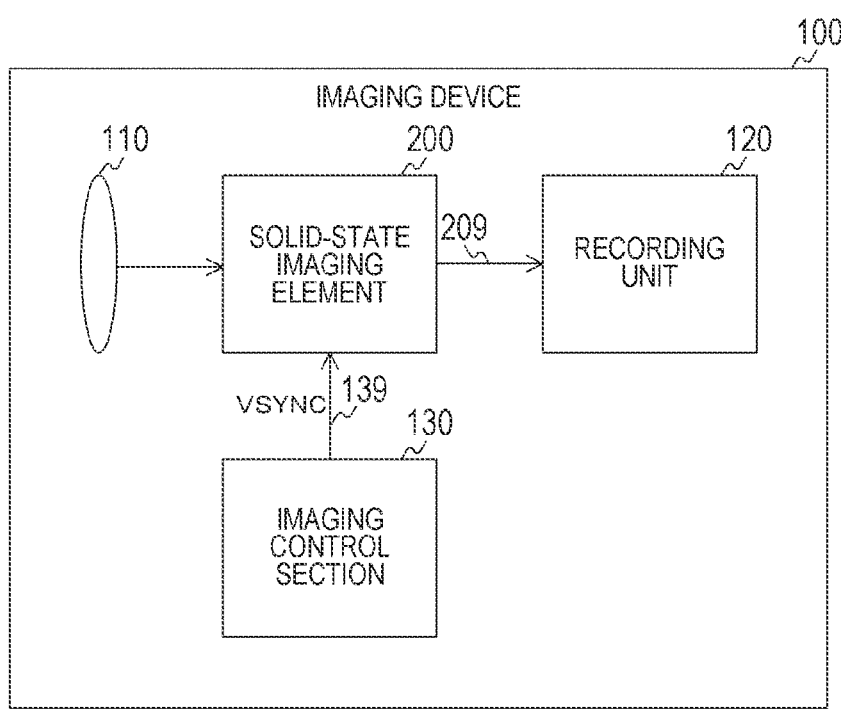
FIG. 1 is a block diagram depicting a configuration example of an imaging device in a first embodiment of the present technology.

FIG. 1 is a block diagram depicting a configuration example of an imaging device 100 in a first embodiment of the present technology. The imaging device 100 is a device that images image data, and includes an imaging lens 110, a solid-state imaging element 200, a recording unit 120, and an imaging control section 130. As the imaging device 100, a digital camera or an electronic device (a smartphone, a personal computer, or the like) having an imaging function is assumed.

The solid-state imaging element 200 images image data under the control of the imaging control section 130. The solid-state imaging element 200 supplies the image data to the recording unit 120 via a signal line 209.

The imaging lens 110 collects light and guides the light to the solid-state imaging element 200. The imaging control section 130 controls the solid-state imaging element 200 to image the image data. The imaging control section 130 supplies, for example, an imaging control signal including a vertical synchronization signal VSYNC to the solid-state imaging element 200 via a signal line 139. The recording unit 120 records the image data.

Here, the vertical synchronization signal VSYNC is a signal indicating an imaging timing, and a periodic signal of a constant frequency (such as 60 hertz) is used as the vertical synchronization signal VSYNC.

Incidentally, the imaging device 100 records the image data, the image data may be transmitted to the outside of the imaging device 100. In this case, an external interface configured to transmit the image data is further provided. Alternatively, the imaging device 100 may further display the image data. In this case, a display section is further provided.

[Configuration Example of Solid-State Imaging Element]

Figure 2:
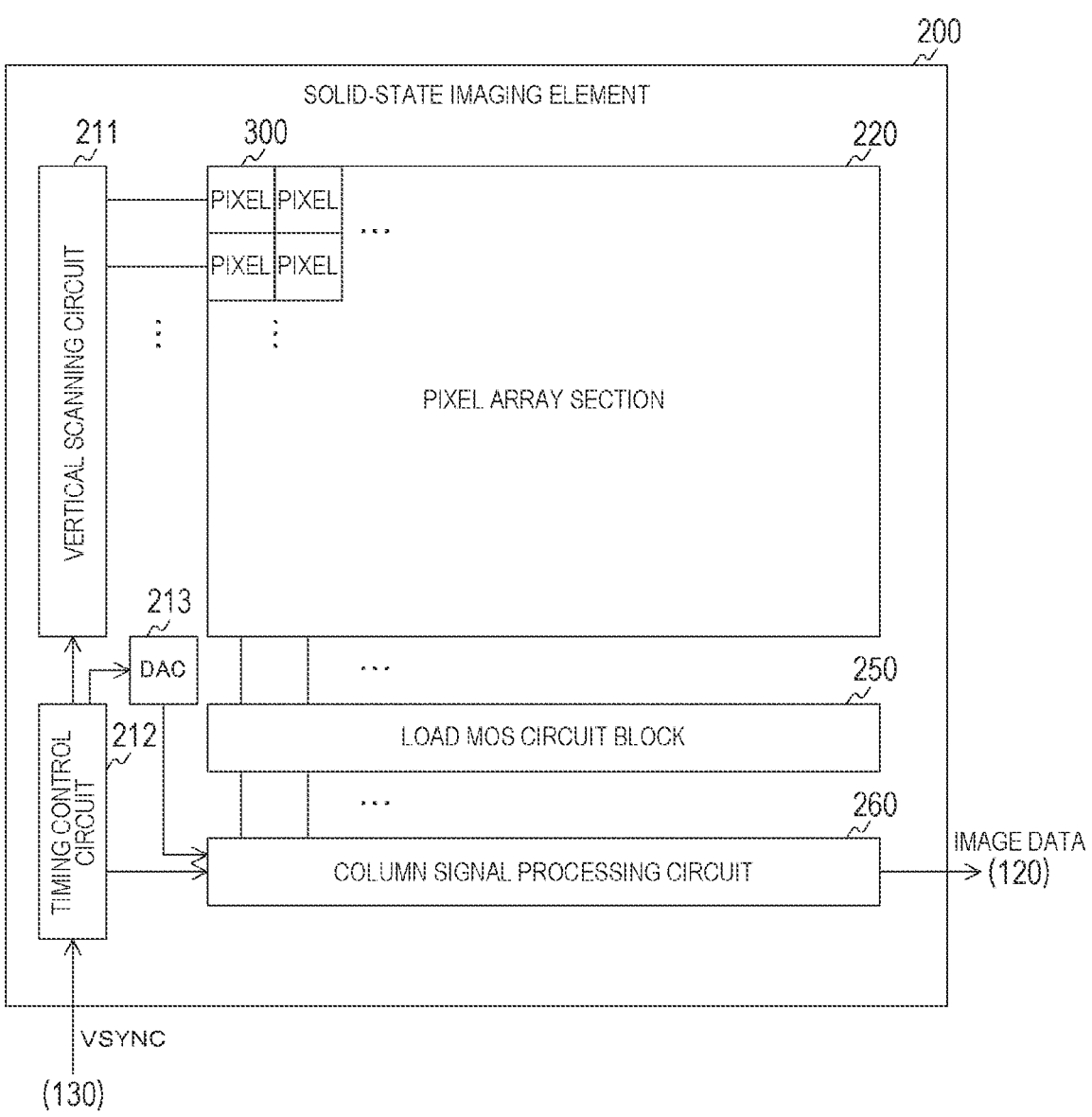
FIG. 2 is a block diagram depicting a configuration example of a solid-state imaging element in the first embodiment of the present technology.

FIG. 2 is a block diagram depicting a configuration example of the solid-state imaging element 200 in the first embodiment of the present technology. The solid-state imaging element 200 includes a vertical scanning circuit 211, a pixel array section 220, a timing control circuit 212, a digital to analog converter (DAC) 213, a load MOS circuit block 250, and a column signal processing circuit 260. In the pixel array section 220, a plurality of pixels 300 is arrayed in a two-dimensional lattice pattern. Furthermore, each of the circuits in the solid-state imaging element 200 is provided on, for example, a single semiconductor chip.

Hereinafter, a set of the pixels 300 arrayed in the horizontal direction is referred to as a "row", and a set of the pixels 300 arrayed in a direction perpendicular to the row is referred to as a "column".

The timing control circuit 212 controls an operation timing of each of the vertical scanning circuit 211, the DAC 213, and the column signal processing circuit 260 in synchronization with the vertical synchronization signal VSYNC from the imaging control section 130.

The DAC 213 generates a ramp signal of a sawtooth wave shape by digital-to-analog (DA) conversion. The DAC 213 supplies the generated ramp signal to the column signal processing circuit 260.

The vertical scanning circuit 211 sequentially selects and drives rows and outputs analog pixel signals. The pixel 300 photoelectrically converts incident light to generate the analog pixel signal. This pixel 300 supplies the pixel signal to the column signal processing circuit 260 via the load MOS circuit block 250.

In the load MOS circuit block 250, a MOS transistor that supplies a constant current is provided for every column.

The column signal processing circuit 260 executes signal processing, such as AD conversion processing and CDS processing, on the pixel signal for each column. The column signal processing circuit 260 supplies image data including the processed signal to the recording unit 120. Incidentally, the column signal processing circuit 260 is an example of a signal processing circuit described in the claims.

[Configuration Example of Pixel]

Figure 3:
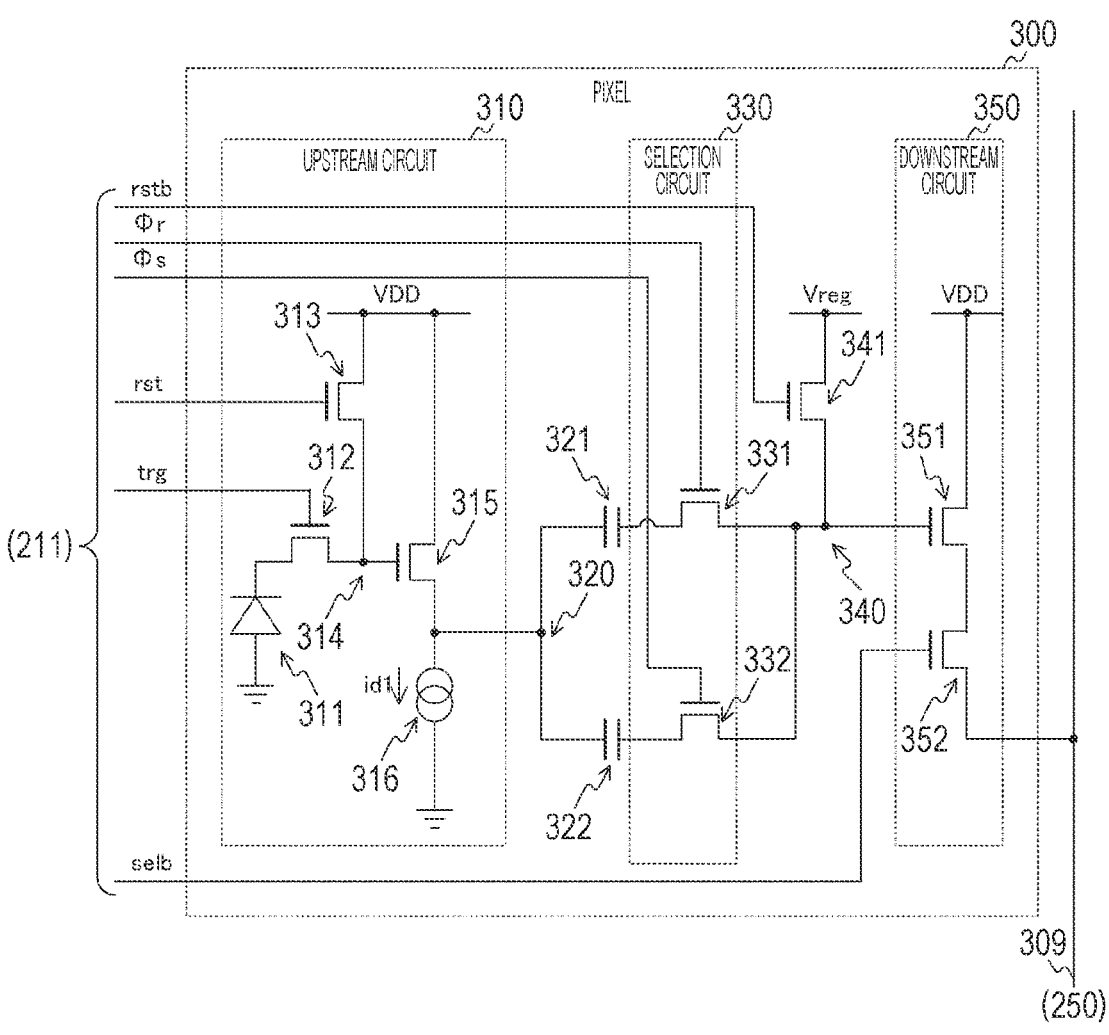
FIG. 3 is a circuit diagram depicting a configuration example of a pixel in the first embodiment of the present technology.

FIG. 3 is a circuit diagram depicting a configuration example of the pixel 300 in the first embodiment of the present technology. The pixel 300 includes an upstream circuit 310, capacitive elements 321 and 322, a selection circuit 330, a downstream reset transistor 341, and a downstream circuit 350.

The upstream circuit 310 includes a photoelectric conversion element 311, a transfer transistor 312, a floating diffusion (FD) reset transistor 313, an FD 314, an upstream amplification transistor 315, and a current source transistor 316.

The photoelectric conversion element 311 generates a charge by photoelectric conversion. The transfer transistor 312 transfers the charge from the photoelectric conversion element 311 to the FD 314 in accordance with a transfer signal trg from the vertical scanning circuit 211.

The FD reset transistor 313 extracts and initializes the charge from the FD 314 in accordance with an FD reset signal rst from the vertical scanning circuit 211. The FD 314 accumulates the charge and generates a voltage corresponding to a charge amount. The upstream amplification transistor 315 amplifies a level of the voltage of the FD 314 and outputs the amplified voltage to an upstream node 320. Incidentally, the FD reset transistor 313 is an example of a first reset transistor described in the claims. Furthermore, the upstream amplification transistor 315 is an example of a first amplification transistor described in the claims.

Furthermore, sources of the FD reset transistor 313 and the upstream amplification transistor 315 are connected to a power supply voltage VDD. The current source transistor 316 is connected to a drain of the upstream amplification transistor 315. The current source transistor 316 supplies a current id1 under the control of the vertical scanning circuit 211.

The capacitive elements 321 and 322 have one ends connected in common to the upstream node 320 and the other ends connected to the selection circuit 330. Incidentally, the capacitive elements 321 and 322 are examples of first and second capacitive elements described in the claims.

The selection circuit 330 includes a selection transistor 331 and a selection transistor 332. The selection transistor 331 opens and closes a path between the capacitive element 321 and a downstream node 340 in accordance with a selection signal Φr from the vertical scanning circuit 211. The selection transistor 332 opens and closes a path between the capacitive element 322 and the downstream node 340 in accordance with a selection signal Φs from the vertical scanning circuit 211.

The downstream reset transistor 341 initializes a level of the downstream node 340 to a predetermined potential Vreg in accordance with a downstream reset signal rstb from the vertical scanning circuit 211. As the potential Vreg, a potential (for example, a potential lower than VDD) different from the power supply potential VDD is set.

The downstream circuit 350 includes a downstream amplification transistor 351 and a downstream selection transistor 352. The downstream amplification transistor 351 amplifies the level of the downstream node 340. The downstream selection transistor 352 outputs a signal at the level amplified by the downstream amplification transistor 351 to a vertical signal line 309 as a pixel signal in accordance with a downstream selection signal selb from the vertical scanning circuit 211. Incidentally, the downstream amplification transistor is an example of a second amplification transistor described in the claims.

Incidentally, for example, n-channel metal oxide semiconductor (nMOS) transistors are used as various transistors (the transfer transistors 312 and the like) in the pixel 300.

The vertical scanning circuit 211 supplies the high-level FD reset signal rst and the transfer signal trg to all the pixels when exposure starts. Therefore, the photoelectric conversion element 311 is initialized. Hereinafter, this control is referred to as "PD reset".

Then, the vertical scanning circuit 211 supplies the high-level FD reset signal rst over a pulse period while setting the downstream reset signal rstb and the selection signal Φr to a high level for all the pixels immediately before the exposure ends. Therefore, the FD 314 is initialized, and a level corresponding to the level of the FD 314 at that time is held in the capacitive element 321. This control is hereinafter referred to as "FD reset".

The level of the FD 314 at the time of the FD reset and the level (the level held in the capacitive element 321 and the level of the vertical signal line 309) corresponding to the level are hereinafter collectively referred to as a "P phase" or a "reset level".

When the exposure ends, the vertical scanning circuit 211 supplies the high-level transfer signal trg over a pulse period while setting the downstream reset signal rstb and the selection signal Φs to the high level for all the pixels. Therefore, a signal charge corresponding to an exposure amount is transferred to the FD 314, and a level corresponding to the level of the FD 314 at that time is held in the capacitive element 322.

The level of the FD 314 when the signal charge is transferred and the level (the level held in the capacitive element 322 and the level of the vertical signal line 309) corresponding to the level are hereinafter collectively referred to as a "D phase" or a "signal level".

Such exposure control in which the exposure is started and ended simultaneously for all the pixels is called a global shutter system. This exposure control causes the upstream circuits 310 of all the pixels sequentially generate the reset level and the signal level. The reset level is held in the capacitive element 321, and the signal level is held in the capacitive element 322.

After the exposure ends, the vertical scanning circuit 211 sequentially selects a row and sequentially outputs the reset level and the signal level of the row. When the reset level is to be output, the vertical scanning circuit 211 supplies the high-level selection signal Φr over a predetermined period while setting the FD reset signal rst and the downstream selection signal selb of the selected row to the high level. Therefore, the capacitive element 321 is connected to the downstream node 340 so that the reset level is read.

After the reset level is read, the vertical scanning circuit 211 supplies the high-level downstream reset signal rstb over a pulse period while keeping the FD reset signal rst and the downstream selection signal selb of the selected row at the high level. Therefore, the level of the downstream node 340 is initialized. At this time, both the selection transistor 331 and the selection transistor 332 are in an open state, and the capacitive elements 321 and 322 are disconnected from the downstream node 340.

After the downstream node 340 is initialized, the vertical scanning circuit 211 supplies the high-level selection signal Φs over a predetermined period while keeping the FD reset signal rst and the downstream selection signal selb of the selected row at the high level. Therefore, the capacitive element 322 is connected to the downstream node 340 so that the signal level is read.

Under the above-described reading control, the selection circuit 330 of the selected row sequentially performs control to connect the capacitive element 321 to the downstream node 340, control to disconnect the capacitive elements 321 and 322 from the downstream node 340, and control to connect the capacitive element 322 to the downstream node 340. Furthermore, when the capacitive elements 321 and 322 are disconnected from the downstream node 340, the downstream reset transistor 341 of the selected row initializes the level of the downstream node 340. Furthermore, the downstream circuit 350 of the selected row sequentially reads the reset level and the signal level from the capacitive elements 321 and 322 via the downstream node 340, and outputs the reset level and the signal level to the vertical signal line 309.

[Configuration Example of Column Signal Processing Circuit]

Figure 4:
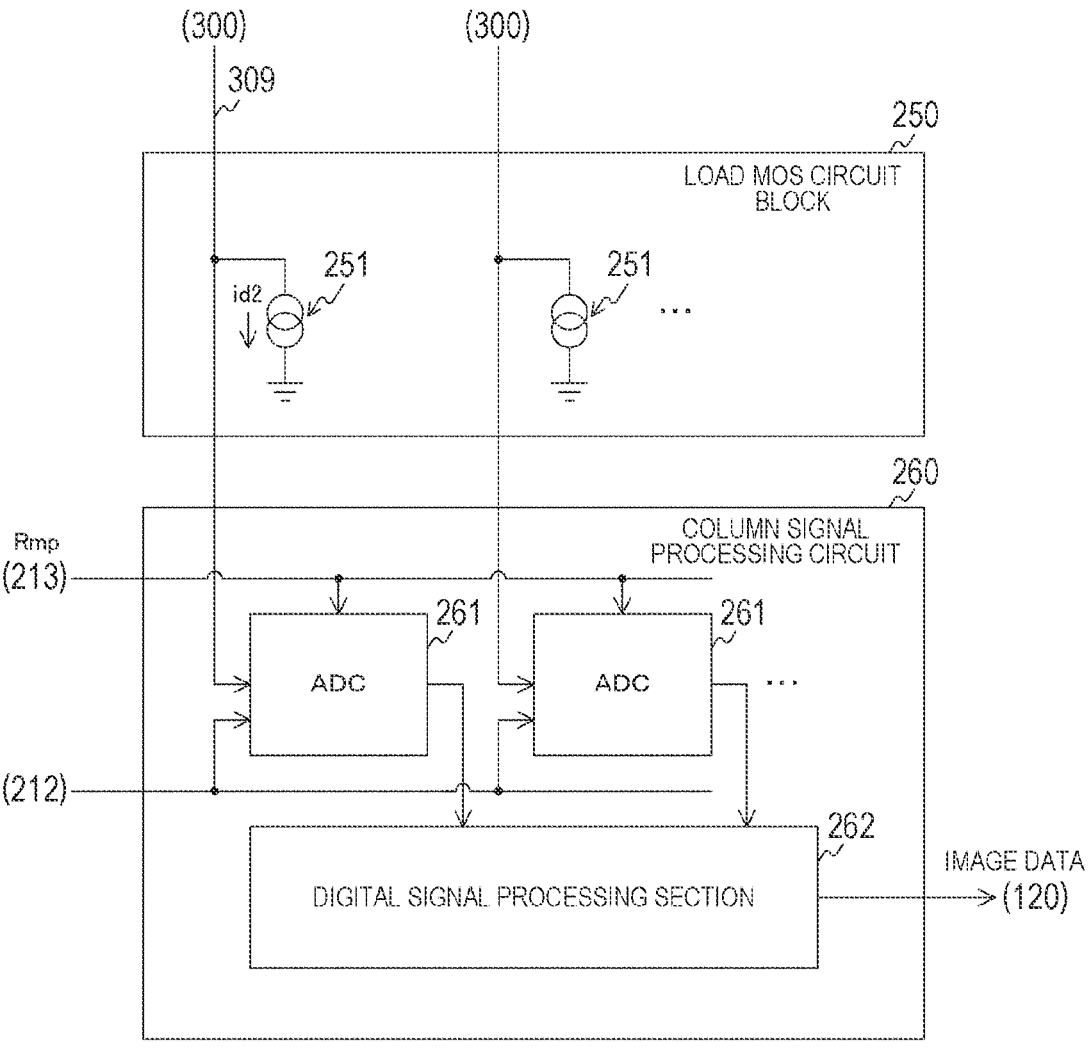
FIG. 4 is a block diagram depicting a configuration example of a column signal processing circuit and a load MOS circuit block in the first embodiment of the present technology.

FIG. 4 is a block diagram depicting a configuration example of the load MOS circuit block 250 and the column signal processing circuit 260 in the first embodiment of the present technology.

In the load MOS circuit block 250, the vertical signal line 309 is wired for every column. When the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of ADCs 261 and a digital signal processing section 262 are arranged. The ADC 261 is arranged for every column. When the number of columns is I, I ADCs 261 are arranged.

The ADC 261 converts an analog pixel signal from a corresponding column into a digital signal using a ramp signal Rmp from the DAC 213. The ADC 261 supplies the digital signal to the digital signal processing section 262. For example, a single-slope ADC including a comparator and a counter is arranged as the ADC 261.

The digital signal processing section 262 performs predetermined signal processing such as CDS processing on each of the digital signals for every column. The digital signal processing section 262 supplies image data including the processed digital signal to the recording unit 120.

[Operation Example of Solid-State Imaging Element]

Figure 5:
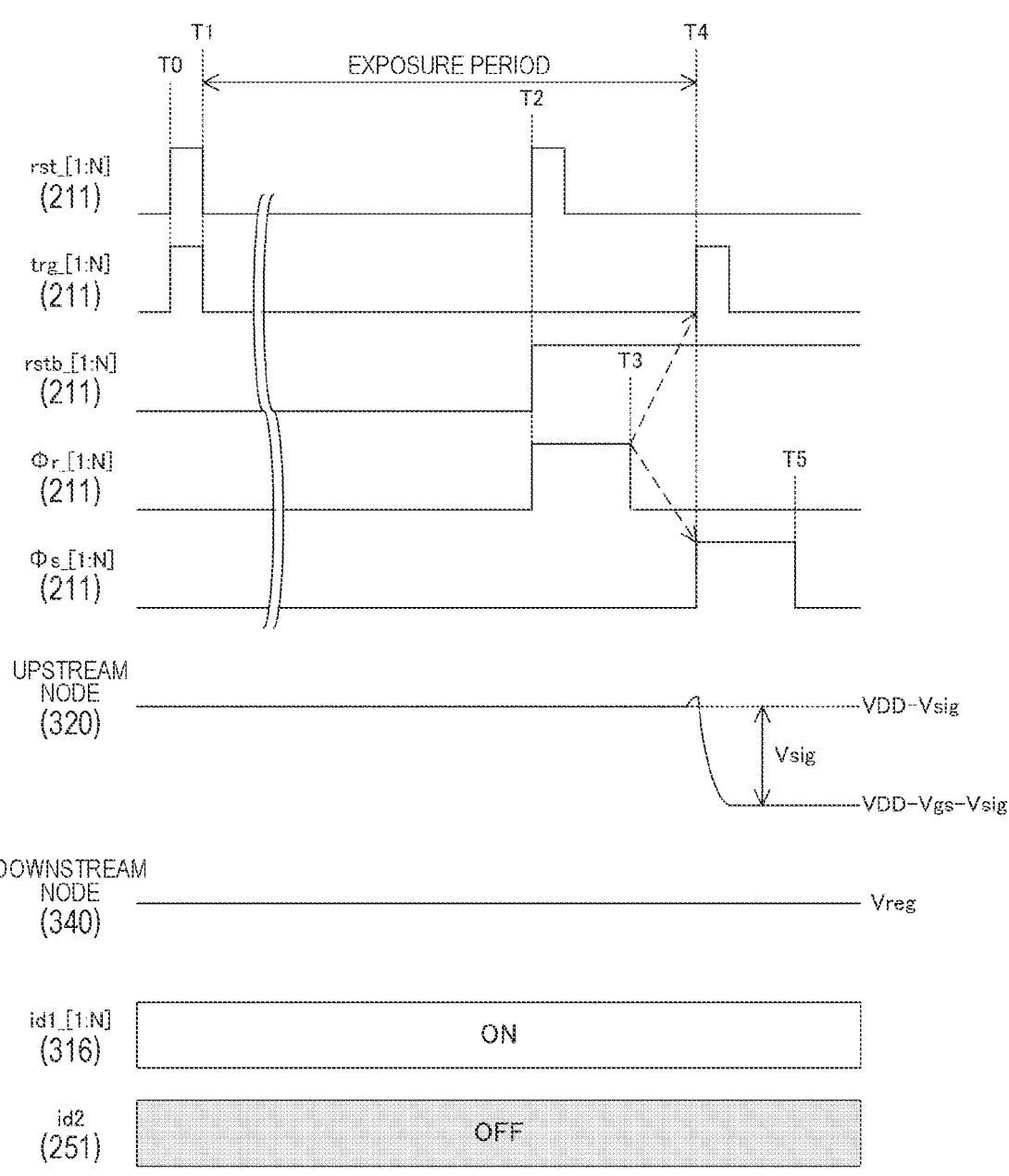
FIG. 5 is a timing chart depicting an example of a global shutter operation in the first embodiment of the present technology.

FIG. 5 is a timing chart depicting an example of a global shutter operation in the first embodiment of the present technology. The vertical scanning circuit 211 supplies the high-level FD reset signals rst and transfer signal trg to all the rows (in other words, all the pixels) from a timing T0 immediately before the exposure start to a timing T1 after a lapse of a pulse period. Therefore, all the pixels are subjected to the PD reset, and the exposure is simultaneously started in all the rows.

Here, rst_[n] and trg_[n] in the drawing indicate signals with respect to pixels in the n-th row among N rows. N is an integer indicating the total number of rows, and n is an integer from one to N.

Then, the vertical scanning circuit 211 supplies the high-level FD reset signal rst over a pulse period while setting the downstream reset signal rstb and the selection signal Φr to the high level in all the pixels at a timing T2 immediately before the end of an exposure period. Therefore, all the pixels are subjected to the FD reset, and the reset level is sampled and held. Here, rstb_[n] and Φr_[n] in the drawing indicate signals with respect to pixels in the n-th row.

At a timing T3 after the timing T2, the vertical scanning circuit 211 returns the selection signal Φr to a low level.

At an exposure end timing T4, the vertical scanning circuit 211 supplies the high-level transfer signal trg over a pulse period while setting the downstream reset signal rstb and the selection signal Φs to the high level in all the pixels. Therefore, the signal level is sampled and held. Furthermore, a level of the upstream node 320 decreases from the reset level (VDD−Vsig) to the signal level (VDD−Vgs−Vsig). Here, VDD represents the power supply voltage, and Vsig represents a net signal level obtained by CDS processing. Vgs represents a gate-source voltage of the upstream amplification transistor 315. Furthermore, Φs_[n] in the drawing indicates a signal with respect to the pixel in the n-th row.

At a timing T5 after the timing T4, the vertical scanning circuit 211 returns the selection signal Φs to the low level.

Furthermore, the vertical scanning circuit 211 controls the current source transistors 316 of all the rows (all the pixels) to supply the current id1. Here, id1_[n] in the drawing indicates the current of the pixel in the n-th row. When a current id is large, IR drop becomes large, and thus, the current id1 needs to be on the order of several nanoamperes (nA) to several tens of nanoamperes (nA). On the other hand, the load MOS transistors 251 of all the columns are in the OFF state, and the current id2 is not supplied to the vertical signal line 309.

Figure 6:
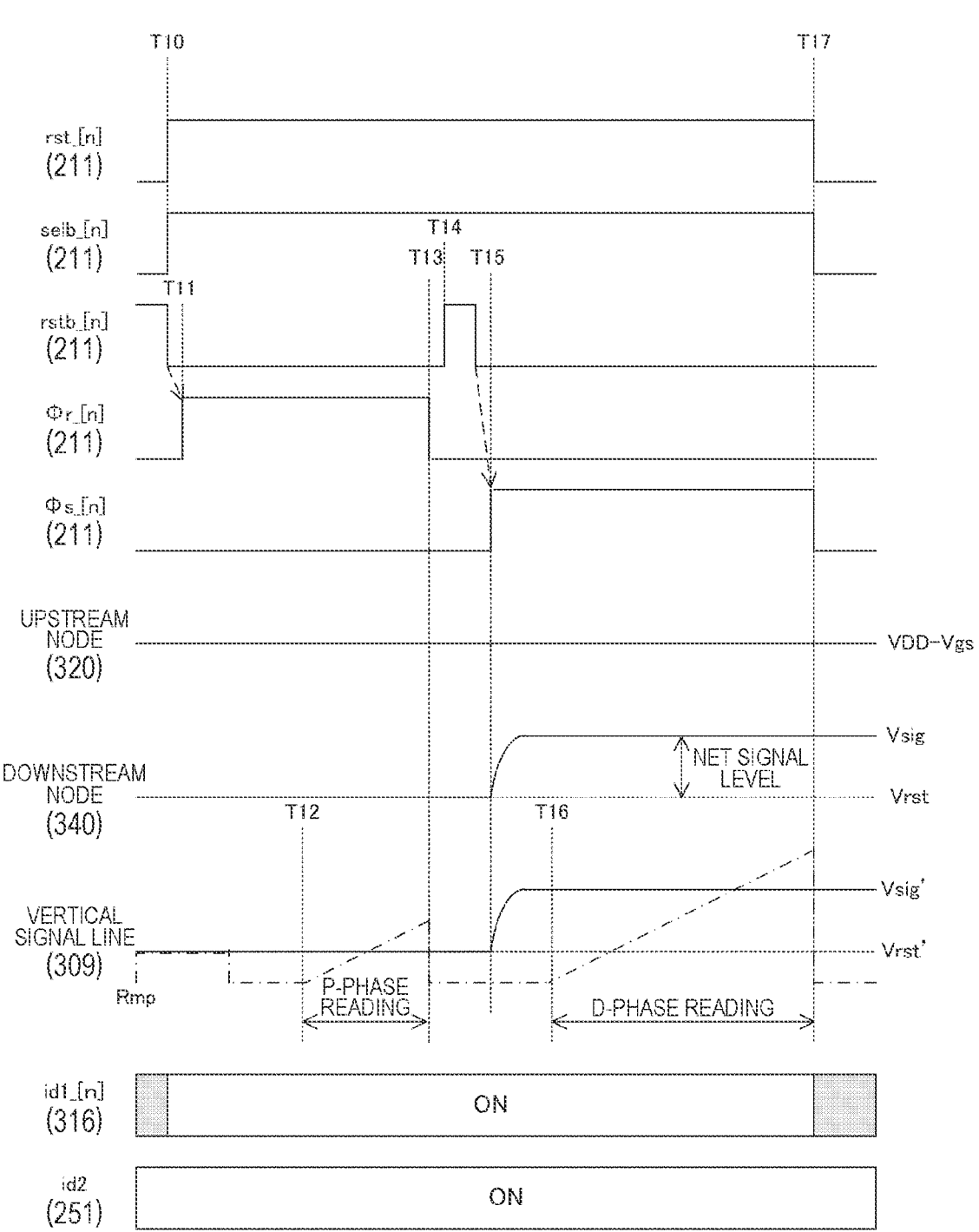
FIG. 6 is a timing chart depicting an example of a reading operation in the first embodiment of the present technology.

FIG. 6 is a timing chart depicting an example of a reading operation in the first embodiment of the present technology. The vertical scanning circuit 211 sets the FD reset signal rst and the downstream selection signal selb of the n-th row to the high level in the reading period of the n-th row from a timing T10 to a timing T17. Furthermore, the downstream reset signals rstb of all the rows are controlled to the low level in the reading period. Here, selb_[n] in the drawing indicates a signal with respect to the pixels in the n-th row.

The vertical scanning circuit 211 supplies the high-level selection signal Φr to the n-th row over a period from a timing T11 immediately after the timing T10 to a timing T13. The potential of the downstream node 340 becomes the reset level Vrst.

The DAC 213 gradually increases a ramp signal Rmp over a period from the timing T12 to the timing T13 after the timing T11. The ADC 261 compares the ramp signal Rmp with a level Vrst' of the vertical signal line 309, and counts a count value until a comparison result is inverted. Therefore, a P-phase level (reset level) is read.

The vertical scanning circuit 211 supplies a high-level downstream reset signal rstb to the n-th row over a pulse period from the timing T14 immediately after the timing T13. Therefore, when a parasitic capacitance exists in the downstream node 340, a history of a previous signal held in the parasitic capacitance can be erased.

The vertical scanning circuit 211 supplies the high-level selection signal Φs to the n-th row over a period from a timing T15 immediately after the initialization of the downstream node 340 to a timing T17. The potential of the downstream node 340 becomes the signal level Vsig. Although the signal level is lower than the reset level at the time of exposure, the signal level is higher than the reset level at the time of reading since the downstream node 340 is used as a reference. A difference between the reset level Vrst and the signal level Vsig corresponds to a net signal level from which reset noise and offset noise of the FD have been removed.

The DAC 213 gradually increases a ramp signal Rmp over a period from the timing T16 to the timing T17 after the timing T15. The ADC 261 compares the ramp signal Rmp with a level Vrst' of the vertical signal line 309, and counts a count value until a comparison result is inverted. Therefore, a D-phase level (signal level) is read.

Furthermore, the vertical scanning circuit 211 controls the current source transistor 316 of the n-th row to be read over a period from the timing T10 to the timing T17 to supply the current id1. Furthermore, the timing control circuit 212 controls the load MOS transistors 251 of all columns to supply the current id2 in a reading period of all the rows.

Figure 7:
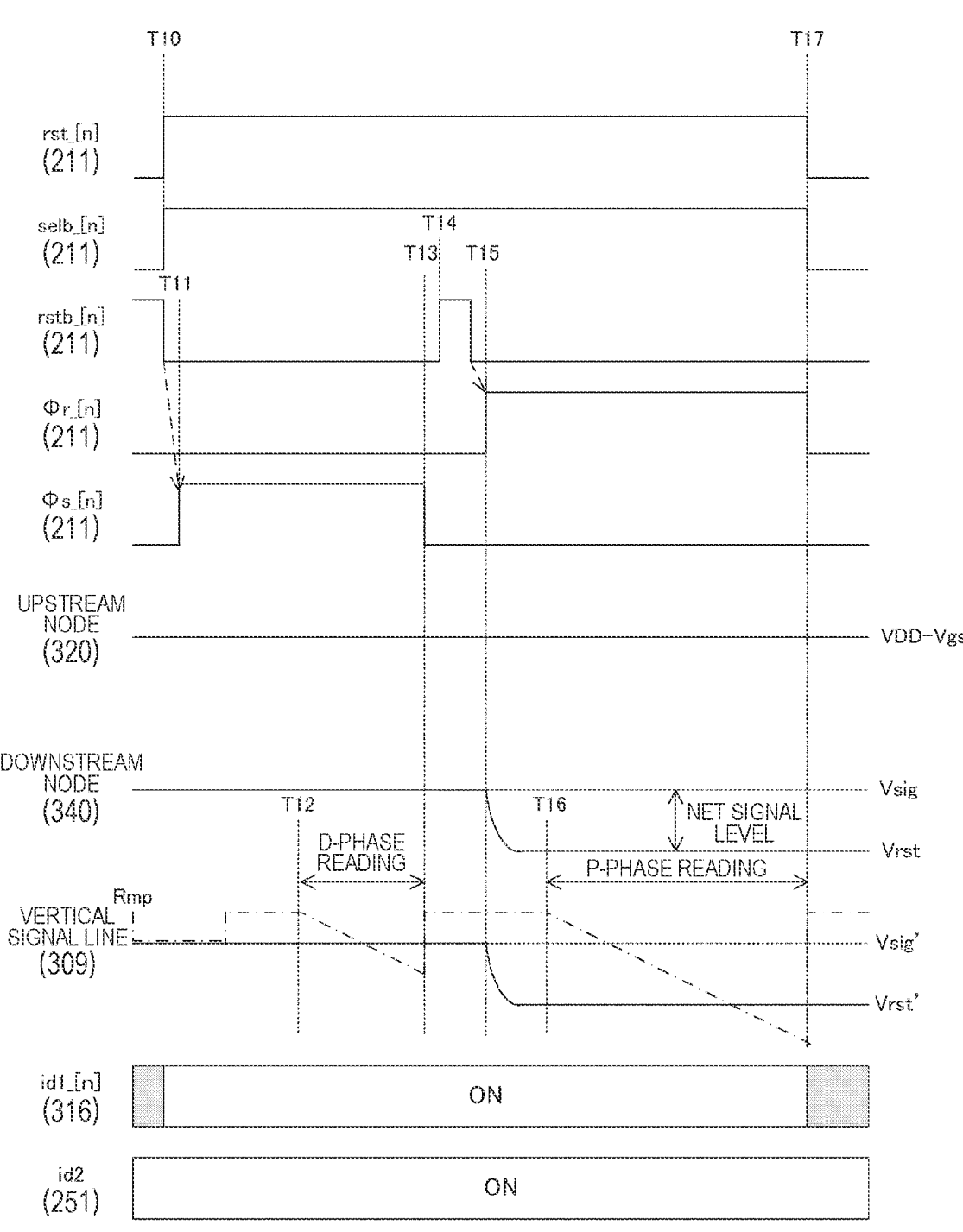
FIG. 7 is a timing chart depicting another example of the reading operation in the first embodiment of the present technology.

Incidentally, the solid-state imaging element 200 reads the signal level after the reset level, but is not limited to this order. As illustrated in FIG. 7, the solid-state imaging element 200 can also read the reset level after the signal level. In this case, the vertical scanning circuit 211 supplies the high-level selection signal Φr after the high-level selection signal Φs as illustrated in the drawing. Furthermore, it is necessary to reverse an inclination of a slope of the ramp signal in this case.

Figure 8:
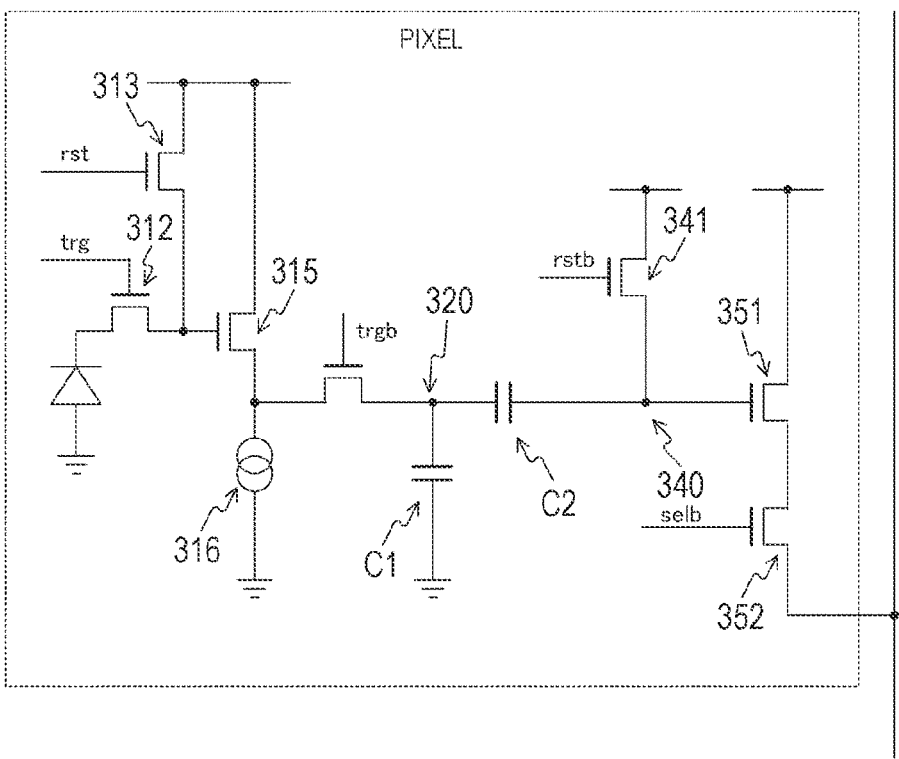
FIG. 8 is a circuit diagram depicting a configuration example of a pixel in a comparative example.

FIG. 8 is a circuit diagram depicting a configuration example of a pixel in a comparative example. In this comparative example, no selection circuit 330 is provided, and a transfer transistor is inserted between an upstream node 320 and an upstream circuit. Furthermore, capacitors C1 and C2 are inserted instead of the capacitive elements 321 and 322. The capacitor C1 is inserted between the upstream node 320 and a ground terminal, and the capacitor C2 is inserted between the upstream node 320 and a downstream node 340.

Exposure control and reading control of the pixel in this comparative example are described in FIG. 5.5.2 of Non-Patent Document 1, for example. Assuming that a capacitance value of each of the capacitors C1 and C2 is C in this comparative example, a level Vn of kTC noise at the time of exposure and reading is expressed by the following formula.

$$Vn = (3*kT/C)^{1/2} \qquad \text{Formula 1}$$

In the above formula, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

Figure 9:
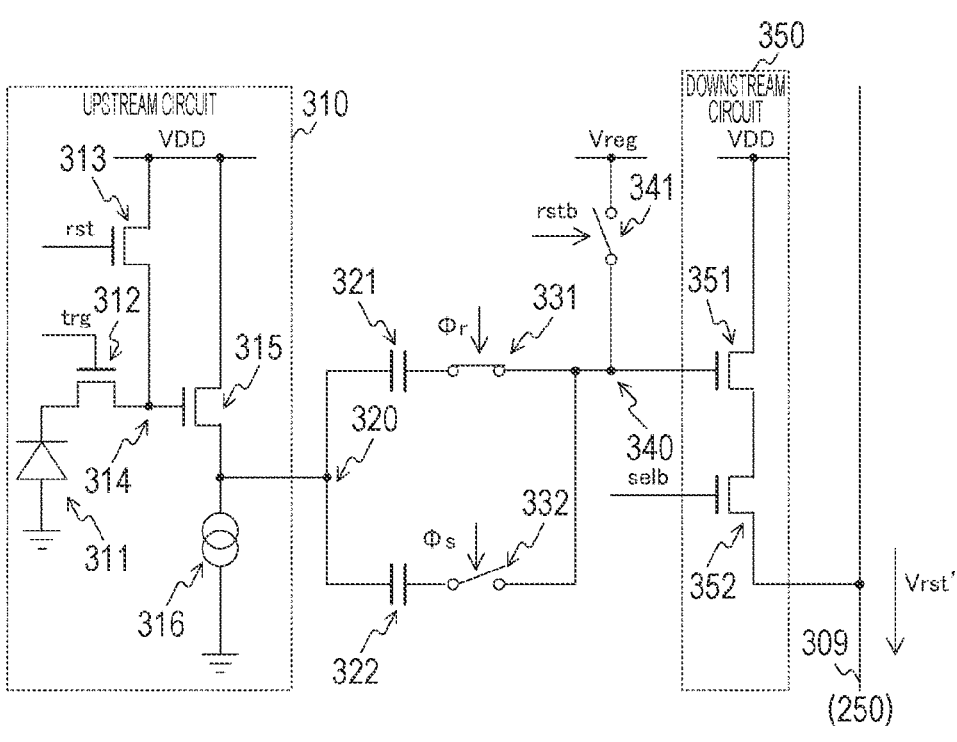
FIG. 9 is a diagram depicting examples of states of the pixel at the time of reading a reset level and at the time of initializing a downstream node in the first embodiment of the present technology.
Figure 9:
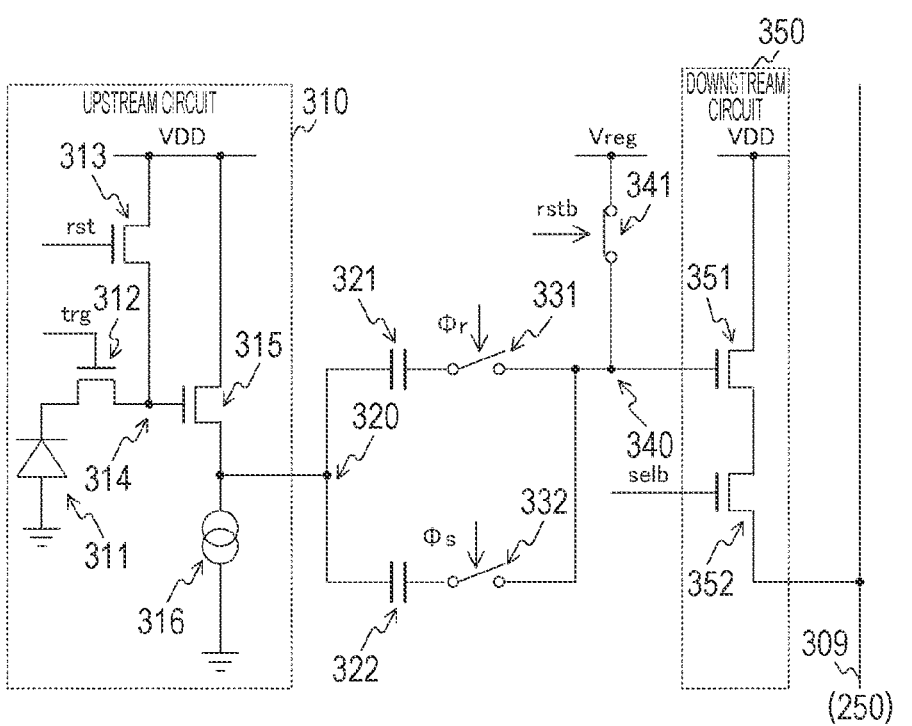

FIG. 9 is a diagram depicting examples of states of the pixel at the time of reading the reset level and at the time of initializing the downstream node in the first embodiment of the present technology. In the drawing, a indicates the state of the pixel 300 at the time of reading the reset level, and b in the drawing indicates the state of the pixel 300 at the time of initializing the downstream node 340. Furthermore, in the drawing, the selection transistor 331, the selection transistor 332, and the downstream reset transistor 341 are represented by graphical symbols of switches for convenience of the description.

As illustrated in a of the drawing, the vertical scanning circuit 211 sets the selection transistor 331 in a closed state and sets the selection transistor 332 and the downstream reset transistor 341 in the open state. Therefore, the reset level is read via the downstream circuit 350.

After reading the reset level, the vertical scanning circuit 211 sets the selection transistor 331 and the selection transistor 332 in the open state and sets the downstream reset transistor 341 in the closed state as illustrated in b of the drawing. Therefore, the capacitive elements 321 and 322 are disconnected from the downstream node 340, and the level of the downstream node 340 is initialized.

A capacitance value of a parasitic capacitance Cp of the downstream node 340 in the state of being disconnected from the capacitive elements 321 and 322 in this manner is set to be extremely smaller than those of the capacitive elements 321 and 322. For example, assuming that the parasitic capacitance Cp is several femtofarads (fF), the capacitive elements 321 and 322 are on the order of several tens of femtofarads.

Figure 10:
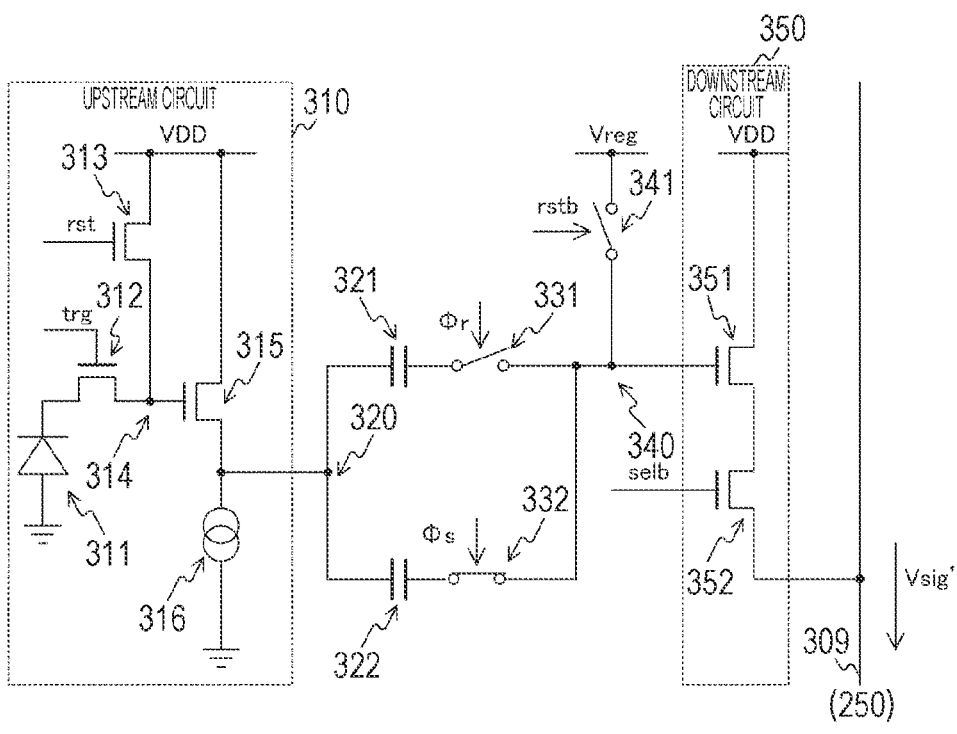
FIG. 10 is a diagram depicting an example of a state of the pixel at the time of reading a signal level in the first embodiment of the present technology.

FIG. 10 is a diagram depicting an example of a state of the pixel 300 at the time of reading the signal level in the first embodiment of the present technology.

After the initialization of the downstream node 340, the vertical scanning circuit 211 sets the selection transistor 332 in the closed state and sets the selection transistor 331 and the downstream reset transistor 341 in the open state. Therefore, the signal level is read via the downstream circuit 350.

Here, kTC noise at the time of exposing the pixel 300 is considered. At the time of exposure, the kTC noise occurs in each of sampling of the reset level and sampling of the signal level immediately before the exposure end. Assuming that a capacitance value of each of the capacitive elements 321 and

322 is C, the level Vn of the kTC noise at the time of exposure is expressed by the following formula.

$$Vn = (2*kT/C)^{1/2} \qquad \text{Formula 2}$$

Furthermore, the downstream reset transistor 341 is driven at the time of reading as illustrated in FIGS. 9 and 10, and thus, the kTC noise occurs at that time. However, the capacitive elements 321 and 322 are disconnected at the time of driving the downstream reset transistor 341, and the parasitic capacitance Cp at that time is small. Therefore, the kTC noise at the time of reading can be ignored as compared with the kTC noise at the time of exposure. Therefore, the kTC noise at the time of exposure and reading is expressed by Formula 2.

From Formulas 1 and 2, the kTC noise in the pixel 300 in which the capacitor is disconnected at the time of reading is smaller than that in the comparative example in which the capacitor is not disconnectable at the time of reading. Therefore, the image quality of image data can be improved.

Figure 11:
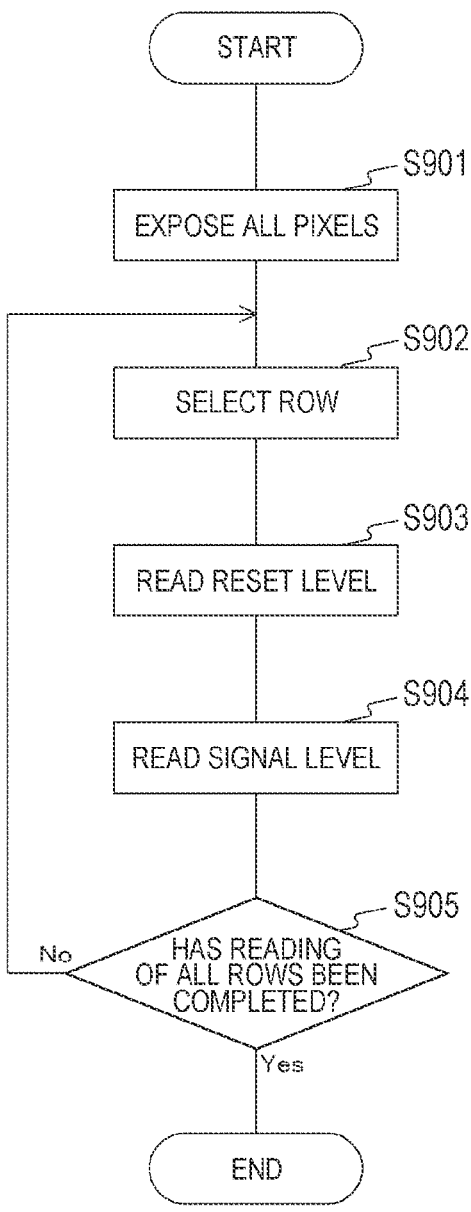
FIG. 11 is a flowchart depicting an example of an operation of the solid-state imaging element in the first embodiment of the present technology.

FIG. 11 is a flowchart depicting an example of an operation of the solid-state imaging element 200 in the first embodiment of the present technology. This operation is started, for example, when a predetermined application for imaging image data is executed.

The vertical scanning circuit 211 exposes all the pixels (step S901). Then, the vertical scanning circuit 211 selects a row to be read (step S902). The column signal processing circuit 260 reads the reset level of the row (step S903), and then reads the signal level (step S904).

The solid-state imaging element 200 determines whether or not reading of all rows has been completed (step S905). In a case where the reading of all the rows has not been completed (Step S905: No), the solid-state imaging element 200 repeats Step S902 and the subsequent steps. On the other hand, in a case where the reading of all the rows has been completed (step S905: Yes), the solid-state imaging element 200 executes CDS processing or the like, and ends the operation for imaging. In a case where a plurality of pieces of image data is continuously imaged, steps S901 to S905 are repeatedly executed in synchronization with the vertical synchronization signal.

In this manner, the downstream reset transistor 341 initializes the downstream node 340 when the selection circuit 330 disconnects the capacitive elements 321 and 322 from the downstream node 340 in the first embodiment of the present technology. Since the capacitive elements 321 and 322 are disconnected, a level of reset noise caused by driving thereof becomes a level corresponding to a parasitic capacitance smaller than capacitances thereof. This noise reduction can improve the image quality of image data.

First Modification

Although the upstream circuit 310 reads a signal in the state of being connected to the upstream node 320 in the first embodiment described above, it is difficult to block noise from the upstream node 320 at the time of reading in this configuration. The pixel 300 of a first modification of the first embodiment is different from that of the first embodiment in that a transistor is inserted between the upstream circuit 310 and the upstream node 320.

Figure 12:
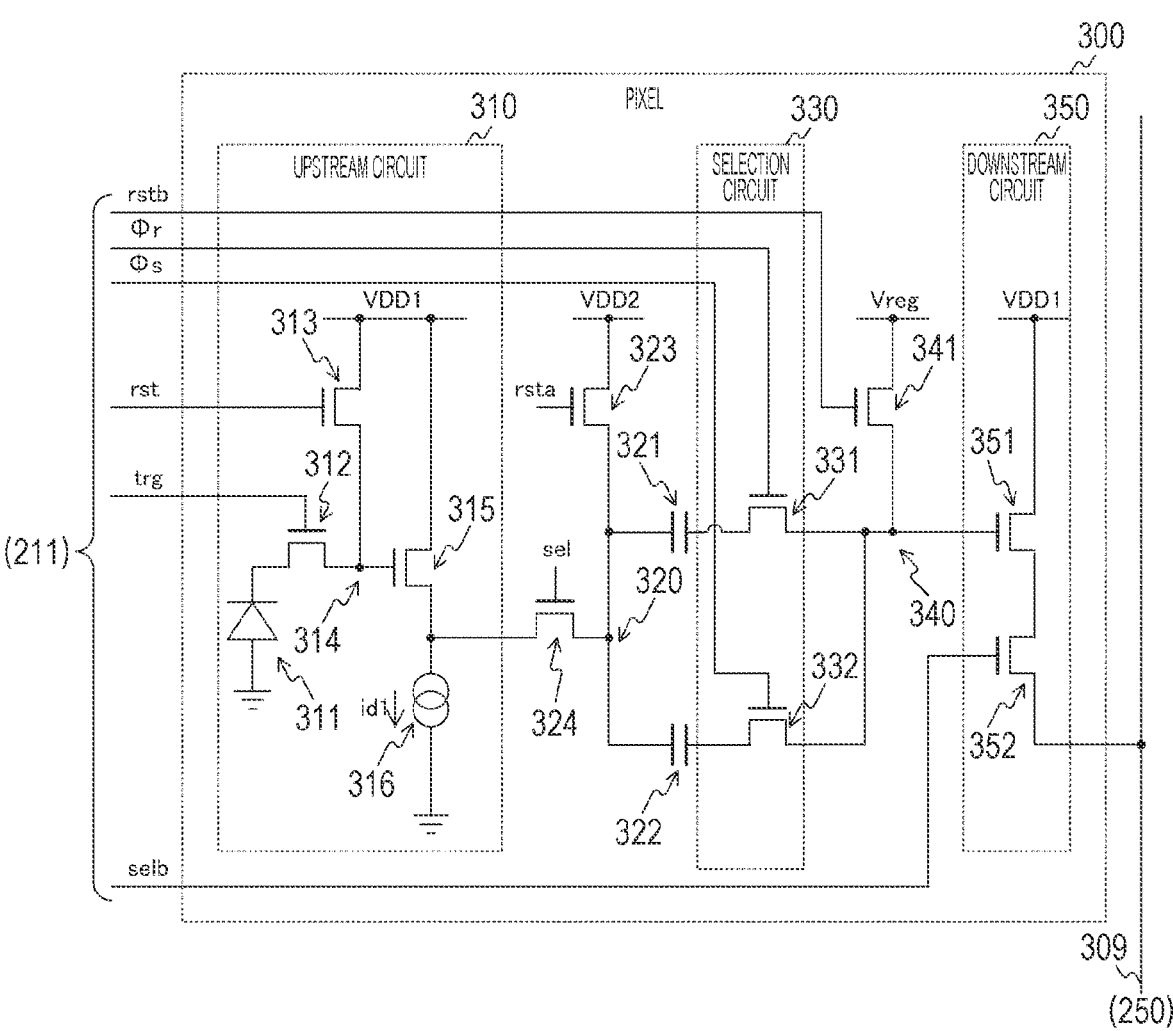
FIG. 12 is a circuit diagram depicting a configuration example of a pixel in a first modification of the first embodiment of the present technology.

FIG. 12 is a circuit diagram depicting a configuration example of the pixel 300 in the first modification of the first embodiment of the present technology. The pixel 300 of the first modification of the first embodiment is different from that of the first embodiment in terms of further including an upstream reset transistor 323 and an upstream selection transistor 324. Furthermore, a power supply voltage for the upstream circuit 310 and the downstream circuit 350 of the first modification of the first embodiment is VDD1.

The upstream reset transistor 323 initializes a level of the upstream node 320 with a power supply voltage VDD2. The power supply voltage VDD2 is desirably set to a value satisfying the following formula.

$$VDD2 = VDD1 - Vgs \qquad \text{Formula 3}$$

In the above formula, Vgs represents a gate-source voltage of the upstream amplification transistor 315.

When the value satisfying Formula 3 is set, it is possible to reduce a potential variation between the upstream node 320 and the downstream node 340 in the dark. Therefore, photo response non-uniformity (PRNU) can be improved.

The upstream selection transistor 324 opens and closes a path between the upstream circuit 310 and the upstream node 320 in accordance with an upstream selection signal sel from the vertical scanning circuit 211.

Figure 13:
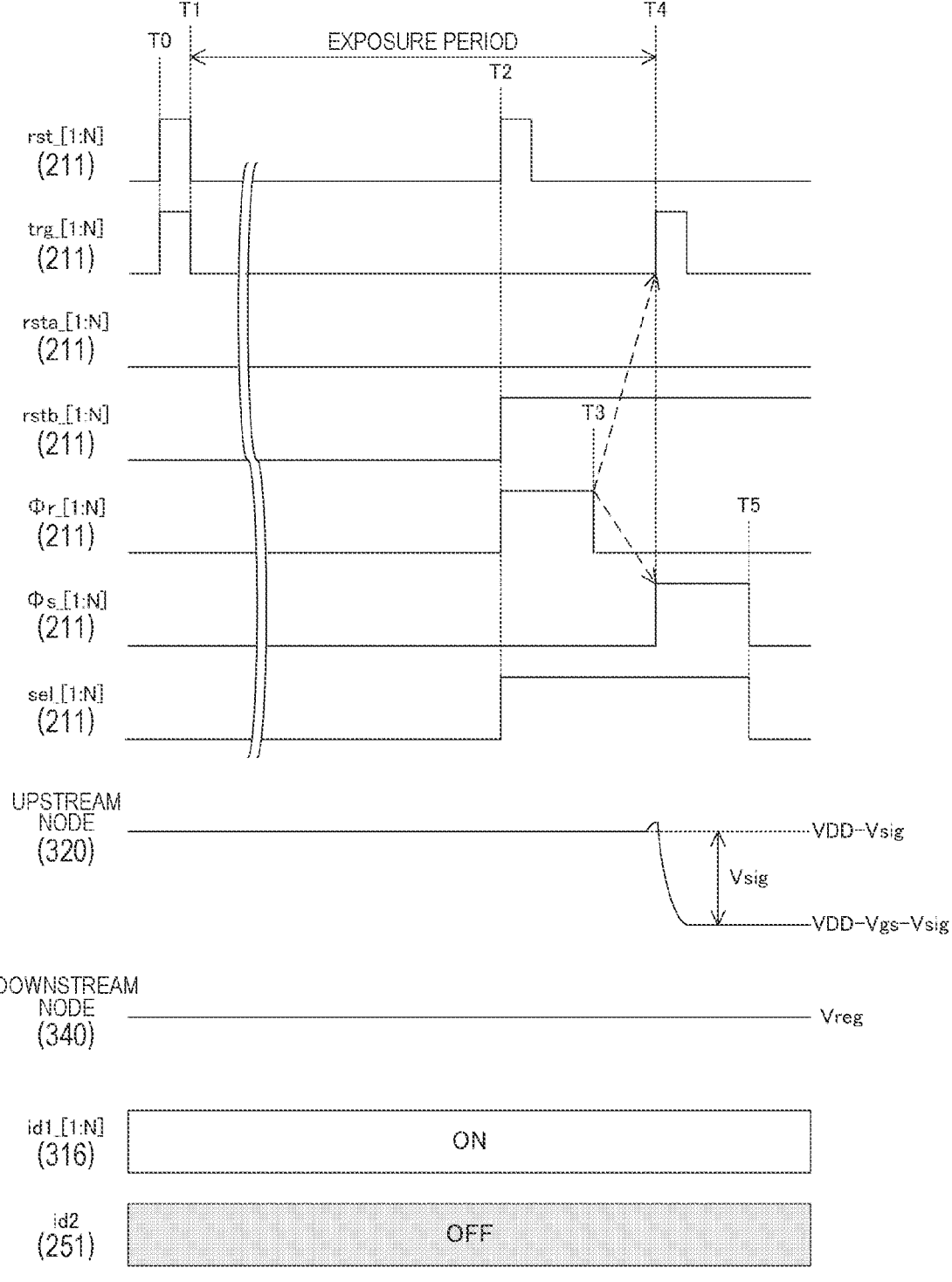
FIG. 13 is a timing chart depicting an example of a global shutter operation in the first modification of the first embodiment of the present technology.

FIG. 13 is a timing chart depicting an example of a global shutter operation in the first modification of the first embodiment of the present technology. The timing chart of the first modification of the first embodiment is different from that of the first embodiment in that the vertical scanning circuit 211 further supplies an upstream reset signal rsta and an upstream selection signal sel. In the drawing, rsta_[n] and sel_[n] indicate signals with respect to pixels of the n-th row.

The vertical scanning circuit 211 supplies the high-level upstream selection signal sel to all the pixels from a timing T2 immediately before the end of exposure to a timing T5. The upstream reset signal rsta is controlled to a low level.

Figure 14:
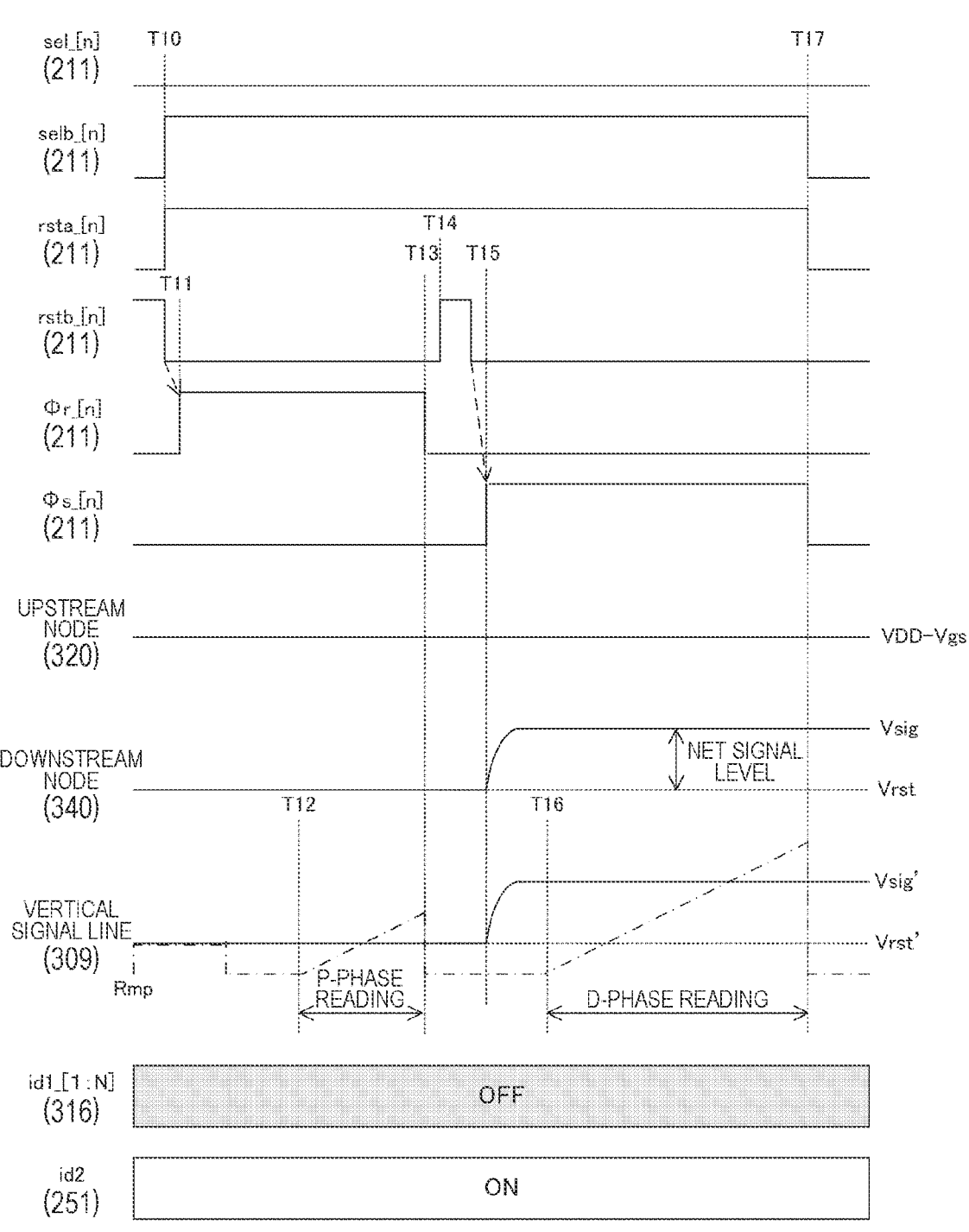
FIG. 14 is a timing chart depicting an example of a reading operation in the first modification of the first embodiment of the present technology.

FIG. 14 is a timing chart depicting an example of a reading operation in the first modification of the first embodiment of the present technology. At the time of reading each row, the upstream selection signal sel is controlled to the low level. This control causes the upstream selection transistor 324 to transition to an open state, and the upstream node 320 is disconnected from the upstream circuit 310. Therefore, it is possible to block noise from the upstream node 320 at the time of reading.

Furthermore, in a reading period of the n-th row from a timing T10 to a timing T17, the vertical scanning circuit 211 supplies the high-level upstream reset signal rsta to the n-th row.

Furthermore, the vertical scanning circuit 211 controls the current source transistors 316 of all the pixels to stop supply of the current id1 at the time of reading. The current id2 is supplied similarly to the first embodiment. In this manner, the control of the current id1 is simplified as compared with the first embodiment.

In this manner, the upstream selection transistor 324 transitions to the open state at the time of reading, and the upstream circuit 310 is disconnected from the upstream node 320, so that noise from the upstream circuit 310 can be blocked according to the first modification of the first embodiment of the present technology.

Second Modification

Although the circuits in the solid-state imaging element 200 are provided on the single semiconductor chip in the first embodiment described above, there is a possibility that the elements do not fit in the semiconductor chip when the pixel 300 is miniaturized in this configuration. The solid-state imaging element 200 of a second modification of the first embodiment is different from that of the first embodiment in that circuits in the solid-state imaging element 200 are dispersedly arranged on two semiconductor chips.

Figure 15:
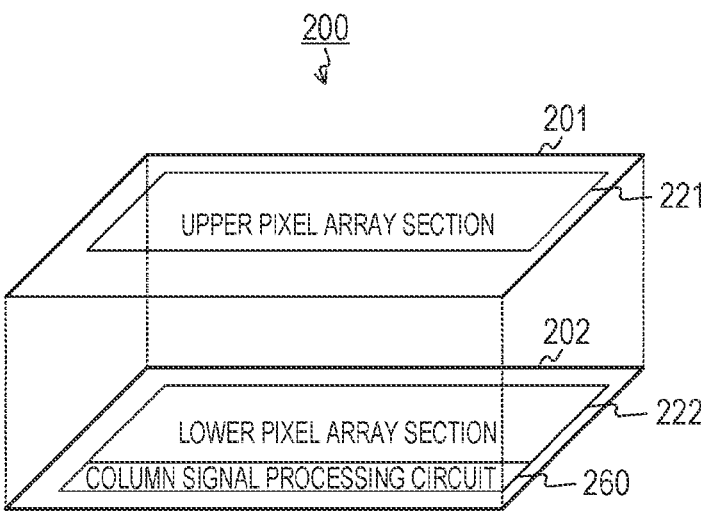
FIG. 15 is a diagram depicting an example of a stacked structure of a solid-state imaging element in a second modification of the first embodiment of the present technology.

FIG. 15 is a diagram depicting an example of a stacked structure of the solid-state imaging element 200 in the second modification of the first embodiment of the present technology. The solid-state imaging element 200 in the second modification of the first embodiment includes a lower pixel chip 202 and an upper pixel chip 201 stacked on the lower pixel chip 202. These chips are electrically connected by, for example, Cu—Cu bonding. Incidentally, the connection can be made by a via or a bump other than the Cu—Cu bonding.

An upper pixel array section 221 is arranged on the upper pixel chip 201. A lower pixel array section 222 and the column signal processing circuit 260 are arranged on the lower pixel chip 202. For each pixel in the pixel array section 220, a part thereof is arranged in the upper pixel array section 221, and the remaining part is arranged in the lower pixel array section 222.

Furthermore, the vertical scanning circuit 211, the timing control circuit 212, the DAC 213, and the load MOS circuit block 250 are also arranged on the lower pixel chip 202. These circuits are not illustrated in the drawing.

Furthermore, the upper pixel chip 201 is manufactured, for example, by a pixel-dedicated process, and the lower pixel chip 202 is manufactured, for example, by a complementary MOS (CMOS) process. Incidentally, the upper pixel chip 201 is an example of a first chip described in the claims, and the lower pixel chip 202 is an example of a second chip described in the claims.

Figure 16:
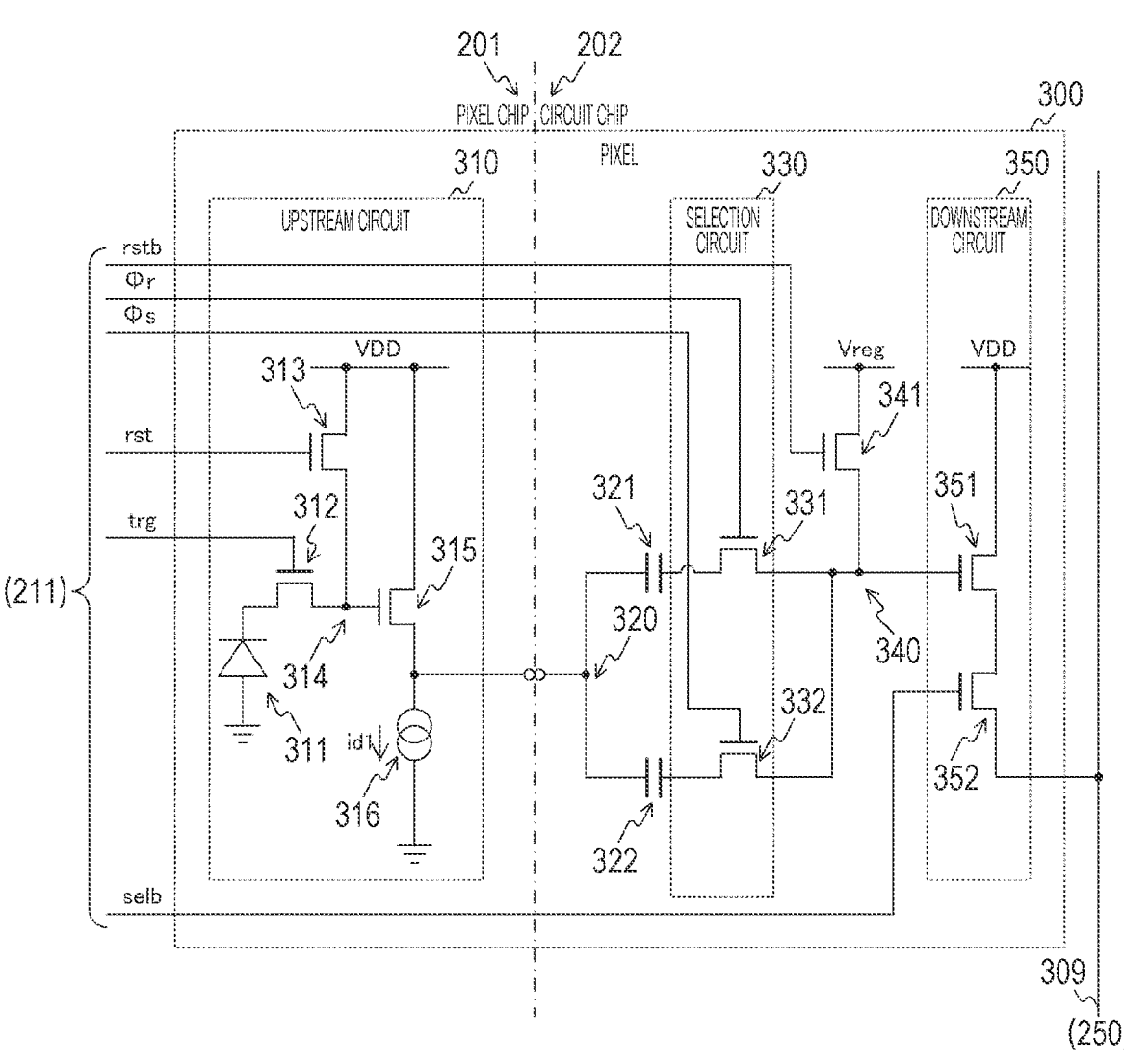
FIG. 16 is a circuit diagram depicting a configuration example of a pixel in the second modification of the first embodiment of the present technology.

FIG. 16 is a circuit diagram depicting a configuration example of the pixel 300 in the second modification of the first embodiment of the present technology. In the pixel 300, the upstream circuit 310 is arranged on the upper pixel chip 201, and the other circuits and elements (such as the capacitive elements 321 and 322) are arranged on the lower pixel chip 202. Incidentally, the current source transistor 316 can be further arranged on the lower pixel chip 202. Since the elements in the pixel 300 are dispersedly arranged on the stacked upper pixel chip 201 and lower pixel chip 202 as illustrated in the drawing, the area of a pixel can be reduced, and miniaturization of the pixel is facilitated.

In this manner, since the circuits and elements in the pixel 300 are dispersedly arranged on the two semiconductor chips according to the second modification of the first embodiment of the present technology, the miniaturization of the pixel is facilitated.

Third Modification

In the second modification of the first embodiment described above, a part of the pixel 300 and a peripheral circuit (such as the column signal processing circuit 260) are provided on the lower pixel chip 202 on the lower side. However, in this configuration, the arrangement area of the circuits and elements on the lower pixel chip 202 side is larger than that of the upper pixel chip 201 by the peripheral circuit, and there is a possibility that an unnecessary space including no circuit and element is generated in the upper pixel chip 201. The solid-state imaging element 200 of a third modification of the first embodiment is different from that of the second modification of the first embodiment in that circuits in the solid-state imaging element 200 are dispersedly arranged on three semiconductor chips.

Figure 17:
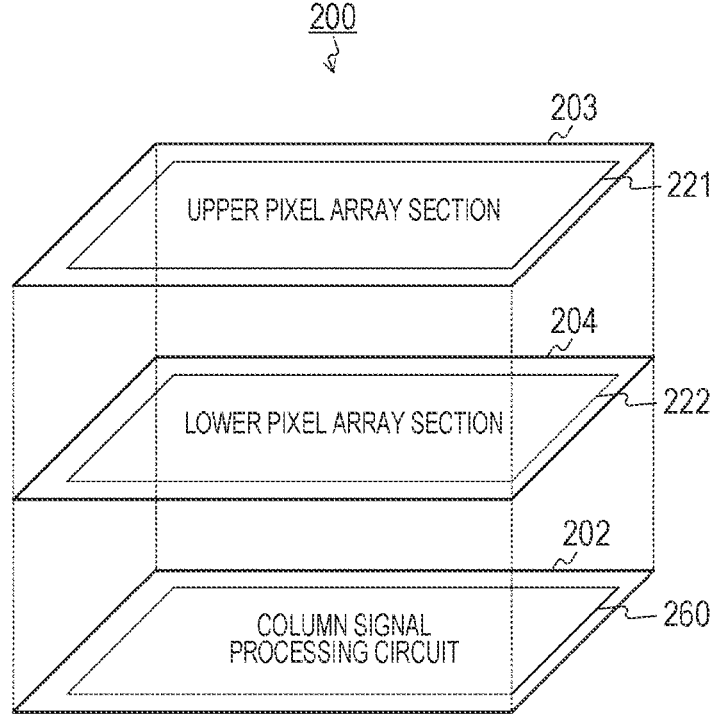
FIG. 17 is a diagram depicting an example of a stacked structure of a solid-state imaging element in a third modification of the first embodiment of the present technology.

FIG. 17 is a diagram depicting an example of a stacked structure of the solid-state imaging element 200 in the third modification of the first embodiment of the present technology. The solid-state imaging element 200 of the third modification of the first embodiment includes the upper pixel chip 201, the lower pixel chip 202, and a circuit chip 203. These chips are stacked and electrically connected by, for example, Cu—Cu bonding. Incidentally, the connection can be made by a via or a bump other than the Cu—Cu bonding.

An upper pixel array section 221 is arranged on the upper pixel chip 201. The lower pixel array section 222 is arranged on the lower pixel chip 202. For each pixel in the pixel array section 220, a part thereof is arranged in the upper pixel array section 221, and the remaining part is arranged in the lower pixel array section 222.

Furthermore, the column signal processing circuit 260, the vertical scanning circuit 211, the timing control circuit 212, the DAC 213, and the load MOS circuit block 250 are arranged on the circuit chip 203. Circuits other than the column signal processing circuit 260 are not illustrated in the drawing.

Incidentally, the upper pixel chip 201 is an example of a first chip described in the claims, and the lower pixel chip 202 is an example of a second chip described in the claims. The circuit chip 203 is an example of a third chip described in the claims.

Since the three-layer configuration as illustrated in the drawing is adopted, it is possible to reduce the unnecessary space and further miniaturize a pixel as compared with the two-layer configuration. Furthermore, the lower pixel chip 204 on the second layer can be manufactured by a dedicated process for a capacitor or a switch.

In this manner, since the circuits in the solid-state imaging element 200 are dispersedly arranged on the three semiconductor chips in the third modification of the first embodiment of the present technology, the pixel can be further miniaturized as compared with a case where the circuits are dispersedly arranged on two semiconductor chips.

2. Second Embodiment

Although the reset level is sampled and held in the exposure period in the first embodiment described above, it is difficult to set the exposure period to be shorter than a sample-and-hold period of the reset level in this configuration. The solid-state imaging element 200 of a second embodiment is different from that of the first embodiment in that an exposure period is further shortened by adding a transistor that discharges a charge from a photoelectric conversion element.

Figure 18:
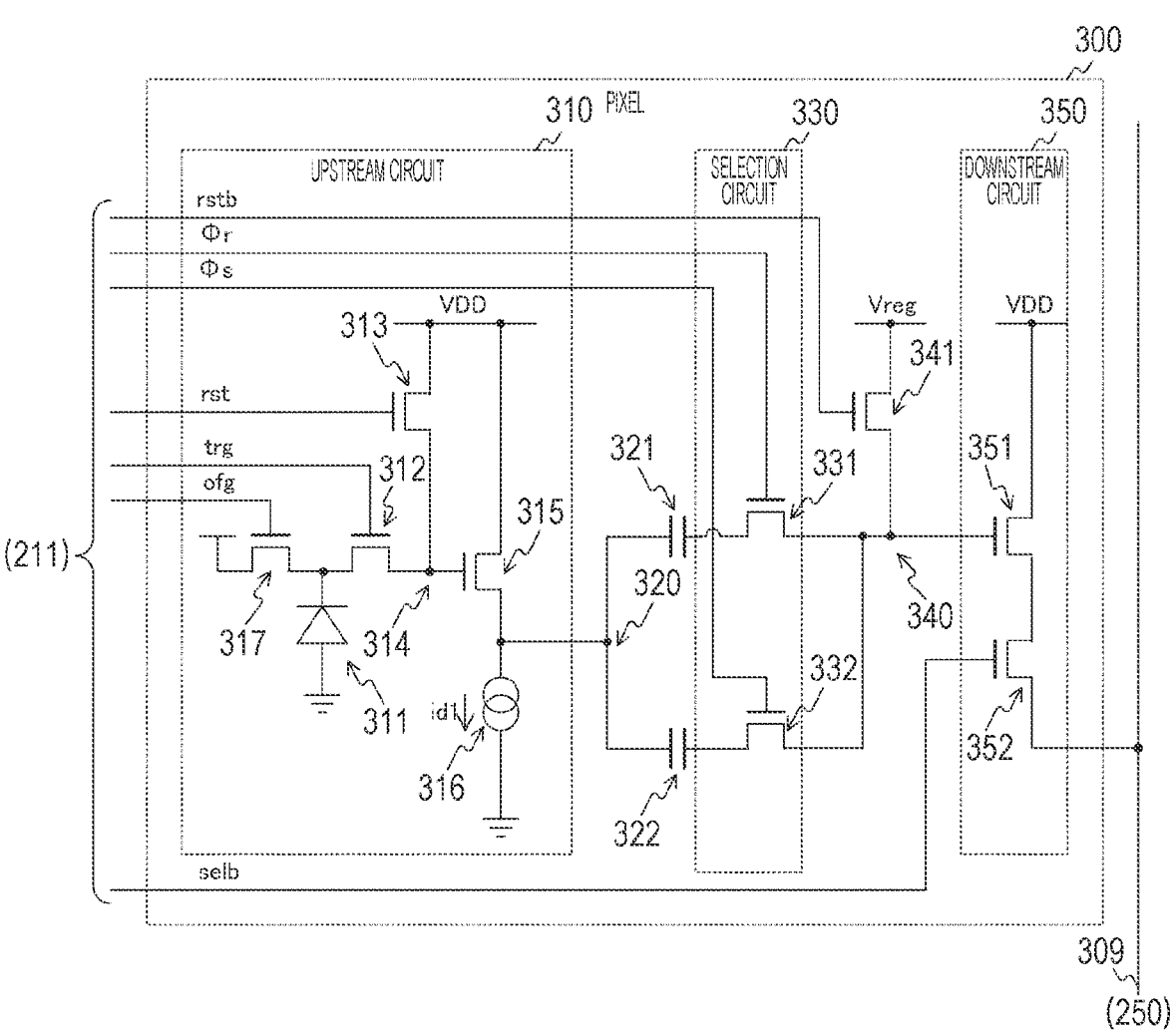
FIG. 18 is a circuit diagram depicting a configuration example of a pixel in a second embodiment of the present technology.

FIG. 18 is a circuit diagram depicting a configuration example of the pixel 300 in the second embodiment of the present technology. The pixel 300 of the second embodiment is different from that of the first embodiment in that a discharge transistor 317 is further provided in the upstream circuit 310.

The discharge transistor 317 functions as an overflow drain that discharges a charge from the photoelectric conversion element 311 in accordance with a discharge signal ofg from the vertical scanning circuit 211. As the discharge transistor 317, for example, an nMOS transistor is used.

In the configuration in which the discharge transistor 317 is not provided as in the first embodiment, blooming may occur when the charge is transferred from the photoelectric conversion element 311 to the FD 314 for all pixels. Then, potentials of the FD 314 and the upstream node 320 decrease at the time of FD reset. Following the potential decrease, a current for charging and discharging the capacitive elements 321 and 322 continues to be generated, and IR drop of the power supply or the ground changes from a steady state where no blooming occurs.

On the other hand, when the signal levels of all the pixels are sampled and held, there is no charge in the photoelectric conversion element 311 after the transfer of the signal charge, so that the blooming does not occur, and the IR drop of the power supply or the ground is turned into the steady state where no blooming occurs. Streaking noise is generated due to a difference in the IR drop between the time of sampling and holding the reset level and at the time of sampling and holding the signal level.

On the other hand, the charge of the photoelectric conversion element 311 is discharged to the overflow drain side in the second embodiment in which the discharge transistor 317 is provided. Therefore, substantially the same IR drop occurs at the time of sampling and holding the reset level and at the time of sampling and holding the signal level, and the streaking noise can be suppressed.

Figure 19:
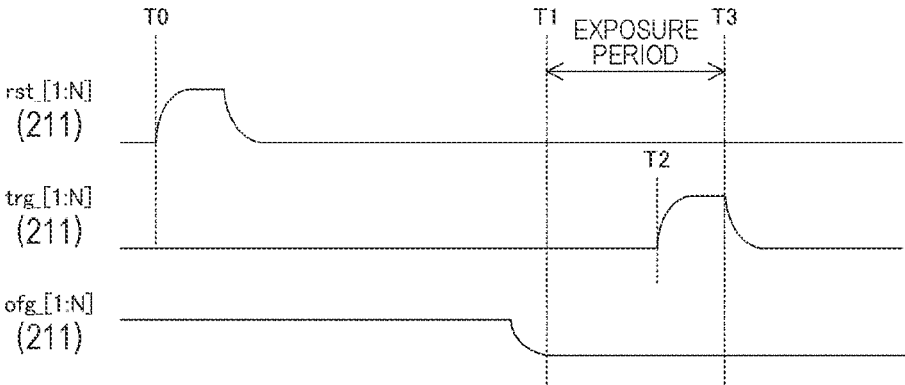
FIG. 19 is a timing chart depicting an example of a global shutter operation in the second embodiment of the present technology.

FIG. 19 is a timing chart depicting an example of a global shutter operation in the second embodiment of the present technology. At a timing T0 before an exposure start timing, the vertical scanning circuit 211 supplies high-level FD reset signals rst to all the pixels over a pulse period while setting the discharge signals ofg of all the pixels to a high level. Therefore, PD reset and FD reset are performed on all the pixels. Furthermore, the reset level is sampled and held. Here, ofg_[n] in the drawing indicates a signal with respect to the pixel of the n-th row among the N rows.

Then, the vertical scanning circuit 211 returns the discharge signals ofg of all the pixels to a low level at the exposure start timing T1. Then, the vertical scanning circuit 211 supplies high-level transfer signals trg to all the pixels over a period from a timing T2 immediately before the exposure end to an exposure end timing T3. Therefore, the signal level is sampled and held.

In the configuration in which the discharge transistor 317 is not provided as in the first embodiment, both the transfer transistor 312 and the FD reset transistor 313 need to be turned on at the start of the exposure (that is, at the time of the PD reset). In this control, it is necessary to reset the FD 314 at the same time at the time of the PD reset. Therefore, it is necessary to perform the FD reset again in an exposure period and to sample and hold the reset level, and it is difficult to set the exposure period to be shorter than the sample-and-hold period of the reset level. When the reset levels of all the pixels are sampled and held, a certain waiting time is required until a voltage or a current settles and for example, the sample-and-hold period of several microseconds (μs) to several tens of microseconds (μs) is required.

On the other hand, the PD reset and the FD reset can be individually performed in the second embodiment in which the discharge transistor 317 is provided. Therefore, the reset level can be sampled and held by performing the FD reset before cancellation of the PD reset (exposure start) as illustrated in the drawing. Therefore, the exposure period can be set to be shorter than the sample-and-hold period of the reset level.

Incidentally, the first to third modifications of the first embodiment can also be applied to the second embodiment.

In this manner, since the discharge transistor 317 that discharges the charge from the photoelectric conversion element 311 is provided according to the second embodiment of the present technology, it is possible to sample and hold the reset level by performing the FD reset before the exposure starts. Therefore, the exposure period can be set to be shorter than the sample-and-hold period of the reset level.

3. Third Embodiment

Although the FD 314 is initialized by the power supply voltage VDD in the first embodiment described above, but there is a possibility that photo response non-uniformity (PRNU) deteriorates due to variations in the capacitive elements 321 and 322 or parasitic capacitance in this configuration. The solid-state imaging element 200 of a third embodiment is different from that of the first embodiment in terms of improving the PRNU by decreasing the power supply of the FD reset transistor 313 at the time of reading.

Figure 20:
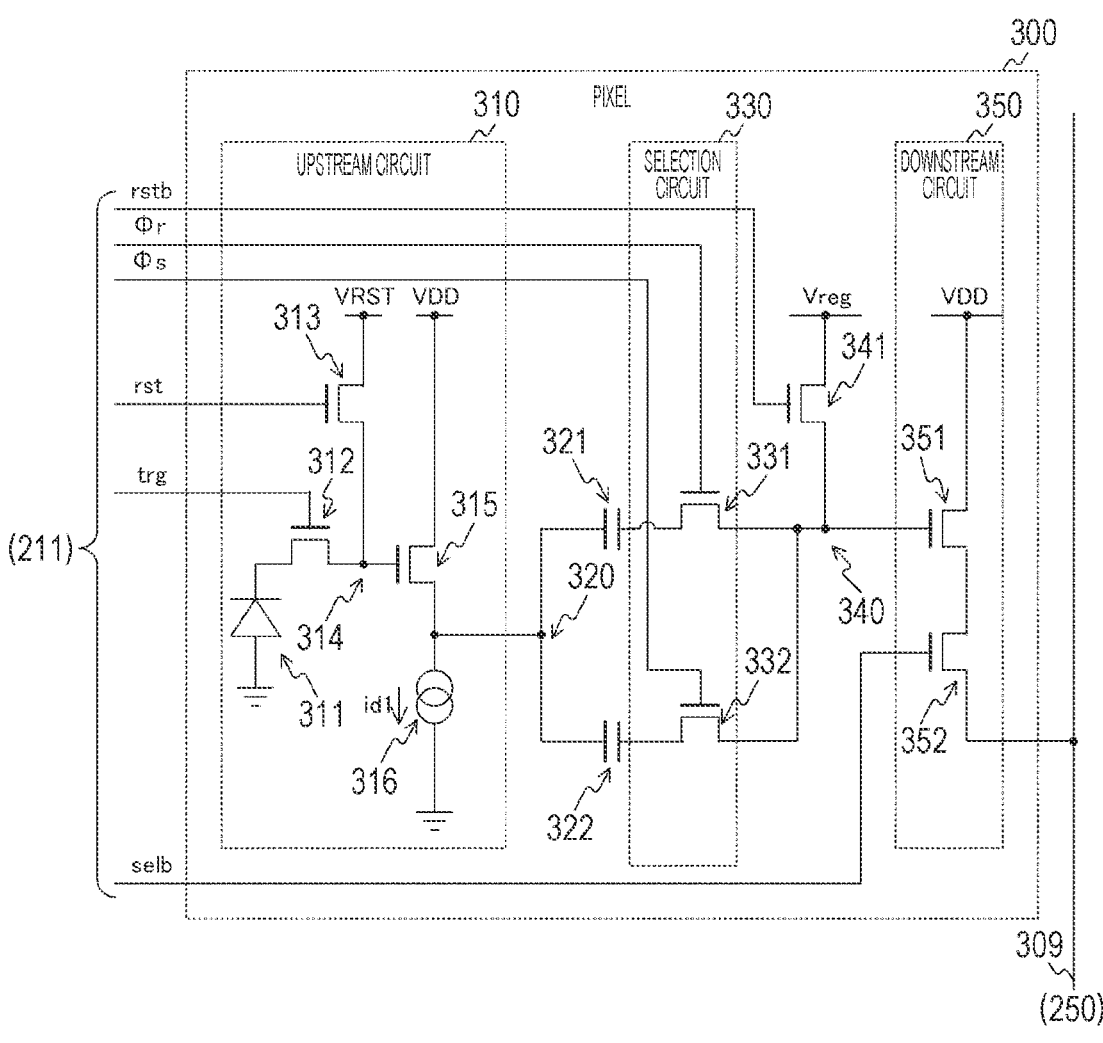
FIG. 20 is a circuit diagram depicting a configuration example of a pixel in a third embodiment of the present technology.

FIG. 20 is a circuit diagram depicting a configuration example of the pixel 300 in the third embodiment of the present technology. The pixel 300 of the third embodiment is different from that of the first embodiment in that the power supply of the FD reset transistor 313 is disconnected from the power supply voltage VDD of the pixel 300.

A drain of the FD reset transistor 313 of the third embodiment is connected to a reset power supply voltage VRST. The reset power supply voltage VRST is controlled by, for example, the timing control circuit 212. Incidentally, the timing control circuit 212 is an example of a control circuit described in the claims.

Figure 21:
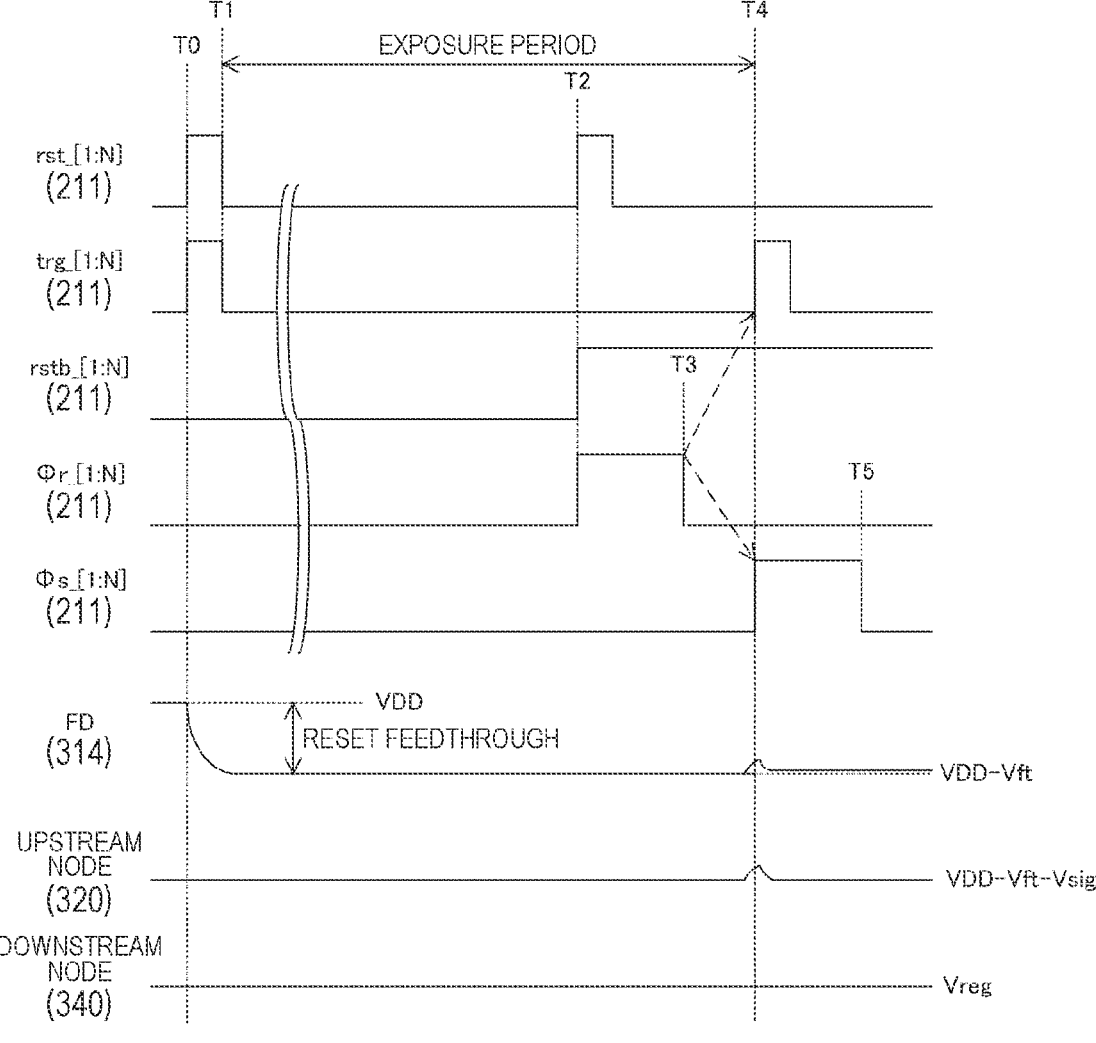
FIG. 21 is a diagram for describing reset feedthrough in the third embodiment of the present technology.
Figure 22:
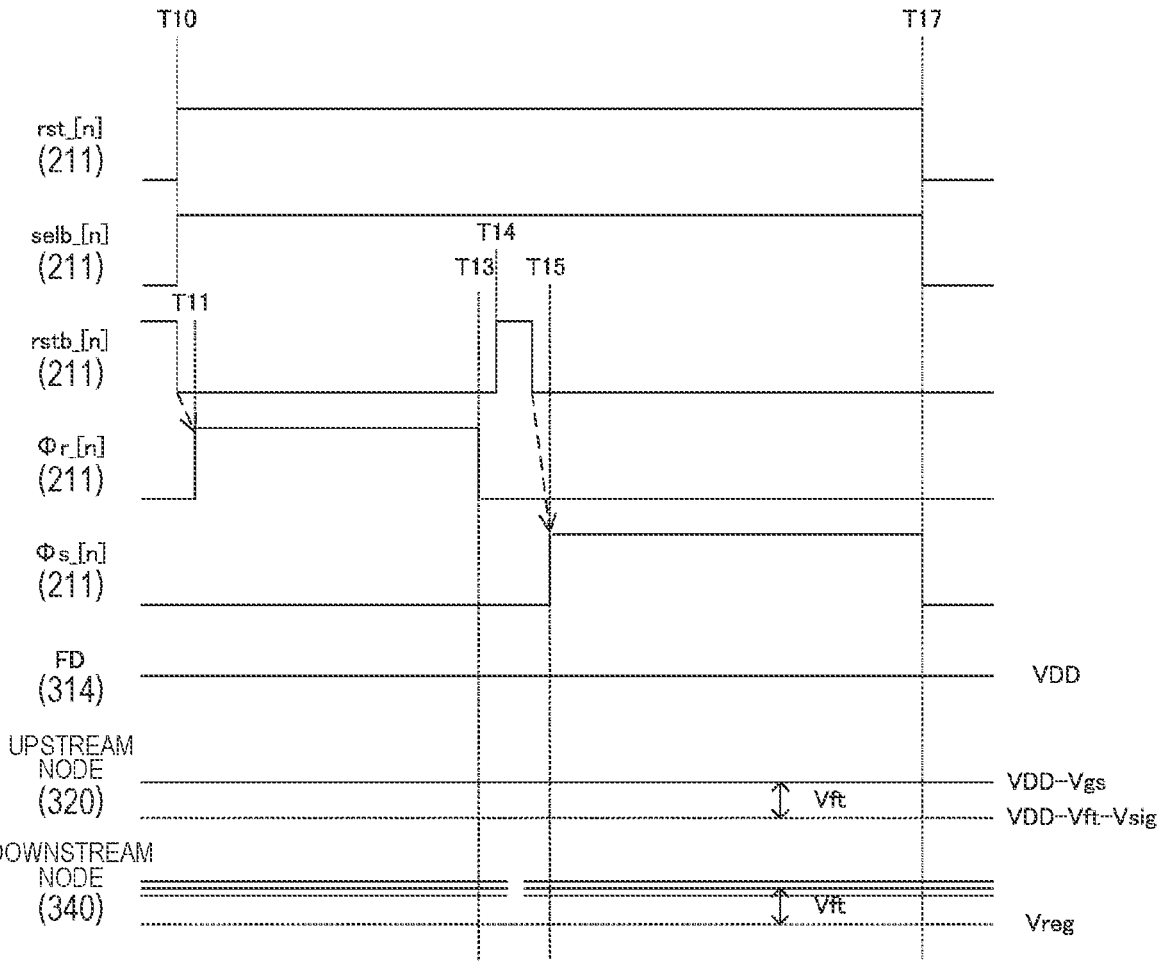
FIG. 22 is a diagram for describing a variation of a level caused by the reset feedthrough in the third embodiment of the present technology.

Here, the deterioration of the PRNU in the pixel 300 of the first embodiment will be considered with reference to FIGS. 21 and 22. In the first embodiment, a potential of the FD 314 decreases due to reset feedthrough of the FD reset transistor 313 at a timing T0 immediately before exposure starts as illustrated in FIG. 21. Such a variation amount is Vft.

Since the power supply voltage of the FD reset transistor 313 is VDD in the first embodiment, the potential of the FD 314 varies from VDD to VDD–Vft at the timing T0. Furthermore, a potential of the upstream node 320 at the time of exposure is VDD–Vft–Vsig.

Furthermore, the FD reset transistor 313 transitions to an on state at the time of reading, and the FD 314 is fixed to the power supply voltage VDD in the first embodiment as illustrated in FIG. 22. The variation amount Vft of the FD 314 causes the potentials of the upstream node 320 and the downstream node 340 at the time of reading to be shifted higher by about Vft. However, an amount of voltage to be shifted varies every pixel due to variations in capacitance values of the capacitive elements 321 and 322 or the parasitic capacitance, which causes the deterioration of the PRNU.

A shift amount of the upstream node 320 in a case where the downstream node 340 is shifted by Vft is expressed by, for example, the following formula.

$$\{(Cs + \delta Cs) / (Cs + \delta Cs + Cp)\} * Vft \qquad \text{Formula 4}$$

In the above formula, Cs is a capacitance value of the capacitive element 322 on the signal level side, and δCs is a variation in Cs. Cp is a capacitance value of the parasitic capacitance of the downstream node 340.

Formula 4 can be approximated by the following formula.

$$\{1 - (\delta Cs / Cs) * (Cp / Cs)\} * Vft \qquad \text{Formula 5}$$

From Formula 5, a variation in the downstream node 340 can be expressed by the following formula.

$$\{(\delta Cs / Cs) * (Cp / Cs)\} * Vft \qquad \text{Formula 6}$$

Assuming that (δCs/Cs) is $10^{-2}$, (Cp/Cs) is $10^{-1}$, and Vft is 400 millivolts (mV), the PRNU is 400 μVrms, which is a relatively large value, according to Formula 6.

In particular, it is necessary to increase a charge-to-voltage conversion efficiency of the FD 314 when kTC noise at the time of sampling and holding a capacitance converted for input is to be reduced. Although it is necessary to reduce the capacitance of the FD 314 in order to increase the charge-to-voltage conversion efficiency, as the capacitance of the FD 314 is reduced, the variation amount Vft increases and may become several hundred millivolts (mV). In this case, the influence of the PRNU may be at a non-negligible level according to Formula 6.

Figure 23:
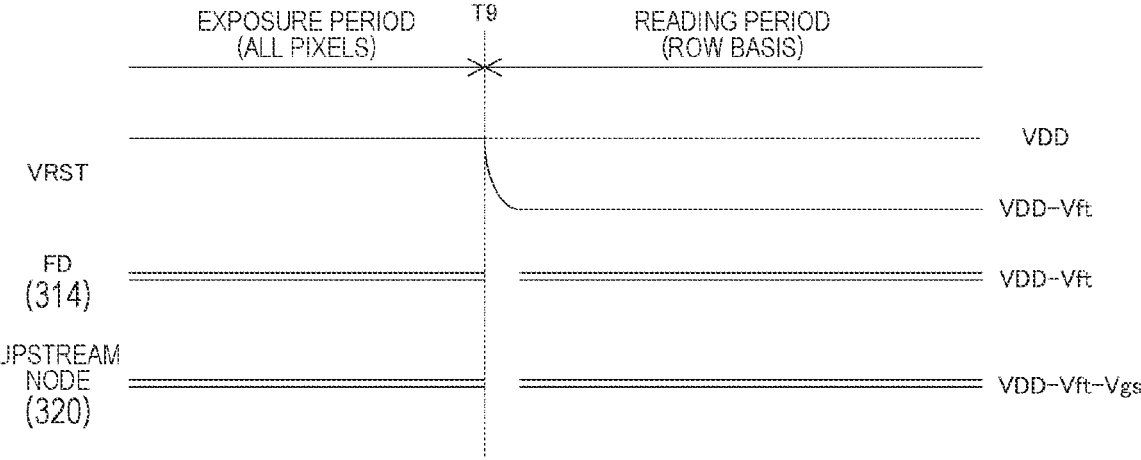
FIG. 23 is a timing chart depicting an example of voltage control in the third embodiment of the present technology.

FIG. 23 is a timing chart depicting an example of voltage control in the third embodiment of the present technology.

In a period in which reading is performed row by row after a timing T9, the timing control circuit 212 controls the reset power supply voltage VRST to a value different from that in an exposure period.

For example, in the exposure period, the timing control circuit 212 sets the reset power supply voltage VRST to the same value as the power supply voltage VDD. On the other hand, in the reading period, the timing control circuit 212 decreases the reset power supply voltage VRST to VDD–Vft. That is, in the reading period, the timing control circuit 212 decreases the reset power supply voltage VRST by an amount substantially matching the variation amount Vft caused by reset feedthrough. This control enables the reset level of the FD 314 to be equalized between the time of exposure and the time of reading.

The control of the reset power supply voltage VRST enables reduction in the voltage variation amount between the FD 314 and the upstream node 320 as illustrated in the drawing. Therefore, it is possible to suppress the deterioration of the PRNU due to the variations in the capacitive elements 321 and 322 or the parasitic capacitance.

Incidentally, the first to third modifications of the first embodiment and the second embodiment can also be applied to the third embodiment.

In this manner, since the timing control circuit 212 decreases the reset power supply voltage VRST by the variation amount Vft caused by the reset feedthrough at the time of reading according to the third embodiment of the present technology, it is possible to equalize the reset level between the exposure and reading. Therefore, the deterioration of the photo response non-uniformity (PRNU) can be suppressed.

4. Fourth Embodiment

Although the signal level is read subsequently to the reset level for each frame, but in this configuration in the first embodiment described above, there is a possibility that photo response non-uniformity (PRNU) deteriorates due to variations in the capacitive elements 321 and 322 or parasitic capacitance. The solid-state imaging element 200 of a fourth embodiment is different from that of the first embodiment in that the PRNU is improved by switching a level held in the capacitive element 321 and a level held in the capacitive element 322 for each frame.

The solid-state imaging element 200 of the fourth embodiment continuously images a plurality of frames in synchronization with a vertical synchronization signal. An odd-numbered frame is referred to as an "odd frame", and an even-numbered frame is referred to as an "even frame". Incidentally, the odd frame and the even frame are examples of a pair of frames described in the claims.

Figure 24:
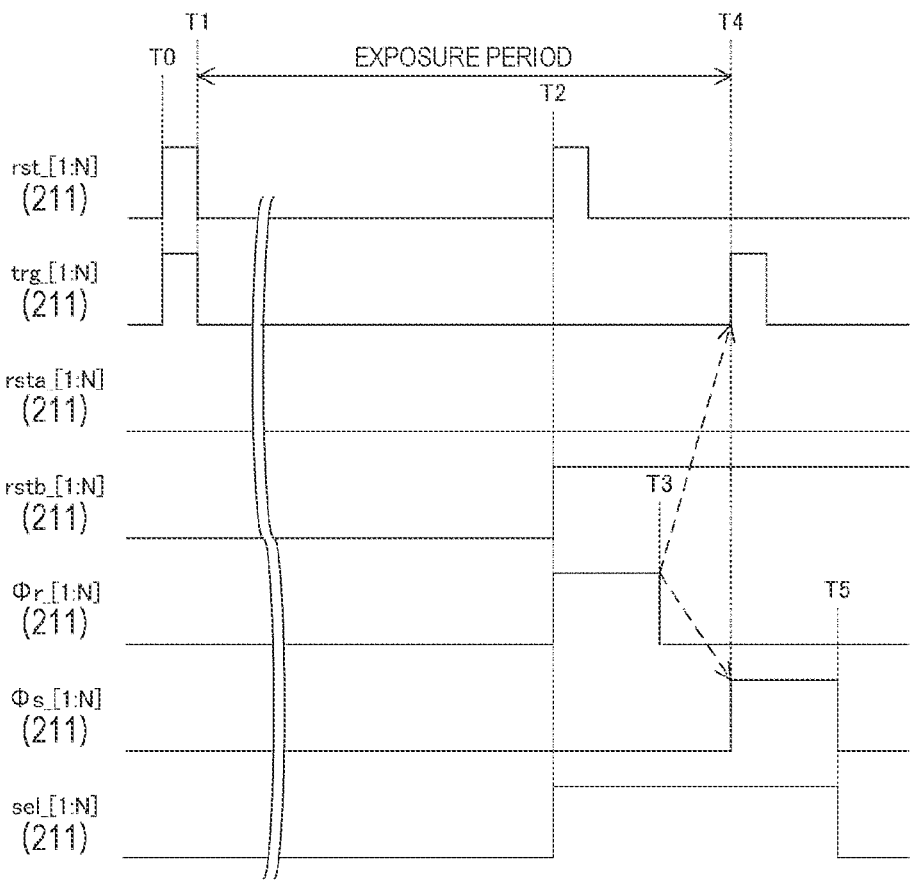
FIG. 24 is a timing chart depicting an example of a global shutter operation of an odd frame in a fourth embodiment of the present technology.

FIG. 24 is a timing chart depicting an example of a global shutter operation of the odd frame in the fourth embodiment. The upstream circuit 310 in the solid-state imaging element 200 sets a selection signal $\Phi$s to a high level subsequently to a selection signal $\Phi$r in an exposure period of the odd frame, thereby causing the capacitive element 321 to hold the reset level, and then causing the capacitive element 322 to hold the signal level.

Figure 25:
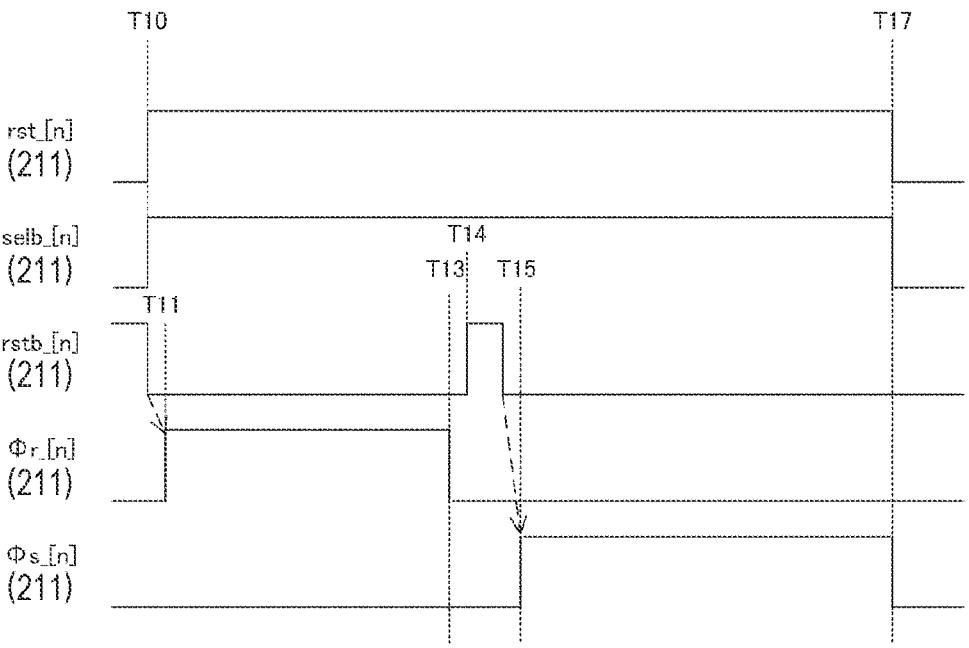
FIG. 25 is a timing chart depicting an example of a reading operation of the odd frame in the fourth embodiment of the present technology.

FIG. 25 is a timing chart depicting an example of a reading operation of the odd frame in the fourth embodiment of the present technology. The downstream circuit 350 in the solid-state imaging element 200 sets the selection signal $\Phi$s to the high level subsequently to the selection signal $\Phi$r to read the signal level subsequently to the reset level in the reading period of the odd frame.

Figure 26:
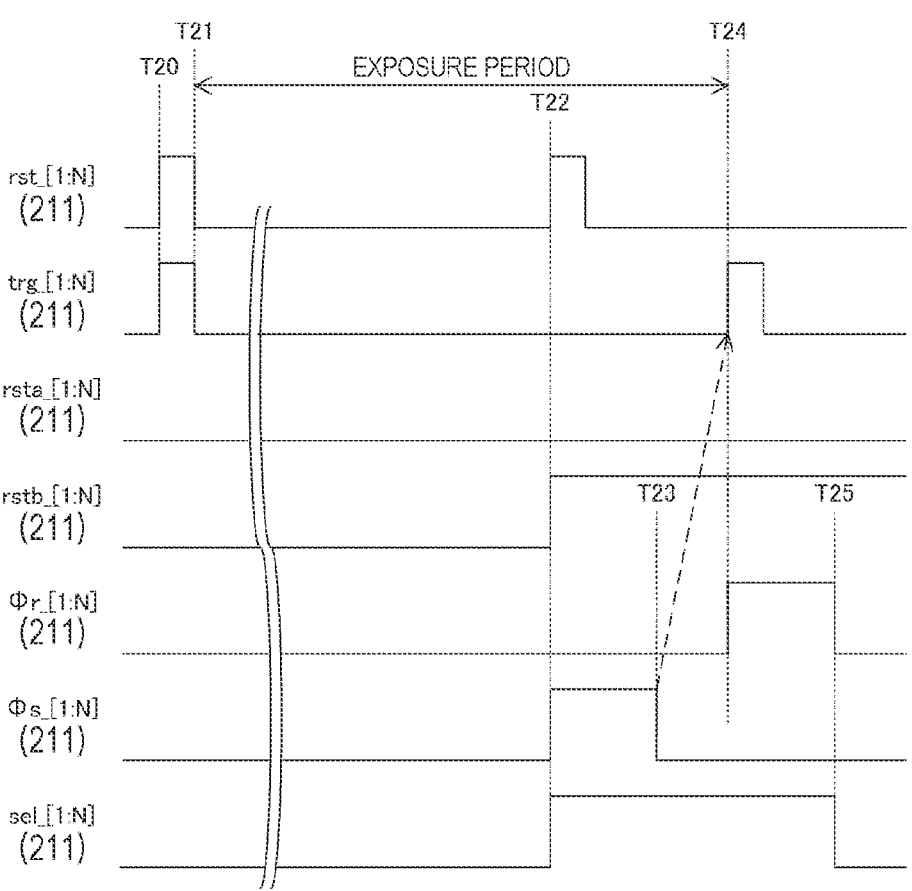
FIG. 26 is a timing chart depicting an example of a global shutter operation of an even frame in the fourth embodiment of the present technology.

FIG. 26 is a timing chart depicting an example of a global shutter operation of the even frame in the fourth embodiment. The upstream circuit 310 in the solid-state imaging element 200 sets the selection signal $\Phi$r to the high level subsequently to the selection signal $\Phi$s in an exposure period of the even frame, thereby causing the capacitive element 322 to hold the reset level, and then causing the capacitive element 321 to hold the signal level.

Figure 27:
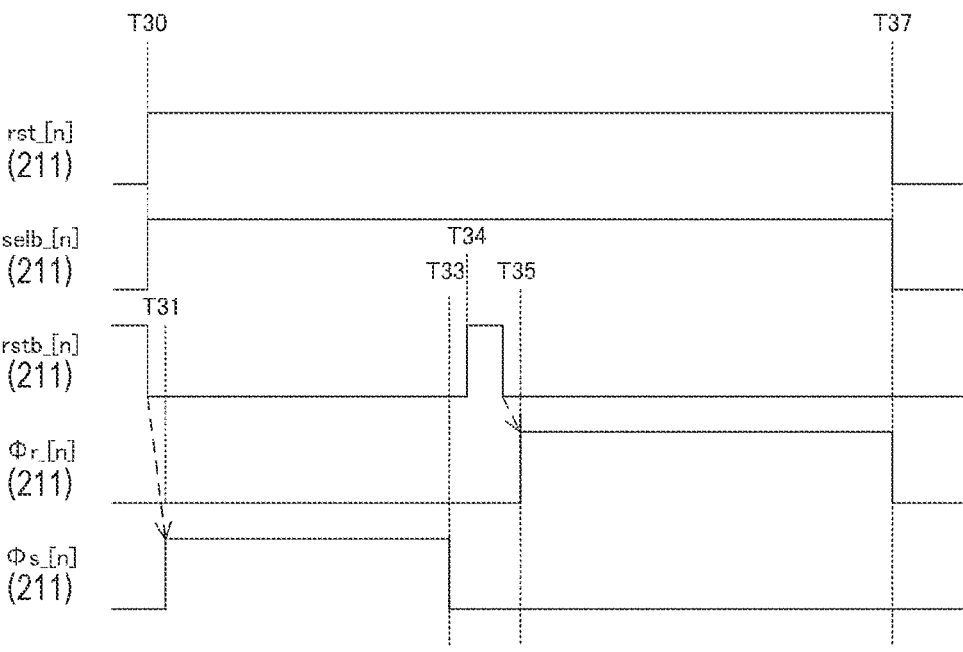
FIG. 27 is a timing chart depicting an example of a reading operation of the even frame in the fourth embodiment of the present technology.

FIG. 27 is a timing chart depicting an example of a reading operation of the even frame in the fourth embodiment of the present technology. The downstream circuit 350 in the solid-state imaging element 200 sets the selection signal $\Phi$r to the high level subsequently to the selection signal $\Phi$s to read the signal level subsequently to the reset level in the reading period of the even frame.

As illustrated in FIGS. 24 and 26, the levels to be held in the capacitive elements 321 and 322 are reversed between the even frame and the odd frame. Therefore, a polarity of the PRNU is also reversed between the even frame and the odd frame. The column signal processing circuit 260 in the downstream stage obtains an average by adding the odd frame and the even frame. Therefore, it is possible to cancel out the PRNUs having opposite polarities.

This control is control that is effective in imaging a moving image and adding frames. Furthermore, it is unnecessary to add an element to the pixel 300, and this control can be achieved only by changing a driving system.

Incidentally, the first to third modifications of the first embodiment and the second and third embodiments can also be applied to the fourth embodiment.

In this manner, since the level held in the capacitive element 321 and the level held in the capacitive element 322 are reversed between the odd frame and the even frame in the fourth embodiment of the present technology, the polarity of the PRNU can be reversed between the odd frame and the even frame. Since the column signal processing circuit 260 adds the odd frame and the even frame, deterioration of the PRNU can be suppressed.

5. Fifth Embodiment

In the first embodiment described above, the column signal processing circuit 260 obtains the difference between the reset level and the signal level for each column. In this configuration, however, when light with extremely high illuminance is incident on a pixel, there is a possibility that a blackening phenomenon occurs in which brightness decreases to be blackened due to overflowing of the charge from the photoelectric conversion element 311. The solid-state imaging element 200 of a fifth embodiment is different from that of the first embodiment in that whether or not the blackening phenomenon has occurred is determined for each pixel.

Figure 28:
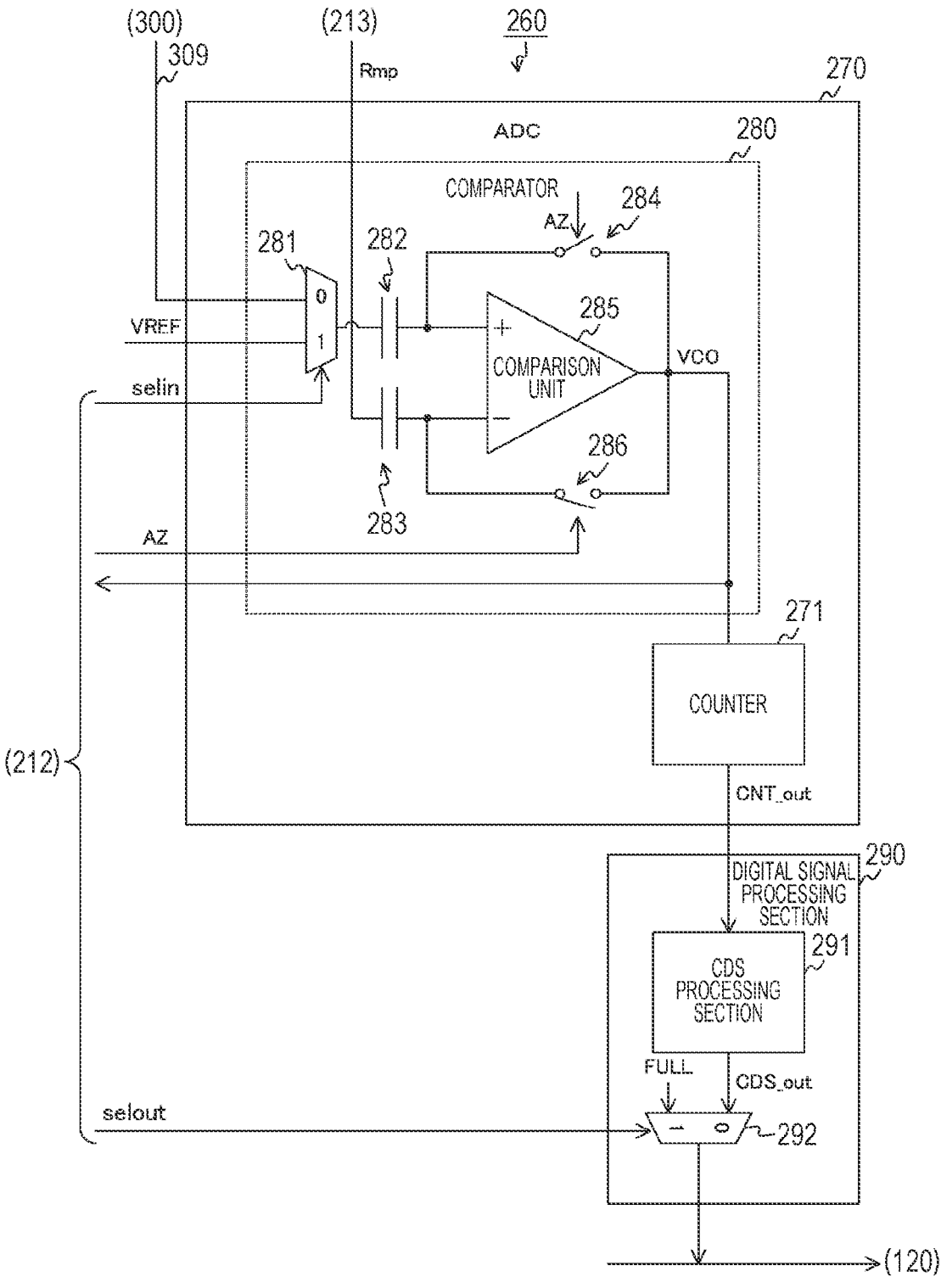
FIG. 28 is a circuit diagram depicting a configuration example of a column signal processing circuit in a fifth embodiment of the present technology.

FIG. 28 is a circuit diagram depicting a configuration example of the column signal processing circuit 260 in the fifth embodiment of the present technology. In the column signal processing circuit 260 of the fifth embodiment, a plurality of ADCs 270 and a digital signal processing section 290 are arranged. Furthermore, a plurality of CDS processing sections 291 and a plurality of selectors 292 are arranged in the digital signal processing section 290. The ADC 270, the CDS processing section 291, and the selector 292 are provided for each column.

Furthermore, the ADC 270 includes a comparator 280 and a counter 271. The comparator 280 compares a level of the vertical signal line 309 with a ramp signal Rmp from the DAC 213, and outputs a comparison result VCO. The comparison result VCO is supplied to the counter 271 and the timing control circuit 212. The comparator 280 includes a selector 281, capacitive elements 282 and 283, auto-zero switches 284 and 286, and a comparison unit 285.

The selector 281 connects any of the vertical signal line 309 of a corresponding column and a node with a predetermined reference voltage VREF to a non-inverting input terminal (+) of the comparison unit 285 via the capacitive element 282 according to an input-side selection signal selin. The input-side selection signal selin is supplied from the timing control circuit 212. Incidentally, the selector 281 is an example of an input-side selector described in the claims.

The comparison unit 285 compares the respective levels of the non-inverting input terminal (+) and an inverting input terminal (−), and outputs the comparison result VCO to the counter 271. The ramp signal Rmp is input to the inverting input terminal (−) via the capacitive element 283.

The auto-zero switch 284 short-circuits the non-inverting input terminal (+) and an output terminal of the comparison result VCO in accordance with an auto-zero signal Az from the timing control circuit 212. The auto-zero switch 286 short-circuits the inverting input terminal (−) and the output terminal of the comparison result VCO in accordance with the auto-zero signal Az.

The counter 271 counts a count value until the comparison result VCO is inverted, and outputs a digital signal CNT_out indicating the count value to the CDS processing section 291.

The CDS processing section 291 performs CDS processing on the digital signal CNT_out. The CDS processing section 291 calculates a difference between the digital signal CNT_out corresponding to a reset level and the digital signal CNT_out corresponding to a signal level, and outputs the difference to the selector 292 as CDS_out.

The selector 292 outputs either the digital signal CDS_out after the CDS processing or a full-code digital signal FULL as pixel data of the corresponding column in accordance with an output-side selection signal selout from the timing control circuit 212. Incidentally, the selector 292 is an example of an output-side selector described in the claims.

Figure 29:
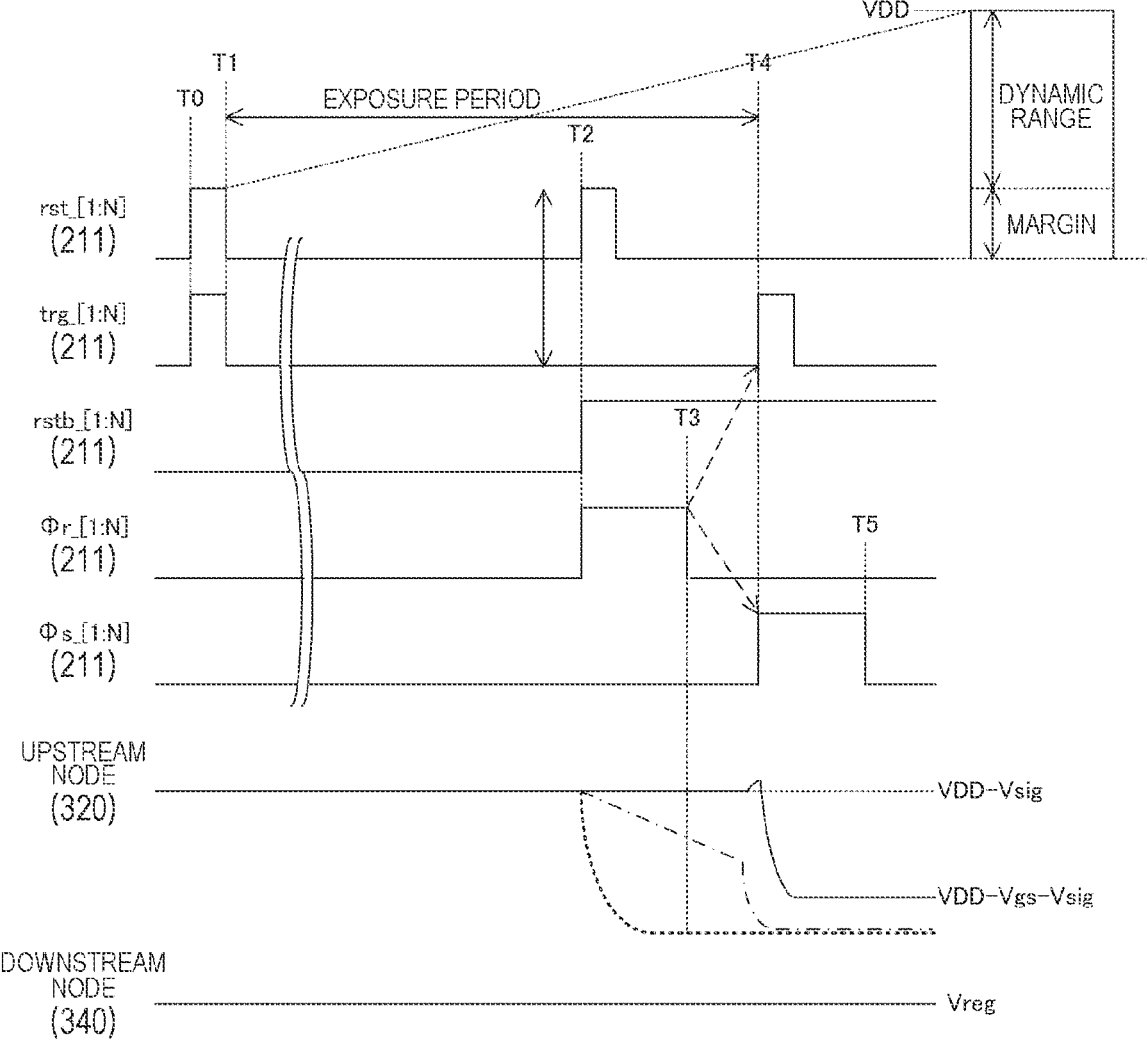
FIG. 29 is a timing chart depicting an example of a global shutter operation in the fifth embodiment of the present technology.

FIG. 29 is a timing chart depicting an example of a global shutter operation in the fifth embodiment of the present technology. A method for controlling a transistor at the time of global shutter of the fifth embodiment is similar to that of the first embodiment.

Here, it is assumed that light with extremely high illuminance is incident on the pixel 300. In this case, a charge of the photoelectric conversion element 311 becomes full, the charge overflows from the photoelectric conversion element 311 to the FD 314, and a potential of the FD 314 after FD reset decreases. An alternate long and short dash line in the drawing indicates a potential variation of the FD 314 when weak sunlight that causes a relatively small amount of overflowing charge is incident. A dotted line in the drawing indicates a potential variation of the FD 314 when strong sunlight that causes a relatively large amount of overflowing charge is incident.

When the weak sunlight is incident, the reset level decreases at a timing T3 when the FD reset is completed, but the level is not completely lowered at this time.

On the other hand, when the strong sunlight is incident, the reset level is completely lowered at a timing T3. In this case, the signal level becomes the same as the reset level, and a potential difference therebetween is "0", so that the digital signal after the CDS processing becomes the same as that in a dark state to be blackened. In this manner, a phenomenon in which the pixel becomes black even though the light with extremely high illuminance, such as sunlight, is incident is called the blackening phenomenon or blooming.

Furthermore, when a level of the FD 314 of a pixel in which the blackening phenomenon has occurred is too low, it is difficult to secure an operating point of the upstream circuit 310, and the current id1 of the current source transistor 316 varies. Since the current source transistors 316 of the respective pixels are connected to a common power supply or ground, when the current varies in a certain pixel, a variation of IR drop of the pixel affects a sample level of another pixel. A pixel in which the blackening phenomenon occurs becomes an aggressor, and a pixel in which the sample level varies due to the pixel becomes a victim. Therefore, streaking noise is generated.

Incidentally, in a case where the discharge transistor 317 is provided as in the second embodiment, the overflowing charge is discarded to the discharge transistor 317 side in a pixel with blackening (blooming), so that the blackening phenomenon is less likely to occur. However, even if the discharge transistor 317 is provided, a part of the charge is likely to flow to the FD 314, and there is a possibility that the blackening phenomenon is not completely solved. Moreover, there is also a disadvantage that a ratio of an effective area to a charge amount for each pixel decreases due to the addition of the discharge transistor 317. Therefore, it is desirable to suppress the blackening phenomenon without using the discharge transistor 317.

Two methods are conceivable as a method for suppressing the blackening phenomenon without using the discharge transistor 317. A first method is adjustment of a clip level of the FD 314. A second method is a method of determining whether or not the blackening phenomenon occurs at the time of reading and replacing an output with the full code when the blackening phenomenon occurs.

In the first method, a high level of an FD reset signal rst (in other words, a gate of the FD reset transistor 313) in the drawing corresponds to a power supply voltage VDD, and a low level thereof corresponds to the clip level of the FD 314. In the first embodiment, a difference between the high level and the low level (that is, the amplitude) is set to a value corresponding to a dynamic range. On the other hand, the value is adjusted to a value obtained by further adding a margin to the value in the fifth embodiment. Here, the value corresponding to the dynamic range corresponds to a difference between the power supply voltage VDD and the potential of the FD 314 when the digital signal becomes the full code.

It is possible to prevent the FD 314 from being excessively lowered due to the blooming to damage the operating point of the upstream amplification transistor 315 by lowering a gate voltage (the low level of the FD reset signal rst) in an off state of the FD reset transistor 313.

Incidentally, the dynamic range varies depending on an analog gain of the ADC. A large dynamic range is required when the analog gain is low, and conversely, a small dynamic range is sufficient when the analog gain is high. Therefore, the gate voltage in the off state of the FD reset transistor 313 can also be changed in accordance with the analog gain.

Figure 30:
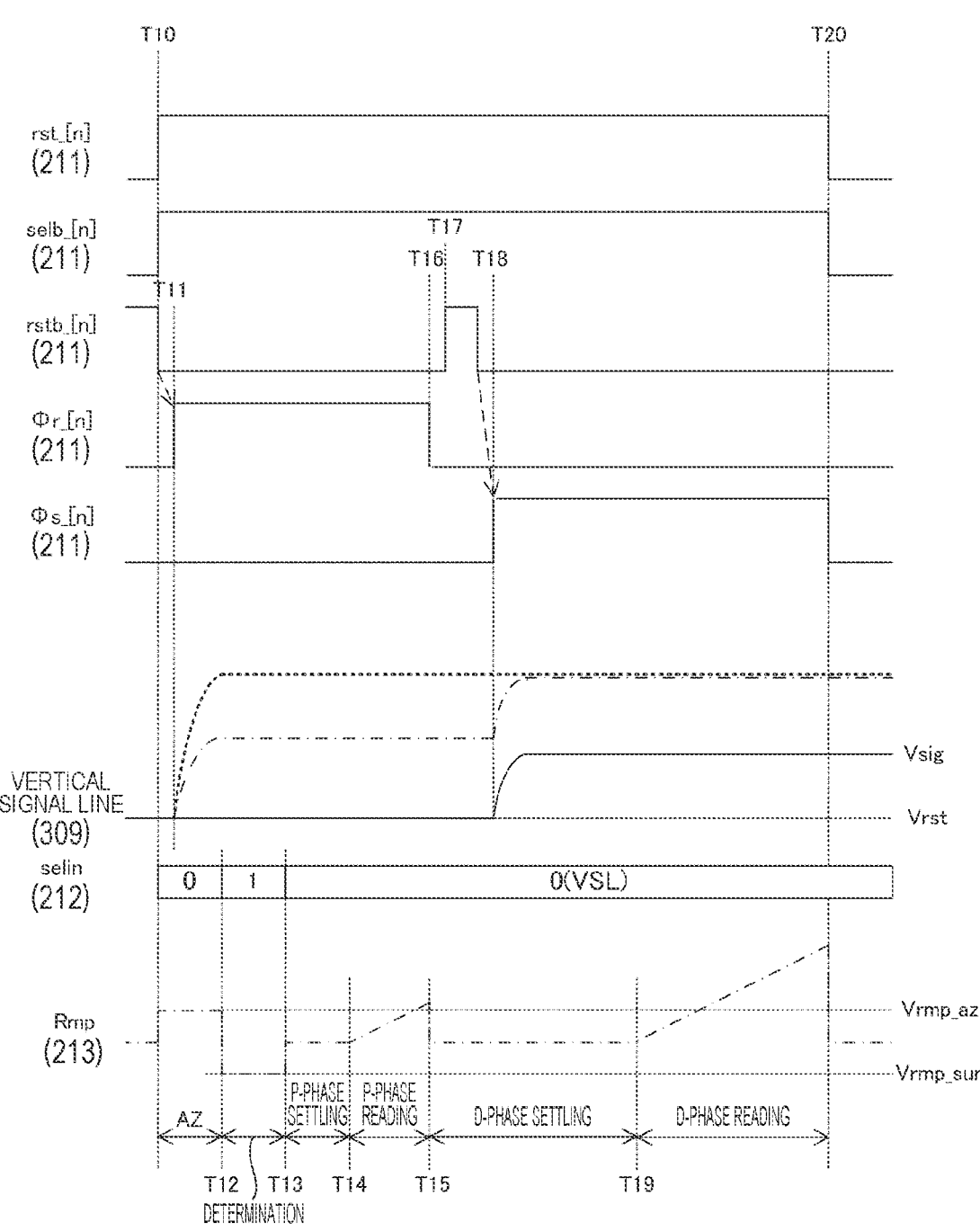
FIG. 30 is a timing chart depicting an example of a reading operation in the fifth embodiment of the present technology.

FIG. 30 is a timing chart depicting an example of a reading operation in the fifth embodiment of the present technology. When a selection signal Φr becomes the high level at a timing T11 immediately after a reading start timing T10, a potential of the vertical signal line 309 varies in a pixel on which sunlight is incident. An alternate long and short dash line in the drawing indicates a potential variation of the vertical signal line 309 when weak sunlight is incident. A dotted line in the drawing indicates a potential variation of the vertical signal line 309 when strong sunlight is incident.

In an auto-zero period from the timing T10 to a timing T12, the timing control circuit 212 supplies, for example, the input-side selection signal selin of "0", and connects the comparison unit 285 to the vertical signal line 309. In this auto-zero period, the timing control circuit 212 performs auto-zeroing by an auto-zero signal Az.

Regarding the second method, the timing control circuit 212 supplies, for example, the input-side selection signal selin of "1" in a determination period from the timing T12 to a timing T13. In accordance with the input-side selection signal selin, the comparison unit 285 is disconnected from the vertical signal line 309 and connected to the node with the reference voltage VREF. The reference voltage VREF is set to an expected value of a level of the vertical signal line 309 when no blooming has occurred. For example, when a gate-source voltage of the downstream amplification transistor 351 is Vgs2, Vrst corresponds to Vreg−Vgs2. Furthermore, the DAC 213 decreases a level of the ramp signal Rmp from Vrmp_az to Vrmp_sun in the determination period.

Furthermore, in a case where no blooming has occurred in the determination period, the reset level Vrst of the vertical signal line 309 is substantially the same as the reference voltage VREF, and a potential of the inverting input terminal (+) of the comparison unit 285 does not change much from that at the time of auto-zero. On the other hand, the non-inverting input terminal (−) has been lowered from Vrmp_az to Vrmp_sun, and thus, the comparison result VCO becomes the high level.

Conversely, in a case where the blooming has occurred, the reset level Vrst becomes sufficiently higher than the reference voltage VREF, and the comparison result VCO becomes the low level when the following formula is satisfied.

$$Vrst - VREF > Vrmp\_az - Vrmp\_sun \qquad \text{Formula 7}$$

That is, the timing control circuit 212 can determine whether or not the blooming has occurred based on whether or not the comparison result VCO becomes the low level in the determination period.

Incidentally, it is necessary to secure a large margin for sun determination (the right side of Formula 7) to some extent not to cause erroneous determination due to variations in threshold voltage of the downstream amplification transistor 351, an IR drop difference of Vregs in a plane, and the like.

After a timing T13 after the lapse of the determination period, the timing control circuit 212 connects the comparison unit 285 to the vertical signal line 309. Furthermore, when a P-phase settling period from the timing T13 to a timing T14 elapses, the P phase is read in a period from the timing T14 to a timing T15. When a D phase settling period from the timing T15 to a timing T19 elapses, the D phase is read in a period from the timing T19 to a timing T20.

In a case where it is determined that no blooming has not occurred in the determination period, the timing control circuit 212 controls the selector 292 by the output-side selection signal selout to output the digital signal CDS_out after the CDS processing without any change.

On the other hand, in a case where it is determined that the blooming has occurred in the determination period, the timing control circuit 212 controls the selector 292 by the output-side selection signal selout to output the full code FULL instead of the digital signal CDS_out after the CDS processing. Therefore, the blackening phenomenon can be suppressed.

Incidentally, the first to third modifications of the first embodiment and the second to fourth embodiments can also be applied to the fifth embodiment.

In this manner, since the timing control circuit 212 determines whether or not the blackening phenomenon has occurred on the basis of the comparison result VCO and outputs the full code when the blackening phenomenon has occurred according to the fifth embodiment of the present technology, the blackening phenomenon can be suppressed.

6. Sixth Embodiment

In the above-described first embodiment, the vertical scanning circuit 211 performs the control (that is, global shutter operation) to simultaneously expose all rows (all pixels). However, in a case where the simultaneity of exposure is unnecessary and low noise is required at the time of conducting a test, at the time of performing analysis, or the like, it is desirable to perform a rolling shutter operation. The solid-state imaging element 200 of a sixth embodiment is different from that of the first embodiment in that the rolling shutter operation is performed at the time of conducting a test or the like.

Figure 31:
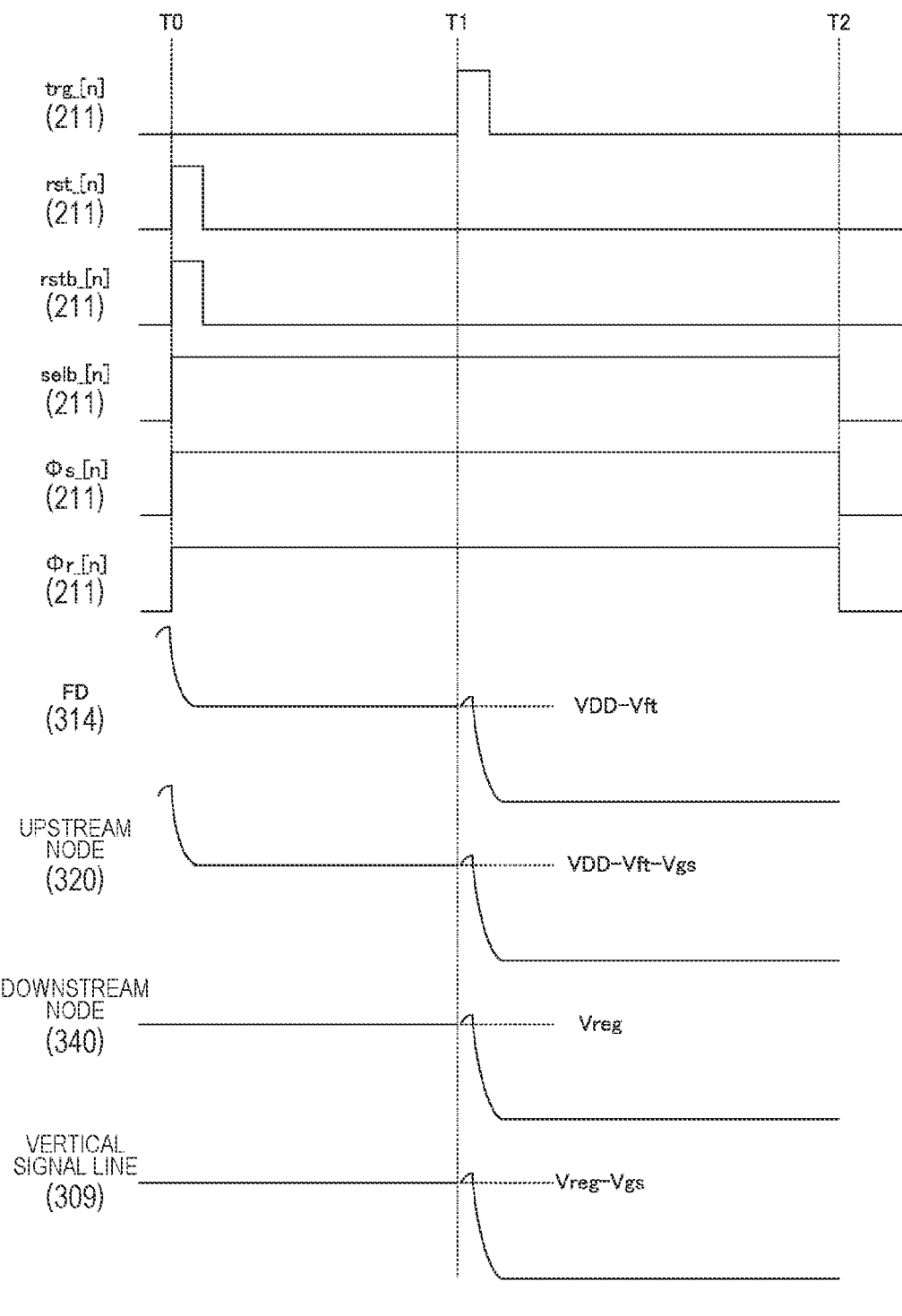
FIG. 31 is a timing chart depicting an example of a rolling shutter operation in a sixth embodiment of the present technology.

FIG. 31 is a timing chart depicting an example of the rolling shutter operation in the sixth embodiment of the present technology. The vertical scanning circuit 211 performs control to sequentially select a plurality of rows and start exposure. This drawing illustrates exposure control of the n-th row.

During a period from a timing T0 to a timing T2, the vertical scanning circuit 211 supplies a high-level downstream selection signal selb, selection signal Φr, and selection signal Φs to the n-th row. Furthermore, at the exposure start timing T0, the vertical scanning circuit 211 supplies high-level FD reset signal rst and downstream reset signal rstb to the n-th row over a pulse period. At the exposure end timing T1, the vertical scanning circuit 211 supplies a transfer signal trg to the n-th row. The rolling shutter operation in the drawing enables the solid-state imaging element 200 to generate image data with low noise.

Incidentally, during normal imaging, the solid-state imaging element 200 of the sixth embodiment performs a global shutter operation similarly to the first embodiment.

Furthermore, the first to third modifications of the first embodiment and the second to fifth embodiments can also be applied to the sixth embodiment.

In this manner, since the vertical scanning circuit 211 performs the control (that is, rolling shutter operation) to sequentially select the plurality of rows and start exposure according to the sixth embodiment of the present technology, it is possible to generate the image data with low noise.

7. Seventh Embodiment

In the first embodiment described above, a source of a source follower (the upstream amplification transistor 315 and the current source transistor 316) in the upstream stage is connected to the power supply voltage VDD, and reading is performed row by row in a state where the source follower is turned on. In such a driving method, however, there is a possibility that circuit noise of the source follower in the upstream stage at the time of performing the reading row by row propagates to the downstream stage so that random noise increases. The solid-state imaging element 200 of a seventh embodiment is different from that of the first embodiment in that noise is reduced by turning off a source follower in the upstream stage at the time of reading.

Figure 32:
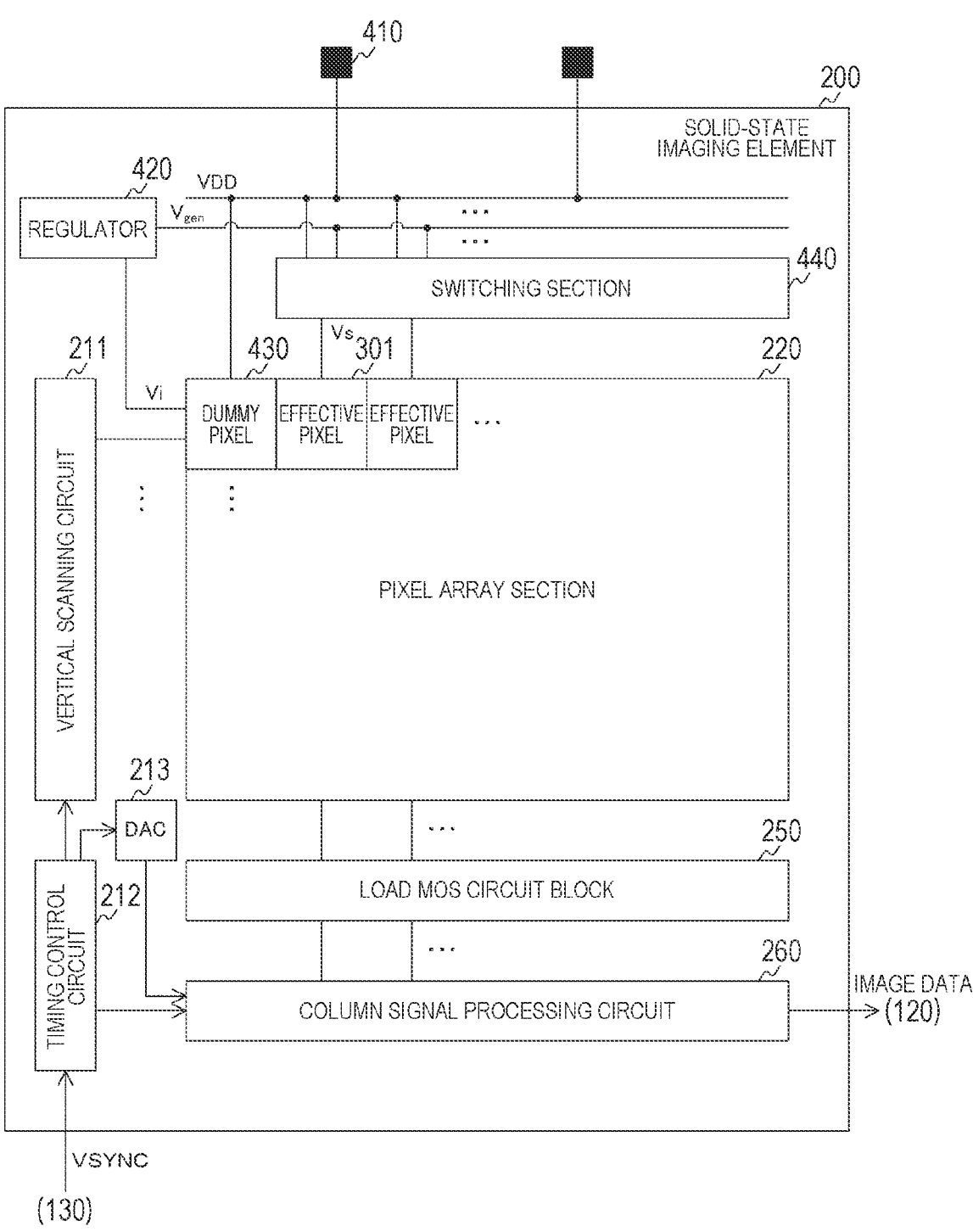
FIG. 32 is a block diagram depicting a configuration example of a solid-state imaging element in a seventh embodiment of the present technology.

FIG. 32 is a block diagram depicting a configuration example of the solid-state imaging element 200 in the seventh embodiment of the present technology. The solid-state imaging element 200 of the seventh embodiment is different from that of the first embodiment in terms of further including a regulator 420 and a switching section 440. Furthermore, a plurality of effective pixels 301 and a predetermined number of dummy pixels 430 are arrayed in the pixel array section 220 of the seventh embodiment. The dummy pixels 430 are arrayed around a region where the effective pixels 301 are arrayed.

Furthermore, a power supply voltage VDD is supplied to each of the dummy pixels 430, and the power supply voltage VDD and a source voltage Vs are supplied to each of effective pixels 440. A signal line for supplying the power supply voltage VDD to the effective pixel 301 is omitted in the drawing. Furthermore, the power supply voltage VDD is supplied from a pad 410 outside the solid-state imaging element 200.

The regulator 420 generates a constant generation voltage $V_{gen}$ on the basis of an input potential Vi from the dummy pixel 430 and supplies the generation voltage to the switching section 440. The switching section 440 selects either the power supply voltage VDD from the pad 410 or the generation voltage $V_{gen}$ from the regulator 420, and supplies the selected voltage to each of columns of the effective pixels 301 as a source voltage Vs.

Figure 33:
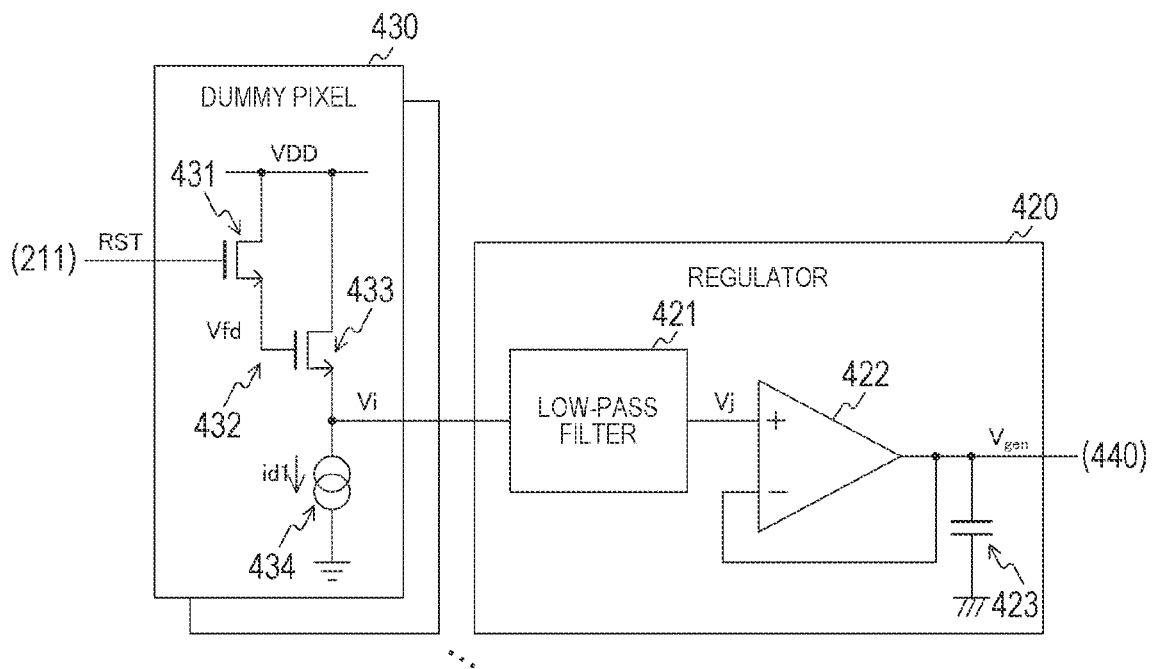
FIG. 33 is a circuit diagram depicting a configuration example of a dummy pixel, a regulator, and a switching section in a seventh embodiment of the present technology.
Figure 33:
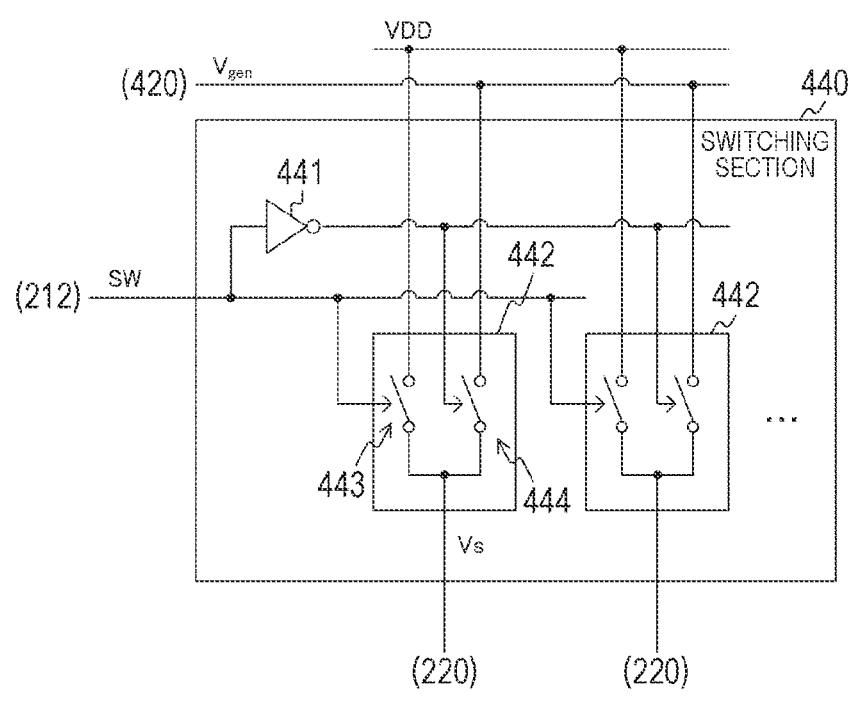

FIG. 33 is a circuit diagram depicting a configuration example of the dummy pixel 430, the regulator 420, and the switching section 440 in the seventh embodiment of the present technology. In the drawing, a is a circuit diagram of the dummy pixel 430 and the regulator 420, and b in the drawing is a circuit diagram of the switching section 440.

As illustrated in a of the drawing, the dummy pixel 430 includes a reset transistor 431, an FD 432, an amplification transistor 433, and a current source transistor 434. The reset transistor 431 initializes the FD 432 in accordance with a reset signal RST from the vertical scanning circuit 211. The FD 432 accumulates a charge and generates a voltage corresponding to a charge amount. The amplification transistor 433 amplifies a level of the voltage of the FD 432 and supplies the amplified voltage to the regulator 420 as the input voltage Vi.

Furthermore, sources of the reset transistor 431 and the amplification transistor 433 are connected to the power supply voltage VDD. The current source transistor 434 is connected to a drain of the amplification transistor 433. The current source transistor 434 supplies a current id1 under the control of the vertical scanning circuit 211.

The regulator 420 includes a low-pass filter 421, a buffer amplifier 422, and a capacitive element 423. The low-pass filter 421 allows passage, as an output voltage Vj, of a component in a low-frequency band lower than a predetermined frequency out of a signal of the input voltage Vi.

The output voltage Vj is input to a non-inverting input terminal (+) of the buffer amplifier 422. An inverting input terminal (−) of the buffer amplifier 422 is connected to the output terminal thereof. The capacitive element 423 holds a voltage of the output terminal of the buffer amplifier 422 as $V_{gen}$. This $V_{gen}$ is supplied to the switching section 440.

As illustrated in a of the drawing, the switching section 440 includes an inverter 441 and a plurality of switching circuits 442. The switching circuit 442 is arranged for each column of the effective pixels 301.

The inverter 441 inverts a switching signal SW from the timing control circuit 212. The inverter 442 supplies the inverted signal to each of the switching circuits 442.

The switching circuit 442 selects one of the power supply voltage VDD and the generation voltage $V_{gen}$ and supplies the selected voltage to the corresponding column in the pixel array section 220 as the source voltage Vs. The switching circuit 442 includes switches 443 and 444. The switch 443 opens and closes a path between a node with the power supply voltage VDD and the corresponding column in accordance with the switching signal SW. The switch 444 opens and closes a path between a node with the generation voltage $V_{gen}$ and the corresponding column in accordance with the inverted signal of the switching signal SW.

Figure 34:
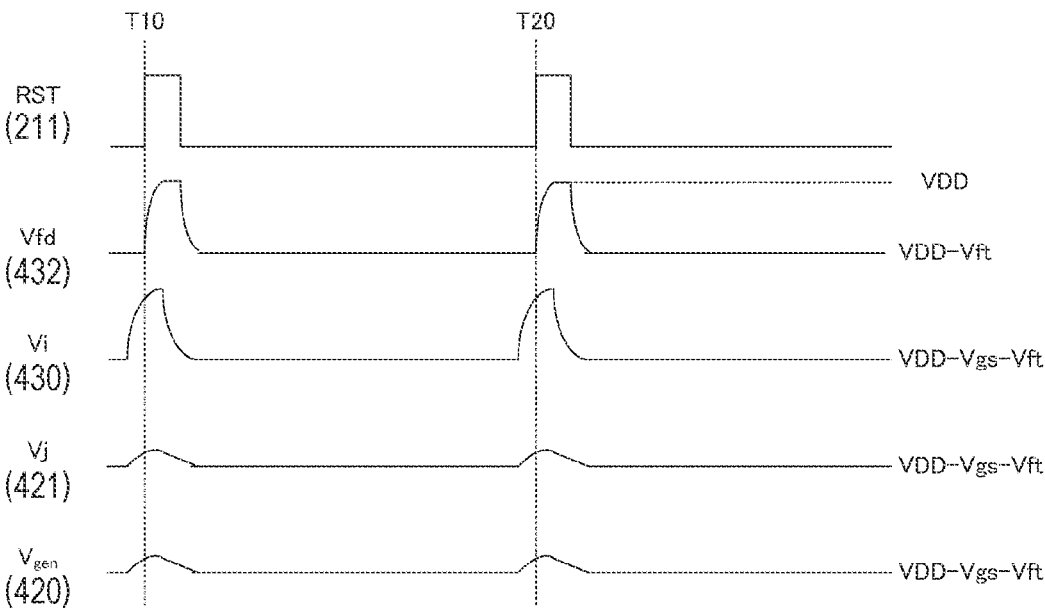
FIG. 34 is a timing chart depicting an example of an operation of the dummy pixel and the regulator in the seventh embodiment of the present technology.

FIG. 34 is a timing chart depicting an example of the operation of the dummy pixel 430 and the regulator 420 in the seventh embodiment of the present technology. At a timing T10 immediately before reading of a certain row, the vertical scanning circuit 211 supplies the reset signal RST at a high level (here, the power supply voltage VDD) to each of the dummy pixels 430. A potential Vfd of the FD 432 in the dummy pixel 430 is initialized to the power supply voltage VDD. Then, when the reset signal RST becomes a low level, reset feedthrough causes a variation as VDD−Vft.

Furthermore, the input voltage Vi decreases to VDD−Vgs−Vsig after reset. After passing through the low-pass filter 421, Vj and $V_{gen}$ become substantially constant voltages.

After a timing T20 immediately before reading of the next row, similar control is performed for each row, and the constant generation voltage $V_{gen}$ is supplied.

Figure 35:
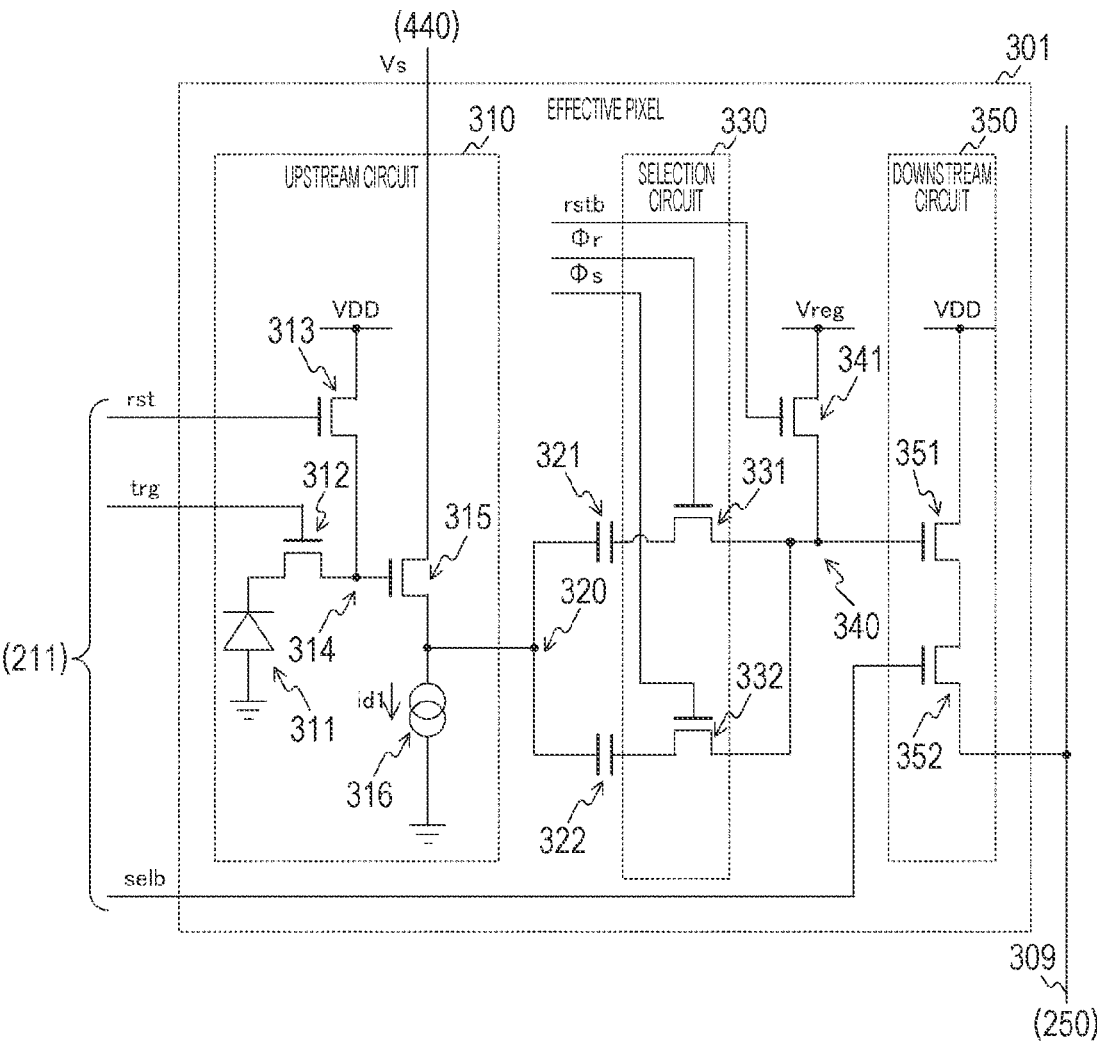
FIG. 35 is a circuit diagram depicting a configuration example of an effective pixel in the seventh embodiment of the present technology.

FIG. 35 is a circuit diagram depicting a configuration example of the effective pixel 301 in the seventh embodiment of the present technology. A circuit configuration of the effective pixel 301 is similar to that of the pixel 300 of the first embodiment except that the source voltage Vs from the switching section 440 is supplied to a source of the upstream amplification transistor 315.

Figure 36:
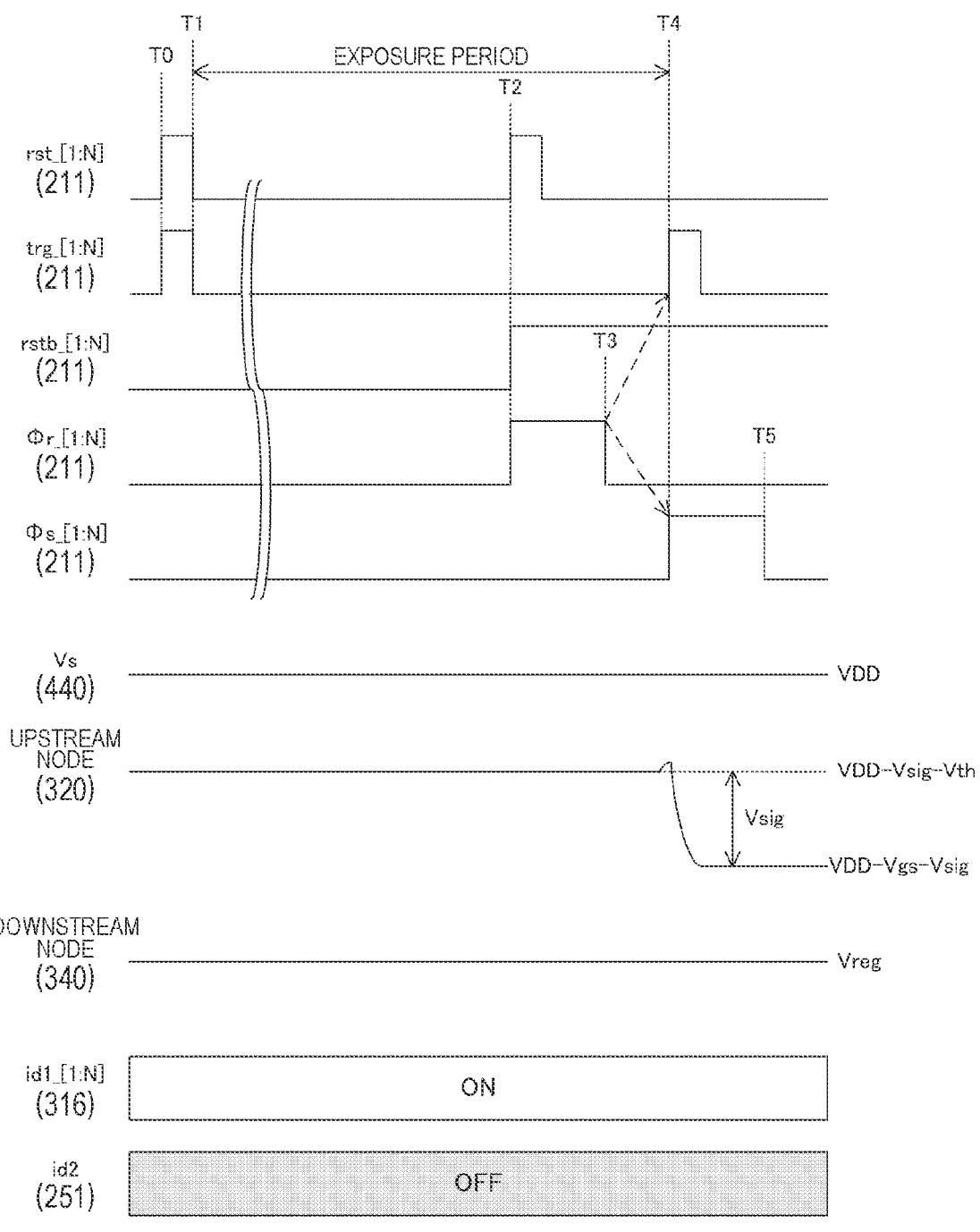
FIG. 36 is a timing chart depicting an example of a global shutter operation in the seventh embodiment of the present technology.

FIG. 36 is a timing chart depicting an example of a global shutter operation in the seventh embodiment of the present technology. In the seventh embodiment, when exposure is performed simultaneously in all pixels, the switching section 440 selects the power supply voltage VDD and supplies the power supply voltage as the source voltage Vs. Furthermore, a voltage of an upstream node decreases from VDD−Vgs−Vth to VDD−Vgs−Vsig at a timing T4. Here, Vth is a threshold voltage of the transfer transistor 312.

Figure 37:
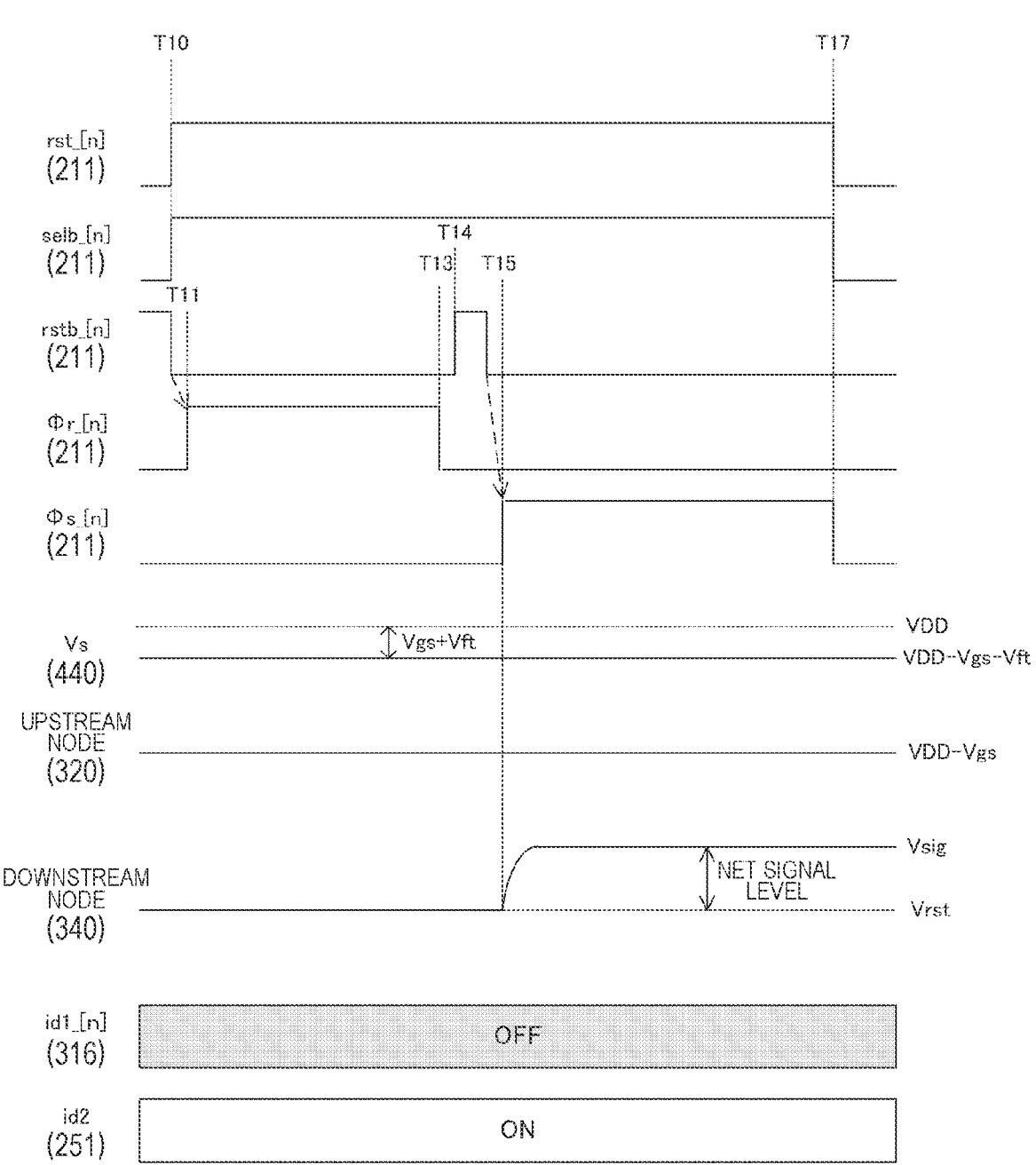
FIG. 37 is a timing chart depicting an example of a reading operation in the seventh embodiment of the present technology.

FIG. 37 is a timing chart depicting an example of a reading operation in the seventh embodiment of the present technology. In the seventh embodiment, the switching section 440 selects the generation voltage $V_{gen}$ and supplies the generation voltage as the source voltage Vs at the time of reading. The generation voltage $V_{gen}$ is adjusted to VDD−Vgs−Vft. Furthermore, the vertical scanning circuit 211 controls the current source transistors 316 of all the rows (all the pixels) to stop the supply of the current id1 in the seventh embodiment.

FIG. 38 is a diagram for describing an effect in the seventh embodiment of the present technology. In the first embodiment, a source follower (the upstream amplification transistor 315 and the current source transistor 316) of the pixel 300 to be read is turned on when reading is performed row by row. In such a driving method, however, there is a possibility that circuit noise of the source follower in the upstream stage propagates to the downstream stage (the capacitive element, the downstream source follower, or the ADC) so that reading noise increases.

For example, in the first embodiment, kTC noise generated in the pixel during the global shutter operation is 450 (μVrms) as illustrated in the drawing. Furthermore, noise generated in the source follower (the upstream amplification transistor 315 and the current source transistor 316) in the upstream stage at the time of reading for every row is 380 (μVrms). Noise generated after the source follower in the downstream stage is 160 (μVrms). Therefore, the total noise is 610 (μVrms). In this manner, the contribution of the noise of the source follower in the upstream stage in the total value of the noise becomes relatively large in the first embodiment.

In order to reduce the noise of the source follower in the upstream stage, the voltage (Vs) that can be adjusted is supplied to the source of the source follower in the upstream stage in the seventh embodiment as described above. The switching section 440 selects the power supply voltage VDD and supplies the power supply voltage as the source voltage Vs during the global shutter (exposure) operation. Then, the switching section 440 switches the source voltage Vs to VDD−Vgs−Vft after the exposure ends. Furthermore, the timing control circuit 212 turns on the current source transistor 316 in the upstream stage during the global shutter (exposure) operation, and turns off the current source transistor 316 after the exposure ends.

The above-described control enables the potential of the upstream node to be equalized between the time of performing the global shutter operation and the time of reading for every row, and the PRNU can be improved as illustrated in FIGS. 36 and 37. Furthermore, since the source follower in the upstream stage is in the off state at the time of reading for every row, the circuit noise of the source follower is not generated and becomes zero (μVrms) as illustrated in FIG. 38. Incidentally, the upstream amplification transistor 315 in the source follower in the upstream stage is in an on state.

In this manner, since the source follower in the upstream stage is in the off state at the time of reading according to the seventh embodiment of the present technology, the noise generated in the source follower can be reduced.

<8. Example of Application to Mobile Body>

The technology according to the present disclosure (present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, and a robot.

Figure 39:
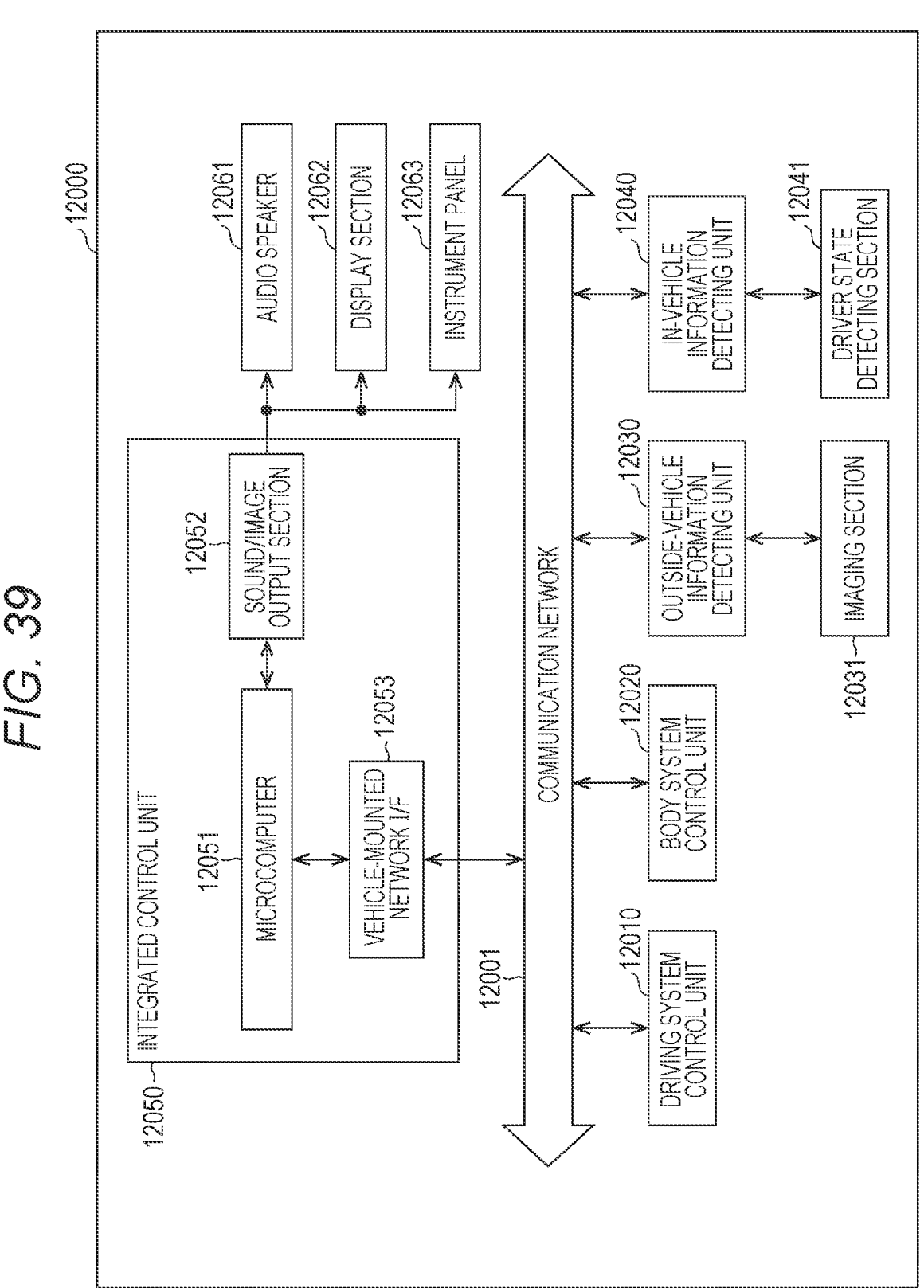
FIG. 39 is a block diagram depicting a schematic configuration example of a vehicle control system.

FIG. 39 is a block diagram depicting a schematic configuration example of a vehicle control system as an example of a mobile body control system to which the technology according to the present disclosure can be applied.

The vehicle control system 12000 includes a plurality of electronic control units connected to each other via a communication network 12001. In the example depicted in FIG. 39, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information regarding the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 39, an audio speaker 12061, a display section 12062, and an instrument panel 12063 are illustrated as the output device. The display section 12062 may, for example, include at least one of an on-board display and a head-up display.

Figure 40:
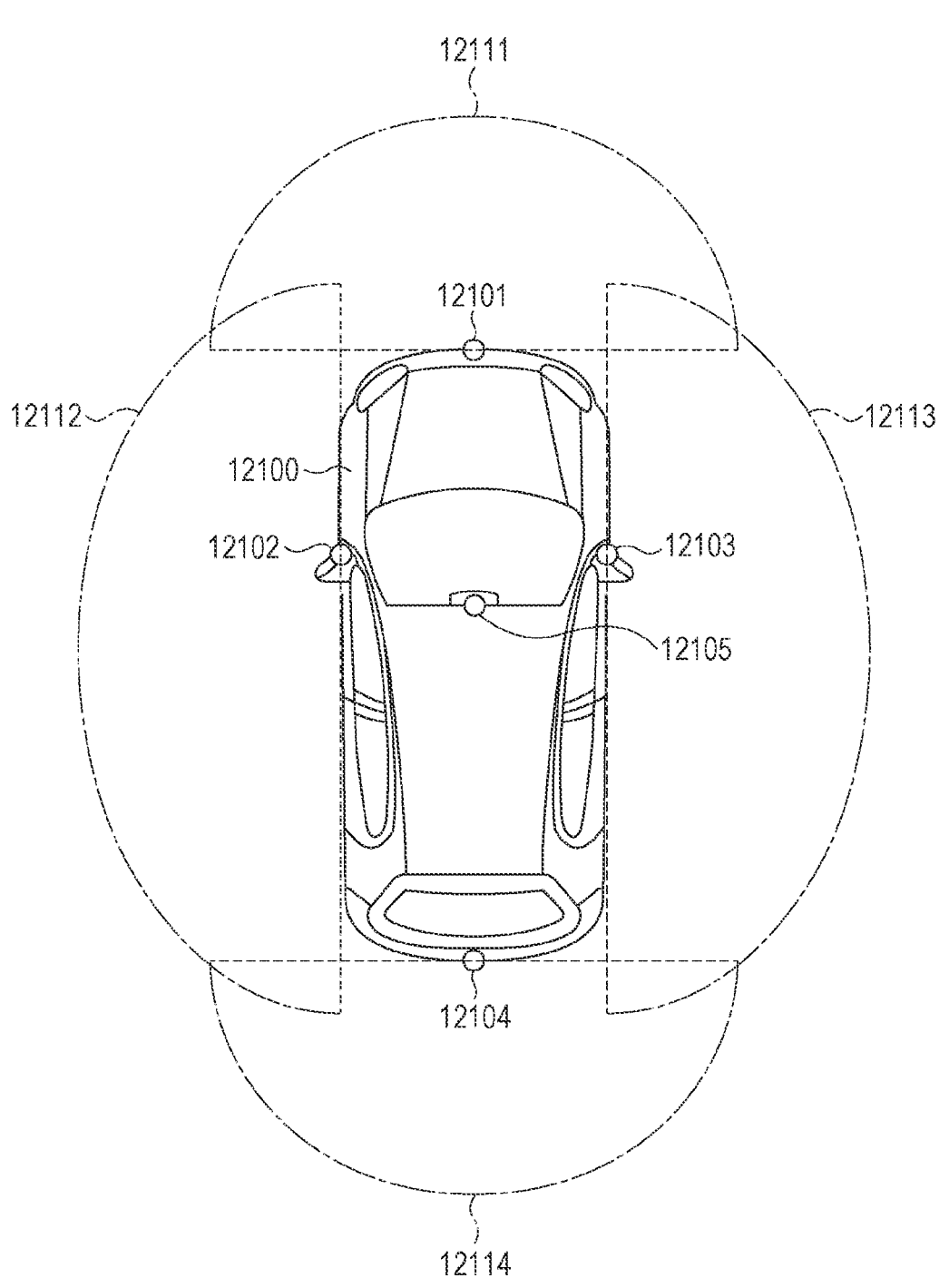
FIG. 40 is an explanatory diagram depicting an example of an installation position of an imaging section.

FIG. 40 is a diagram depicting an example of the installation position of the imaging section 12031.

In FIG. 40, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 40 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described as above. The technology according to the present disclosure can be applied to the imaging section 12031 among the above-described configurations. Specifically, for example, the imaging device 100 in FIG. 1 can be applied to the imaging section 12031. When the technology according to the present disclosure is applied to the imaging section 12031, kTC noise can be reduced, and a more easily viewable imaged image can be obtained, so that the fatigue of the driver can be reduced.

Incidentally, the above-described embodiments illustrate examples for embodying the present technology, and the matters in the embodiments respectively have correspondence relationships with the matters specifying the invention in the claims. Similarly, the matters specifying the invention in the claims respectively have correspondence relationships with the matters in the embodiments of the present technology having the same names. However, the present technology is not limited to the embodiments, and can be embodied by making various modifications to the embodiments within the scope not departing from the gist thereof.

Incidentally, the effects described in the present specification are merely examples and are not limited, and there may be additional effects.

Incidentally, the present technology can also have the following configurations.

(1) A solid-state imaging element including:

first and second capacitive elements;

an upstream circuit that sequentially generates a predetermined reset level and a signal level corresponding to an exposure amount and causes each of the first and second capacitive elements to hold the reset level and the signal level;

a selection circuit that sequentially performs control to connect one of the first and second capacitive elements to a predetermined downstream node, control to disconnect both the first and second capacitive elements from the downstream node, and control to connect another of the first and second capacitive elements to the downstream node;

a downstream reset transistor that initializes a level of the downstream node when both the first and second capacitive elements are disconnected from the downstream node; and a downstream circuit that sequentially reads the reset level and the signal level from the first and second capacitive elements via the downstream node and outputs the reset level and the signal level.

(2) The solid-state imaging element according to the above-described (1), further including:

an upstream selection transistor that opens and closes a path between the upstream circuit and a predetermined upstream node; and an upstream reset transistor that initializes a level of the upstream node, in which the first and second capacitive elements respectively have first ends connected in common to the upstream node and second ends connected to the selection circuit.

(3) The solid-state imaging element according to the above-described (2), in which the upstream selection transistor transitions to a closed state over a period in which the upstream circuit causes each of the first and second capacitive elements to hold the reset level and the signal level, and the upstream reset transistor initializes the level of the upstream node in a period in which the downstream circuit sequentially reads the reset level and the signal level from the first and second capacitive elements.

(4) The solid-state imaging element according to any one of the above-described (1) to (3), in which the upstream circuit includes:

a photoelectric conversion element;

an upstream transfer transistor that transfers a charge from the photoelectric conversion element to a floating diffusion layer;

a first reset transistor that initializes the floating diffusion layer; and an upstream amplification transistor that amplifies a voltage of the floating diffusion layer and outputs the amplified voltage to a predetermined upstream node, and the first and second capacitive elements respectively have first ends connected in common to the upstream node and second ends connected to the selection circuit.

(5) The solid-state imaging element according to the above-described (4), further including a switching section that adjusts a source voltage to be supplied to a source of the upstream amplification transistor, in which the upstream circuit further includes a current source transistor connected to a drain of the upstream amplification transistor, and the current source transistor transitions from an on state to an off state after an exposure period ends.

(6) The solid-state imaging element according to the above-described (5), in which the switching section supplies a predetermined power supply voltage as the source voltage in the exposure period, and supplies a generation voltage, different from the power supply voltage, as the source voltage after the exposure period ends.

(7) The solid-state imaging element according to the above-described (6), in which a difference between the power supply voltage and the generation voltage substantially matches a sum of a variation amount caused by reset feedthrough of the first reset transistor and a gate-source voltage of the upstream amplification transistor.

(8) The solid-state imaging element according to any one of the above-described (4) to (7), in which at a predetermined exposure start timing, the upstream transfer transistor transfers the charge to the floating diffusion layer, and the first reset transistor initializes the photoelectric conversion element together with the floating diffusion layer, and the upstream transfer transistor transfers the charge to the floating diffusion layer at a predetermined exposure end timing.

(9) The solid-state imaging element according to any one of the above-described (4) to (7), in which the upstream circuit further includes a discharge transistor that discharges the charge from the photoelectric conversion element.

(10) The solid-state imaging element according to the above-described (9), in which before a predetermined exposure start timing, the first reset transistor initializes the floating diffusion layer, and the discharge transistor discharges the charge from the photoelectric conversion element, and the upstream transfer transistor transfers the charge to the floating diffusion layer at a predetermined exposure end timing.

(11) The solid-state imaging element according to any one of the above-described (4) to (10), further including a control circuit that controls a reset power supply voltage of the upstream circuit, in which the first reset transistor initializes a voltage of the floating diffusion layer to the reset power supply voltage, and the control circuit sets the reset power supply voltage to a voltage different from a voltage during an exposure period in a reading period in which the reset level and the signal level are read.

(12) The solid-state imaging element according to the above-described (11), in which a difference between the reset power supply voltage in the reading period and the reset power supply voltage in the exposure period substantially matches a variation amount caused by reset feedthrough of the first reset transistor.

(13) The solid-state imaging element according to any one of the above-described (4) to (12), in which a first reset signal is input to a gate of the first reset transistor, and an amplitude of the first reset signal is a value obtained by adding a predetermined margin to a value corresponding to a dynamic range.

(14) The solid-state imaging element according to any one of the above-described (1) to (13), further including a digital signal processing section that adds a pair of consecutive frames, in which the upstream circuit causes one of the first and second capacitive elements to hold the reset level in an exposure period of one of the pair of frames and then causes another of the first and second capacitive elements to hold the signal level, and causes the another of the first and second capacitive elements to hold the reset level in an exposure period of another of the pair of frames and then causes the one of the first and second capacitive elements to hold the signal level.

(15) The solid-state imaging element according to any one of the above-described (1) to (14), further including an analog-to-digital converter that sequentially converts the output reset level and the output signal level into digital signals.

(16) The solid-state imaging element according to the above-described (15), in which the analog-to-digital converter includes:

a comparator that compares a level of a vertical signal line that transmits the reset level and the signal level with a predetermined ramp signal and outputs a comparison result; and a counter that counts a count value over a period until the comparison result is inverted and outputs the digital signal indicating the count value.

(17) The solid-state imaging element according to the above-described (16), in which the comparator includes:

a comparison unit that compares levels of a pair of input terminals and outputs a comparison result; and an input-side selector that selects any of the vertical signal line and a node with a predetermined reference voltage and connects the selected vertical signal line or node to one of the pair of input terminals, and the ramp signal is input to the one of the pair of input terminals.

(18) The solid-state imaging element according to the above-described (17), further including:

a control section that determines whether or not illuminance is higher than a predetermined value on the basis of the comparison result and outputs a determination result;

a correlated double sampling (CDS) processing section that performs correlated double sampling processing on the digital signal; and an output-side selector that outputs either the digital signal subjected to the correlated double sampling processing or a digital signal having a predetermined value on the basis of the determination result.

(19) The solid-state imaging element according to any one of the above-described (1) to (18), further including a vertical scanning circuit that performs control to control a plurality of rows in each of which a predetermined number of pixels are arrayed to simultaneously start exposure, in which the first and second capacitive elements, the upstream circuit, the selection circuit, the downstream reset transistor, and the downstream circuit are arranged in each of the pixels.

(20) The solid-state imaging element according to the above-described (19), in which the vertical scanning circuit further performs control to control the plurality of rows to sequentially start the exposure.

(21) The solid-state imaging element according to any one of the above-described (1) to (20), in which the upstream circuit is provided on a first chip, and the first and second capacitive elements, the selection circuit, the downstream reset transistor, and the downstream circuit are provided on a second chip.

(22) The solid-state imaging element according to the above-described (21), further including an analog-to-digital converter that sequentially converts the output reset level and the output signal level into digital signals, in which the analog-to-digital converter is provided on the second chip.

(23) The solid-state imaging element according to the above-described (21), further including an analog-to-digital converter that sequentially converts the output reset level and the output signal level into digital signals, in which the analog-to-digital converter is provided on a third chip.

(24) A solid-state imaging element including:

a photoelectric conversion section that converts incident light into a charge;

a first amplification transistor that converts the charge into a voltage;

a signal line that outputs a pixel signal;

a first capacitive element having a first end connected to a first node which is an output destination of the first amplification transistor;

a second capacitive element provided in parallel with the first capacitive element between the first amplification transistor and the signal line, the second capacitive element having a first end connected to the first node;

a first selection transistor connected to the first capacitive element at a second end of the first capacitive element;

a second selection transistor connected to the second capacitive element at a second end of the second capacitive element;

a reset transistor of which a source or a drain is connected to a second node to which the first and second selection transistors are connected; and a second amplification transistor that has a gate connected to the second node and outputs the pixel signal.

REFERENCE SIGNS LIST

100 Imaging device
110 Imaging lens
120 Recording unit
130 Imaging control section
200 Solid-state imaging element
201 Upper pixel chip
202 Lower pixel chip
203 Circuit chip
211 Vertical scanning circuit
212 Timing control circuit
213 DAC
220 Pixel array section
221 Upper pixel array section
222 Lower pixel array section
250 Load MOS circuit block
251 Load MOS transistor
260 Column signal processing circuit
261, 270 ADC
262, 290 Digital signal processing section
271 Counter
280 Comparator
281, 292 Selector
282, 283, 321, 322 Capacitive element
284, 286 Auto-zero switch
285 Comparison unit
291 CDS processing section
300 Pixel
301 Effective pixel
310 Upstream circuit
311 Photoelectric conversion element
312 Transfer transistor
313 FD reset transistor
314 FD
315 Upstream amplification transistor
316 Current source transistor
317 Discharge transistor 323 Upstream reset transistor
324 Upstream selection transistor
330 Selection circuit
331, 332 Selection transistor
341 Downstream reset transistor
350 Downstream circuit
351 Downstream amplification transistor
352 Downstream selection transistor
420 Regulator
421 Low-pass filter
422 Buffer amplifier
423 Capacitive element
430 Dummy pixel
431 Reset transistor
432 FD
433 Amplification transistor
434 Current source transistor
440 Switching section
441 Inverter
442 Switching circuit
443, 444 Switch
12031 Imaging section

The invention claimed is:

1. A solid-state imaging element comprising:
a first capacitive element;
a second capacitive element in parallel with the first capacitive element;
an upstream circuit that sequentially generates a reset level and a signal level corresponding to an exposure amount and causes each of the first and second capacitive elements to hold the reset level and the signal level;
a selection circuit that sequentially performs control to connect one of the first and second capacitive elements to a first node, control to disconnect both the first and second capacitive elements from the first node, and control to connect another of the first and second capacitive elements to the first node; and
a downstream circuit that sequentially reads the reset level and the signal level from the first and second capacitive elements via the first node and outputs the reset level and the signal level;
wherein the first capacitive element and the second capacitive element are respectively connected between the selection circuit and a signal line that outputs a pixel signal; and
wherein the selection circuit includes a first selection transistor connected between the first capacitive element and the first node, and a second selection transistor connected between the second capacitive element and the first node.

2. The solid-state imaging element of claim 1, further comprising:
a downstream reset transistor having a source or drain connected to the first node and that resets the first node.

3. The solid-state imaging element of claim 1, wherein the downstream circuit includes an amplification transistor having a gate connected to the first node and that outputs the signal level.

4. The solid-state imaging element of claim 1, further comprising:
an upstream selection transistor that opens and closes a path between the upstream circuit and the first capacitive element and second capacitive element.

5. The solid-state imaging element according to claim 1, wherein:
the upstream circuit is provided on a first chip; and
the first and second capacitive elements, the selection circuit, and the downstream circuit are provided on a second chip.

6. The solid-state imaging element according to claim 1, wherein:
the upstream circuit includes:
a photoelectric conversion element;
an upstream transfer transistor that transfers a charge from the photoelectric conversion element to a floating diffusion layer;
an upstream reset transistor that initializes the floating diffusion layer; and
an upstream amplification transistor that amplifies a voltage of the floating diffusion layer and outputs the amplified voltage to the first capacitive element and the second capacitive element.

7. The solid-state imaging element according to claim 6, further comprising:
a switching circuit that adjusts a source voltage to be supplied to a source of the upstream amplification transistor;
wherein the upstream circuit further includes a current source transistor connected to a drain of the upstream amplification transistor; and
the current source transistor transitions from an on state to an off state after an exposure period ends.

8. The solid-state imaging element according to claim 7, wherein:
the switching circuit supplies a predetermined power supply voltage as the source voltage in the exposure period, and supplies a generation voltage, different from the power supply voltage, as the source voltage after the exposure period ends.

9. The solid-state imaging element according to claim 7, wherein:
the upstream circuit further includes a discharge transistor that discharges the charge from the photoelectric conversion element.

10. The solid-state imaging element according to claim 7, further comprising:
a control circuit that controls a reset power supply voltage of the upstream circuit;
wherein the first reset transistor initializes a voltage of the floating diffusion layer to the reset power supply voltage; and
the control circuit sets the reset power supply voltage to a voltage different from a voltage during an exposure period in a reading period in which the reset level and the signal level are read.

11. The solid-state imaging element according to claim 7, wherein:
a first reset signal is input to a gate of the first reset transistor; and
an amplitude of the first reset signal is a value obtained by adding a predetermined margin to a value corresponding to a dynamic range.

12. A solid-state imaging element comprising: a photoelectric conversion element that converts incident light into a charge;
a first amplification transistor that converts the charge into a voltage;
a signal line that outputs a pixel signal;
a first capacitive element;

a second capacitive element provided in parallel with the first capacitive element between an output of the first amplification transistor and the signal line;

a first selection transistor connected at a first end to the first capacitive element and at a second end to a first node;

a second selection transistor connected at a first end to the second capacitive element and at a second end to the first node; and a second amplification transistor that has a gate connected to the first node and that outputs the pixel signal, wherein a first end of the second amplification transistor is connected a voltage source and a second end of the second amplification transistor is directly connected to a third selection transistor.

13. The solid-state imaging element of claim 12, further comprising:

a reset transistor having a source or a drain connected to the first node and that resets a charge level at the first node.

14. The solid-state imaging element according to claim 12, further comprising:

an upstream transfer transistor that transfers a charge from the photoelectric conversion element to a floating diffusion layer; and an upstream reset transistor that initializes the floating diffusion layer.

15. The solid-state imaging element according to claim 12, wherein:

the photoelectric conversion element and the first amplification transistor are provided on a first chip; and the first capacitive element, the second capacitive element, the first selection transistor, the second selection transistor, and the second amplification transistor are provided on a second chip.

16. The solid-state imaging element according to claim 15, wherein the first chip and the second chip are stacked.

17. A solid-state imaging element comprising:

a photoelectric conversion element that converts incident light into a charge;

a first amplification transistor that converts the charge into a voltage and outputs a pixel to a first node;

a signal line that outputs a pixel signal;

a first capacitive element;

a second capacitive element;

a first selection transistor connected at a first end to the first capacitive element and at a second end to the first node;

a second selection transistor connected at a first end to the second capacitive element and at a second end to the first node;

a second amplification transistor that has a gate connected to an output of the first selection transistor or the second selection transistor and that outputs the pixel signal, wherein a first end of the second amplification transistor is connected a voltage source and a second end of the second amplification transistor is directly connected to a third selection transistor; and a downstream reset transistor having a source or a drain connected to the first node and that resets a charge level at the first node.

18. The solid-state imaging element according to claim 17, further comprising:

an upstream transfer transistor that transfers a charge from the photoelectric conversion element to a floating diffusion layer; and an upstream reset transistor that initializes the floating diffusion layer.

19. The solid-state imaging element according to claim 17, wherein:

the photoelectric conversion element and the first amplification transistor are provided on a first chip; and the first capacitive element, the second capacitive element, the first selection transistor, the second selection transistor, the second amplification transistor, and the downstream reset transistor are provided on a second chip.

20. The solid-state imaging element according to claim 19, wherein the first chip and the second chip are stacked.

* * * * *